(12) United States Patent
Booth et al.

(10) Patent No.: US 10,687,193 B2
(45) Date of Patent: *Jun. 16, 2020

(54) ASSIST DEVICE AND SYSTEM

(71) Applicant: UnaliWear, Inc., Austin, TX (US)

(72) Inventors: Jean Anne Booth, Austin, TX (US);
Brian Kircher, Georgetown, TX (US);
Davin Potts, Round Rock, TX (US);
Syed Sajjad Ahmed, Austin, TX (US)

(73) Assignee: UNALIWEAR, INC., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/049,361

(22) Filed: Jul. 30, 2018

(65) Prior Publication Data
US 2019/0069154 A1    Feb. 28, 2019

Related U.S. Application Data

(63) Continuation-in-part of application No. 14/917,787, filed as application No. PCT/US2014/056687 on Sep. 19, 2014, now Pat. No. 10,051,410.
(Continued)

(51) Int. Cl.
*H04W 4/90* (2018.01)
*G06F 1/16* (2006.01)
(Continued)

(52) U.S. Cl.
CPC ............. *H04W 4/90* (2018.02); *G06F 1/163* (2013.01); *H04L 67/12* (2013.01); *H04L 67/18* (2013.01); *H04L 67/306* (2013.01); *H04W 4/029* (2018.02)

(58) Field of Classification Search
CPC combination set(s) only.
See application file for complete search history.

(56) References Cited

U.S. PATENT DOCUMENTS 2,764,640 A   9/1956 Osserman et al.
6,433,690 B2  8/2002 Petelenz et al.
(Continued)

FOREIGN PATENT DOCUMENTS

AU   2014321303 B2   11/2018
CN     101520815 A    9/2009
(Continued)

OTHER PUBLICATIONS

"Mexican Application Serial No. MX a 2016 003494, Office Action dated Sep. 18, 2018", (w/English Translation) 7 pages.
(Continued)

*Primary Examiner* — Van T Trieu
(74) *Attorney, Agent, or Firm* — Schwegman Lundberg & Woessner, P.A.

(57) ABSTRACT

A wearable device monitors a wearer's physical activity and provides assistance to the wearer. The device includes physiologic sensors that provide sensor data of the wearer to a processor, a user interface that provides information to the wearer, a network interface that provides a network connection between the device and a remote computer, and a memory that stores instructions. The processor executes the instructions to collect physical activity data of the wearer using the sensors, to provide the collected activity data to the remote computer via the network interface to create or update a parameterized rule-based custom data model for the wearer, to receive the custom data model for comparison to collected activity data, and to communicate with the wearer via the user interface when a check of the wearer's activity data against the custom data model indicates that the wearer's activity is not consistent with the custom data model.

43 Claims, 31 Drawing Sheets

Related U.S. Application Data

(60) Provisional application No. 61/879,806, filed on Sep. 19, 2013.

(51) Int. Cl.
*H04W 4/029* (2018.01)
*H04L 29/08* (2006.01)

(56) References Cited

U.S. PATENT DOCUMENTS

| | | | |
|---|---|---|---|
| 7,396,330 | B2 | 7/2008 | Banet et al. |
| 7,545,318 | B2 | 6/2009 | Derrick et al. |
| 8,577,392 | B1 | 11/2013 | Pai et al. |
| 8,989,053 | B1 | 3/2015 | Skaaksrud et al. |
| 9,672,472 | B2 * | 6/2017 | Snyder .......... G06F 19/00 |
| 10,051,410 | B2 * | 8/2018 | Booth .......... H04W 4/029 |
| 2001/0004234 | A1 | 6/2001 | Petelenz et al. |
| 2004/0004234 | A1 | 1/2004 | Yagishita et al. |
| 2004/0193068 | A1 | 9/2004 | Burton et al. |
| 2005/0010087 | A1 | 1/2005 | Banet et al. |
| 2007/0182367 | A1 | 8/2007 | Partovi |
| 2007/0197878 | A1 | 8/2007 | Shklarski |
| 2007/0279002 | A1 | 12/2007 | Partovi |
| 2008/0012761 | A1 | 1/2008 | Derrick et al. |
| 2008/0146892 | A1 | 6/2008 | Leboeuf et al. |
| 2009/0054743 | A1 * | 2/2009 | Stewart .......... G16H 15/00 600/301 |
| 2010/0205541 | A1 * | 8/2010 | Rapaport .......... G06Q 10/10 715/753 |
| 2014/0335490 | A1 | 11/2014 | Baarman et al. |
| 2015/0073907 | A1 * | 3/2015 | Purves .......... G06Q 20/32 705/14.58 |
| 2015/0100335 | A1 * | 4/2015 | Englehard .......... G06F 19/3462 705/2 |
| 2015/0254956 | A1 * | 9/2015 | Shen .......... G08B 21/0446 340/573.1 |
| 2016/0227361 | A1 | 8/2016 | Booth et al. |
| 2017/0103674 | A1 * | 4/2017 | Sadeh-Koniecpol ... G06F 21/55 |

FOREIGN PATENT DOCUMENTS

| | | |
|---|---|---|
| CN | 102184312 A | 9/2011 |
| CN | 102289911 A | 12/2011 |
| CN | 102982652 A | 3/2013 |
| CN | 202838608 A | 3/2013 |
| CN | 202838608 U | 3/2013 |
| CN | 203015121 U | 6/2013 |
| JP | 087188 A | 1/1996 |
| JP | 2006170751 A | 6/2006 |
| JP | 2007265017 A | 10/2007 |
| JP | 6346953 B2 | 6/2018 |

OTHER PUBLICATIONS

"Mexican Application Serial No. MX a 2016 003494, Response filed Nov. 1, 2018 to Office Action dated Sep. 18, 2018", w English Claims, 12 pgs.
"U.S. Appl. No. 14/917,787, Final Office Action dated Sep. 13, 2017", 16 pgs.
"U.S. Appl. No. 14/917,787, Non Final Office Action dated May 2, 2017", 16 pgs.
"U.S. Appl. No. 14/917,787, Notice of Allowability dated Apr. 18, 2018", 2 pgs.
"U.S. Appl. No. 14/917,787, Notice of Allowability dated Jul. 5, 2018", 2 pgs.
"U.S. Appl. No. 14/917,787, Notice of Allowance dated Jan. 9, 2018", 7 pgs.
"U.S. Appl. No. 14/917,787, Notice of Allowance dated Apr. 9, 2018", 7 pgs.
"U.S. Appl. No. 14/917,787, Preliminary Amendment filed Mar. 9, 2016", 7 pgs.
"U.S. Appl. No. 14/917,787, Response filed Jul. 28, 2017 to Non Final Office Action dated May 2, 2017", 13 pgs.
"U.S. Appl. No. 14/917,787, Response filed Dec. 13, 2017 to Final Office Action dated Sep. 13, 2017", 11 pgs.
"Australian Application Serial No. 2014321303, First Examination Report dated Apr. 23, 2018", 3 pgs.
"Australian Application Serial No. 2014321303, Response filed Jul. 10, 2018 to First Examination Report dated Apr. 23, 2018", 17 pgs.
"Chinese Application Serial No. 201480051752.9, Office Action dated Apr. 26, 2017", w/English Translation, 9 pgs.
"Chinese Application Serial No. 201480051752.9, Office Action dated Jul. 9, 2018", w/English translation, 8 pgs.
"Chinese Application Serial No. 201480051752.9, Office Action dated Dec. 22, 2017", w/English Translation, 22 pgs.
"Chinese Application Serial No. 201480051752.9, Response filed Mar. 5, 2018 to Office Action dated Dec. 22, 2017", with English Translation, 8 pgs.
"Chinese Application Serial No. 201480051752.9, Response filed Aug. 30, 2017 to Office Action dated Apr. 26, 2017", w/English Translation, 17 pgs.
"European Application Serial No. 14845754.2, Response filed Sep. 6, 2017 to Supplementary European Search Report dated Feb. 7, 2017", 12 pgs.
"European Application Serial No. 14845754.2, Supplementary European Search Report dated Feb. 7, 2017", 7 pgs.
"International Application Serial No. PCT/US2014/056687, International Preliminary Report on Patentability dated Mar. 31, 2016", 7 pgs.
"International Application Serial No. PCT/US2014/056687, International Search Report dated Dec. 22, 2014", 2 pgs.
"International Application Serial No. PCT/US2014/056687, Written Opinion dated Dec. 22, 2014", 5 pgs.
"Japanese Application Serial No. 2016-544038, Office Action dated Jan. 30, 2018", (English Translation), 6 pgs.
"Japanese Application Serial No. 2016-544038, Response filed Apr. 18, 2018 to Office Action dated Jan. 30, 2018", With English Translation, 13 pgs.
"European Application Serial No. 14845754.2, Response filed Nov. 18, 2019 to Communication Pursuant to Article 94(3) EPC mailed Jul. 8, 2019", 9 pgs.
"International Application Serial No. PCT/US2019/043583, International Search Report dated Sep. 3, 2019", 2 pgs.
"International Application Serial No. PCT/US2019/043583, Written Opinion dated Sep. 3, 2019", 7 pgs.
"European Application Serial No. 14845754.2, Communication Pursuant to Article 94(3) EPC mailed Jul. 8, 2019", 4 pgs.
"European Application Serial No. 14845754.2, Communication Pursuant to Article 94(3) EPC dated Apr. 14, 2020", 5 pages.

* cited by examiner

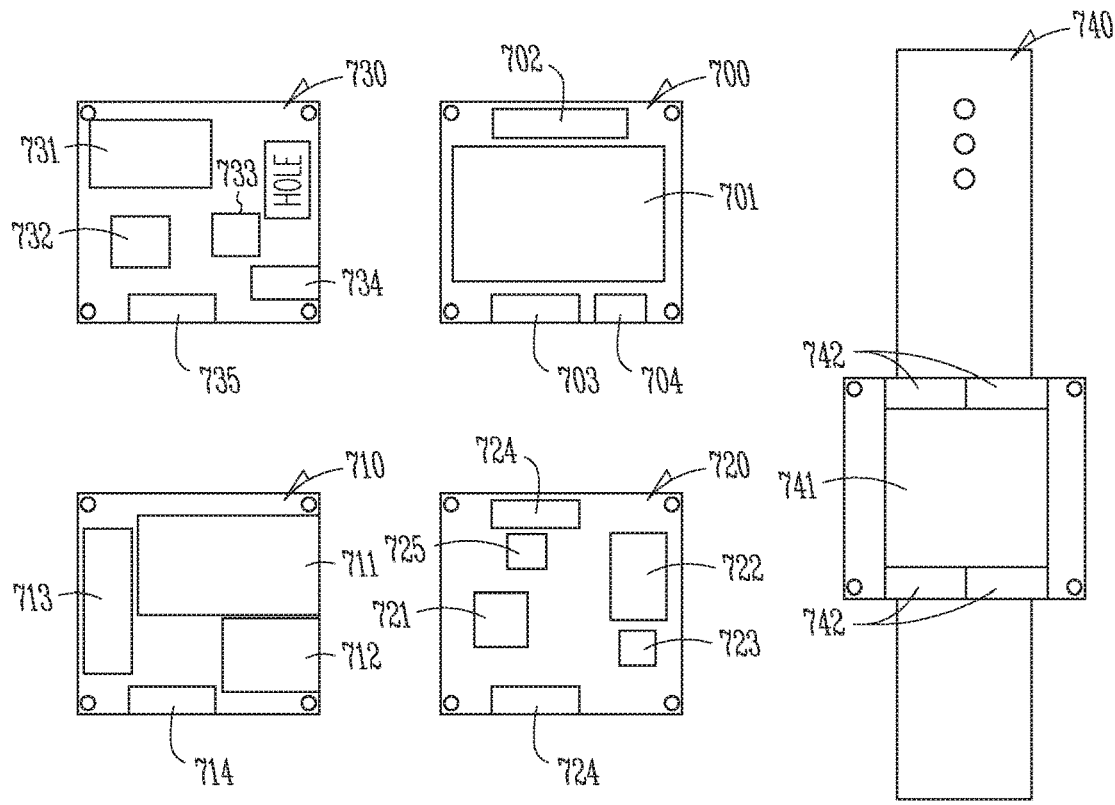
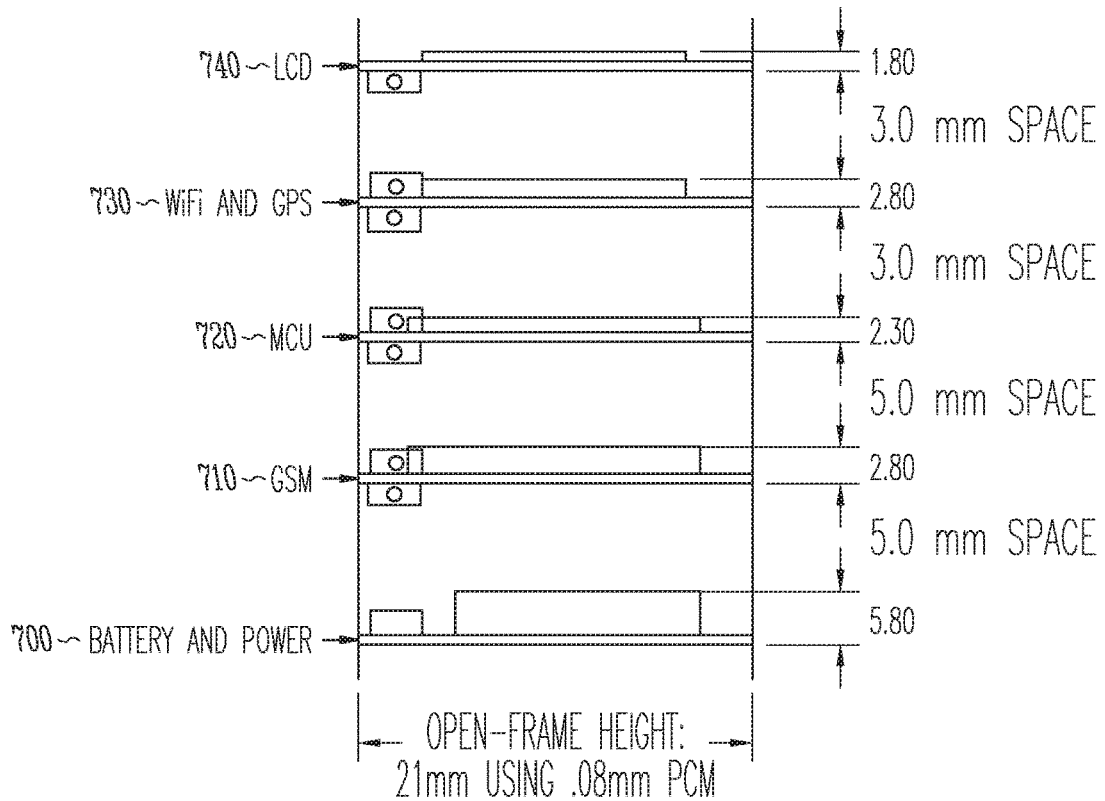
Fig. 7

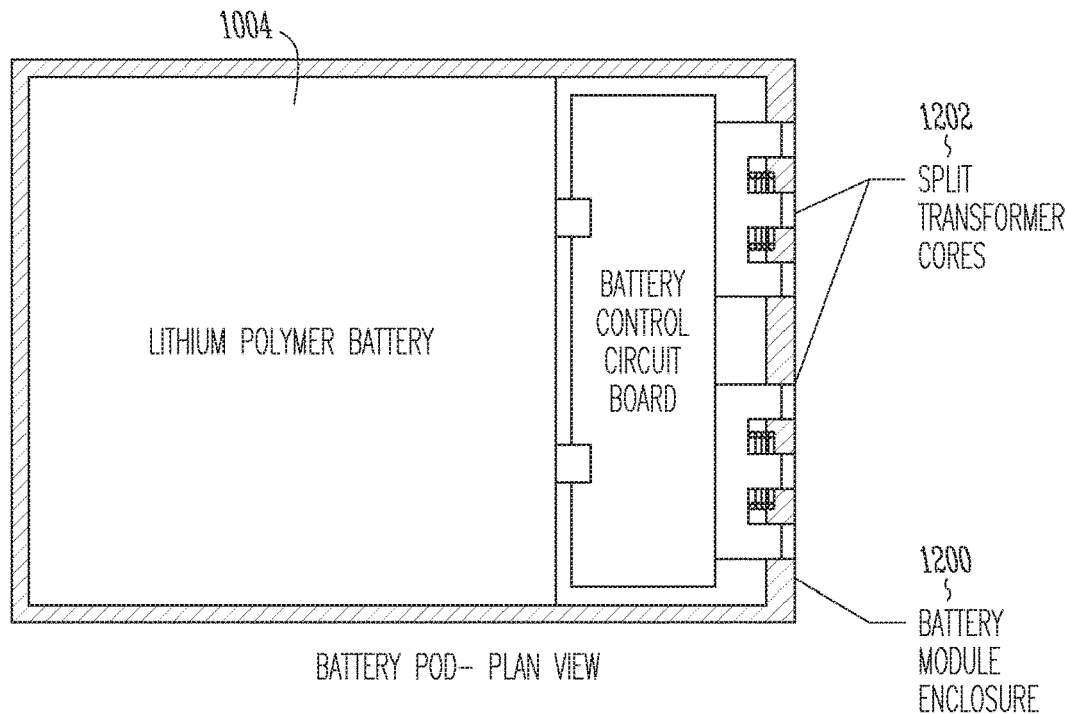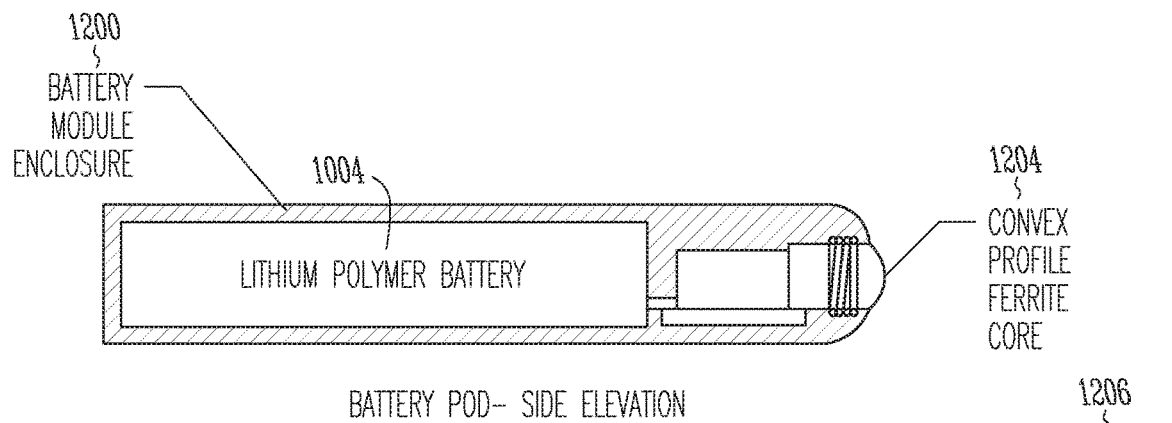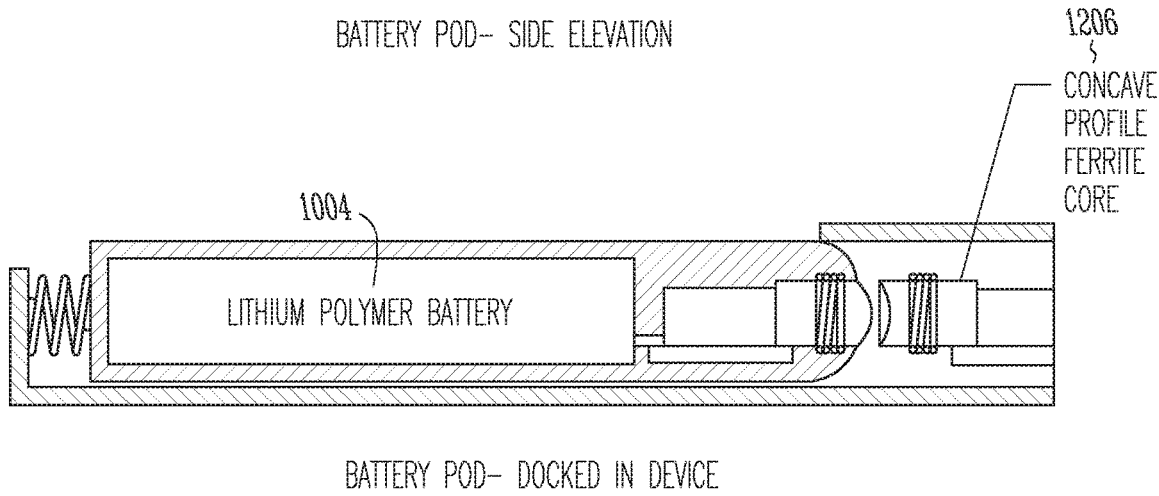
Fig. 12

Fig. 13

| POWER STATE | DESCRIPTION | RADIO | SENSOR UPDATES | SENSOR TRIGGERS |
|---|---|---|---|---|
| DEEP SLEEP | LOWEST POWER STATE. ENTERED WHEN USER HAS BEEN STATIONARY FOR 30 MINS AND THERE HAVE BEEN NO EXCEPTION OR ASSIST EVENTS IN LAST 24 HOURS | OFF | EVERY 5 MINUTES | ENABLED |
| SLEEP | ENTERED WHEN USER HAS BEEN STATIONARY FOR 5 MINS – OR LONGER IF AN EXCEPTION OR ASSIST EVENT HAS OCCURRED IN LAST 24 HOURS | OFF | EVERY MINUTE | ENABLED |
| LOW ACTIVE | USER IS MODERATELY ACTIVE AND/OR LITTLE DATA INDICATES LOW RISK | OFF | EVERY 10 SECONDS | ENABLED |
| HIGH ACTIVE | USER IS ACTIVE AND/OR LITTLE DATA INDICATES SOME RISK | OFF | EVERY 5 SECONDS | ENABLED |
| LOW ASSIST | AN ASSIST EVENT HAD BEEN DETECTED. DEVICE HAS INITIATED COMMUNICATION WITH USER. | OFF | EVERY 1 SECOND | N/A |
| HIGH ASSIST | ENTERED WHEN: USER REQUESTS, LITTLE DATA EVENT OCCURS, USER SLOW TO RESPOND, EXTREME SENSOR TRIGGER. DEVICE CONNECTS TO RADIO TO PROVIDE DETAILED ANALYSIS AND ASSISTANCE TO USER. | ON | EVERY 1 SECOND | N/A |
| EXCEPTION | ENTERED IF USER REQUESTS OR ASSIST EVENT IS UNRESOLVED. | ON | EVERY 1 SECOND | N/A |

| DISPLAY | DATA PROCESSING | CAREGIVER ALERT | AUDIO | LED COLOR |
|---|---|---|---|---|
| SHOWS TIME OF DAY | PERIODIC LITTLE | NONE | NONE | NONE |
| SHOWS TIME OF DAY | PERIODIC LITTLE | NONE | NONE | NONE |
| SHOWS TIME OF DAY | LITTLE | NONE | NONE | GREEN |
| SHOWS TIME OF DAY | LITTLE | NONE | NONE | GREEN |
| PROMPTS TO USER | LITTLE | NONE | YES | YELLOW |
| PROMPTS TO USER | BIG | OPTIONAL | YES | RED |
| PROMPTS TO USER | BIG | YES | YES | FLASH RED |

ASSIST DEVICE AND SYSTEM

CROSS-REFERENCE TO RELATED APPLICATIONS

The present application is a continuation-in-part of, and claims priority to, U.S. patent application Ser. No. 14/917,787, filed Mar. 9, 2016, now U.S. Pat. No. 10,051,410, which claims priority to PCT/US2014/056687 filed Sep. 19, 2014, which, in turn, claims priority to U.S. Provisional Patent Application No. 61/879,806, filed Sep. 19, 2013. The contents of these applications are incorporated herein by reference.

TECHNICAL FIELD

The disclosure herein is directed to an assist device and system and, more particularly, to an assist device and associated systems for monitoring and evaluating the physical activity patterns of a wearer of the assist device to determine when the wearer needs assistance and to provide such assistance.

BACKGROUND

Ill, elderly, or infirm persons typically desire to remain at home and continue to live as independently as possible. However, it is not practical for some people to live a completely independent life and various types of assistance or supportive care is needed. Assistance and/or supportive care are typically provided by healthcare professionals or by family and friends. In order for others to provide the needed assistance and support they need to be notified when help is needed. Thus, there is a need to monitor and communication with a person that desires to live as independently as possible, as well as provide monitoring and communication capabilities to those directly or indirectly involved in providing assistance or care to the person.

Monitoring and evaluating physical activity patterns, detecting the occurrence of falls, and recognizing deviations from normal life patterns that indicate the need for assistance are not readily available due to the lack of devices and systems that allow monitoring of a person in an accurate, convenient, unobtrusive, and socially acceptable manner. There is a need for development of assistive technologies that monitor and communicate in an unobtrusive, dignified manner.

SUMMARY

Various examples are now described to introduce a selection of concepts in a simplified form that are further described below in the Detailed Description. The Summary is not intended to identify key or essential features of the claimed subject matter, nor is it intended to be used to limit the scope of the claimed subject matter.

Embodiments are directed to devices, systems, and methods for monitoring and assisting a subject in various life tasks. Certain embodiments are directed to a wearable life assist device. In certain aspects the device is capable of one or more tasks that include, but are not limited to, monitoring the user (e.g., learning patterns and detecting deviations from learned patterns), providing an easy to use user interface, and communicating with external devices and systems. As used herein, a "user" is used interchangeably with "wearer" as the life assist device is typically worn by the user on the user's body (e.g., on the user's wrist), making the user a "wearer."

In certain aspects the device can signal or query the user by vibration, visual, and/or audible queries. The user can accept, decline, or ignore the device query. In certain scenarios the device query can increase in frequency and/or intensity (e.g., when information gathered by the device indicates an emergency situation). In certain aspects the device query can be coordinated with reports or alerts to one or more third parties. In certain aspects the device can comprise one or more user interfaces that use touch or verbal input mechanisms.

In sample embodiments, a wearable device is adapted to monitor a wearer's physical activity patterns and to provide assistance to the wearer. The device includes a power source, a processor, at least one physiologic sensor that provides sensor data of the wearer to the processor, a user interface connected to the processor and adapted to interact with the wearer and to provide information to the wearer, a network interface configured to provide a network connection between the device and a remote computer, and a memory coupled to the processor. The memory stores program instructions that, upon execution by the processor, cause the device to collect, from the at least one physiologic sensor, activity data related to a physical activity pattern of the wearer over time and to provide the collected activity data to the remote computer via the network interface for processing to create or update a parameterized rule-based custom data model for the wearer. The parameterized rule-based custom data model is representative of an activity profile of a physical activity pattern of the wearer over time and is provided from the remote computer to the device for comparison to recently collected activity data. The device communicates with the wearer via the user interface when a check of the wearer's activity data against the parameterized rule-based custom data model indicates that the wearer's activity is not consistent with the parameterized rule-based custom data model.

In alternative embodiments, the at least one physiologic sensor passively gathers sensor data about the wearer and the processor executes instructions to compare the gathered sensor data against the parameterized rule-based custom data model to detect a deviation. The processor further executes instructions to provide a communication to the wearer via the user interface when the deviation is detected, where the communication offers assistance to the wearer. The processor also may execute instructions to contact a caregiver or call center when the assistance offered to the wearer is accepted by the wearer.

In other alternative embodiments, the device further includes a location detection device, and the processor executes instructions to compare the wearer's location to the parameterized rule-based custom data model to determine if the wearer is in an unexpected location, and upon detection that the wearer is in an unexpected location, communicates with the wearer via the user interface to prompt the user to ask if assistance is desired and, if so, to offer directions. Conversely, the guidance may be provided directly if the user is known to have health conditions impacting memory. In another embodiment, upon detection that the wearer is in an unexpected location, the processor also may execute instructions to determine whether the wearer is traveling and, if so, may disable communications to offer direction until the wearer returns from traveling. Upon determining that the wearer is traveling, the processor also may execute instructions to reduce sensitivity of non-critical monitoring by the at least one physiologic sensor and/or to increase sensitivity of fall detection by the at least one physiologic sensor until the wearer returns from traveling.

In still other alternative embodiments, the parameterized rule-based custom data model represents at least one of a level of activity of the wearer, an activity profile of the wearer over time, an activity profile of the wearer relative to a location, and an activity profile of the wearer relative to a location over time. The processor may execute instructions to compare the collected activity data to the parameterized rule-based custom data model to determine if the wearer has missed an activity and, if so, communicate a query to the wearer via the user interface. The processor may further execute instructions to compare the collected activity data to the parameterized rule-based custom data model to determine if the wearer's activity level is decreasing and, if so, increases sensitivity of fall detection by the at least one physiologic sensor.

In still other alternative embodiments, the at least one physiologic sensor comprises a microphone that collects vocal patterns of the wearer for comparison to previously acquired recordings of the vocal patterns of the wearer to identify changes representative of changes in at least one of mental and physical state of the wearer. The processor may further execute instructions to compare the collected activity data to previously acquired activity data of the wearer to identify changes representative of changes in at least one of mental and physical state of the wearer and/or the processor may execute instructions to compare sleep data collected by the at least one physiologic sensor to previously acquired sleep data of the wearer to identify changes representative of changes in at least one of mental and physical state of the wearer.

In still other alternative embodiments, the processor may execute instructions to compare the collected activity data to the parameterized rule-based custom data model to determine if the wearer's movements are unusual and, if so, communicate a query to the wearer via the user interface requesting that the user record a speech sample for comparison to a previously recorded speech sample to identify changes indicative of a need for medical attention.

In still other alternative embodiments, the processor may execute instructions to communicate with another medical device via the network interface, to extract sharable data from the other medical device, and to prompt the wearer to take an action when the extracted sharable data indicates that the wearer requires medical attention. The extracted sharable data from the other medical device also may include a telemedicine reminder for the wearer to take an action. The telemedicine reminder may be audibilized to the user via a speech interface on the device.

In still other alternative embodiments, when the at least one physiologic sensor indicates that the wearer is inactive, the processor may execute instructions to monitor a microphone to determine if a low volume of sound is detected and, if so, execute instructions to monitor ambient light to determine if low ambient light conditions are present and, if so, to determine that the wearer is sleeping and to turn off non-critical monitoring features.

In still other alternative embodiments, the device includes a location detection device and the processor executes instructions to compare location data from the location detection device to stored location data to determine if the wearer is entering a building and, if so, accesses a pressure baseline for the building to offset pressure readings while the wearer is in the building. If an existing pressure baseline is not available, the processor also may execute instructions to enter a pressure sensing mode to monitor pressure changes for a predetermined period of time to establish a pressure baseline, wherein the pressure baseline is used to offset pressure readings while the wearer is in the building.

In still other alternative embodiments, the network interface receives data indicative of the wearer's home location and data indicative of another location, and the processor executes instructions to determine whether data indicative of the other location has been received in the last predetermined period of time and, if not, determines whether data indicative of the wearer's home location has been received and, if so, the network interface ends monitoring for location data. The processor may further execute instructions to query the wearer when the data indicative of the wearer's home location has not been received in a predetermined period of time since data indicative of the other location was last received.

In sample embodiments, the wearable device is part of a system adapted to monitor the physical activity patterns of the wearer and to provide assistance to the wearer when a need for assistance is indicated. In addition to the wearable device, at least one remote computer is provided that is connectable to the device via the network interface. The remote computer is adapted to receive the collected activity data from the device via the network interface for processing to create a parameterized rule-based custom data model for the wearer during a training mode. The parameterized rule-based custom data model is representative of an activity profile of a physical activity pattern of the wearer over time and is provided to the device for comparison to collected activity data during an active or normal (non-training) mode in which the rule-based custom data model is being used. Update parameters of the parameterized rule-based custom data model are also provided from the at least one remote computer to the device during the active mode.

In alternative embodiments, the at least one remote computer may collect activity data from multiple wearers and cluster the data from multiple wearers to create peer groups to wearers. The peer group of a wearer may be used to establish an initial parameterized rule-based data model for the wearer that is updated by the at least one remote computer over time as new activity data is collected to create the parameterized rule-based custom data model for the wearer. Deviation sensitivity of the initial parameterized rule-based data model may be increased as the initial parameterized rule-based data model becomes more customized to the wearer.

In other alternative embodiments, fall data for the wearer is compared to fall data from multiple wearers and, if the fall data of the wearer is significantly different from the fall data from multiple wearers, the at least one remote computer uses the fall data of the wearer to train a wearer-specific fall detection algorithm for implementation by the device. On the other hand, if the fall data of the wearer is not significantly different from the fall data from multiple wearers, the at least one remote computer may train a generic fall detection algorithm for implementation by the device.

In other alternative embodiments, a method is provided for monitoring physical activity patterns of a wearer of a wearable assist device and to provide assistance to the wearer by an at least one physiologic sensor collecting activity data related to a physical activity pattern of the wearer over time, providing the collected activity data to a remote computer, the remote computer processing the collected activity data to create or update a parameterized rule-based custom data model for the wearer, the parameterized rule-based custom data model being representative of an activity profile of a physical activity pattern of the wearer over time, the assist device receiving the parameterized rule-based custom data model from the remote computer, the assist device comparing newly collected activity data to the parameterized rule-based custom data model, and communicating with the wearer via a user interface of the assist device when the comparing of the wearer's newly collected activity data against the parameterized rule-based custom data model indicates that the wearer's activity is not consistent with the parameterized rule-based custom data model.

In alternative embodiments, the method may further comprise the assist device communicating with a medical device to extract sharable data from the medical device and prompting the wearer to take an action when the extracted sharable data indicates that the wearer requires medical attention. The extracted sharable data from the other medical device may include a telemedicine reminder for the wearer to take an action.

In other alternative embodiments, the method may further comprise the remote computer creating the parameterized rule-based custom data model for the wearer during a training mode of the assist device and the remote computer providing updated parameters of the parameterized rule-based custom data model during an active mode of the assist device.

In still other embodiments, the method may further comprise the remote computer collecting activity data from multiple wearers and clustering the data from multiple wearers to create peer groups to wearers. The peer group of a wearer may be used to establish an initial parameterized rule-based data model for the wearer and the initial parameterized rule-based data model for the wearer may be updated over time as new activity data is collected to create the parameterized rule-based custom data model for the wearer. The deviation sensitivity of the initial parameterized rule-based data model may be increased as the initial parameterized rule-based data model becomes more customized to the wearer.

In still other embodiments, the method may further comprise comparing fall data for the wearer to fall data from multiple wearers and if the fall data of the wearer is significantly different from the fall data from multiple wearers, using the fall data of the wearer to train a wearer-specific fall detection algorithm for implementation by the assist device. On the other hand, if the fall data of the wearer is not significantly different from the fall data from multiple wearers, the method may include training a generic fall detection algorithm for implementation by the assist device.

Those skilled in the art may choose to create different embodiments where all the computing functionality for machine learning and behavior pattern recognition and storage described herein can either happen completely on the device itself, can be offloaded to a different device or to cloud infrastructure, and any combination of functions can be performed by the device, different device, and cloud infrastructure together in any desired allocation based on response time, power usage, and the like. All such embodiments are within the scope of the present disclosure.

Other embodiments are discussed throughout this application. Any embodiment discussed with respect to one aspect applies to other aspects as well and vice versa. Each embodiment described herein is understood to be part of embodiments that are applicable to all aspects. It is contemplated that any embodiment discussed herein can be implemented with respect to any method, system or device, and vice versa.

Other objects, features and advantages will become apparent from the following detailed description. It should be understood, however, that the detailed description and the specific examples, while indicating specific embodiments, are given by way of illustration only, since various changes and modifications within the scope of this disclosure will become apparent to those skilled in the art from this detailed description.

DESCRIPTION OF THE DRAWINGS

The following drawings form part of the present specification and are included to further demonstrate certain aspects of the present disclosure. The scope of the disclosure may be better understood by reference to one or more of these drawings in combination with the detailed description of the specification embodiments presented herein.

FIG. 7 illustrates a board diagram of one embodiment of the device.

FIG. 12 illustrates a potential mechanical implementation of the battery pod and device dock.

FIG. 13 illustrates respective power states used for power conservation in a sample embodiment.

DETAILED DESCRIPTION

It should be understood at the outset that although an illustrative implementation of one or more embodiments are provided below, the disclosed systems and/or methods described with respect to FIGS. 1-26 may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In the following description, reference is made to the accompanying drawings that form a part hereof, and in which is shown by way of illustration specific embodiments which may be practiced. These embodiments are described in sufficient detail to enable those skilled in the art to practice the methods described herein, and it is to be understood that other embodiments may be utilized, and that structural, logical and electrical changes may be made without departing from the scope of the present disclosure. The following description of example embodiments is, therefore, not to be taken in a limited sense, and the scope of the present disclosure is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

Subjects living independently or semi-independently, up to the time that the subjects require full-time care, can use the device, systems, and/or methods described herein for daily assistance in a private, non-obtrusive manner (e.g., subtle query by using vibration or private communication). In certain embodiments, even those subjects requiring full time care can benefit from aspects described herein. In certain embodiments the behavioral theme is "unobtrusive assistance with dignity." The technologies implemented herein are chosen to allow the user privacy while assisting in completion of everyday tasks and in maintenance of their safety. Other more intrusive modes may be available to the user if the user so chooses or if circumstances require.

I. Life Assist System

Figure 1:
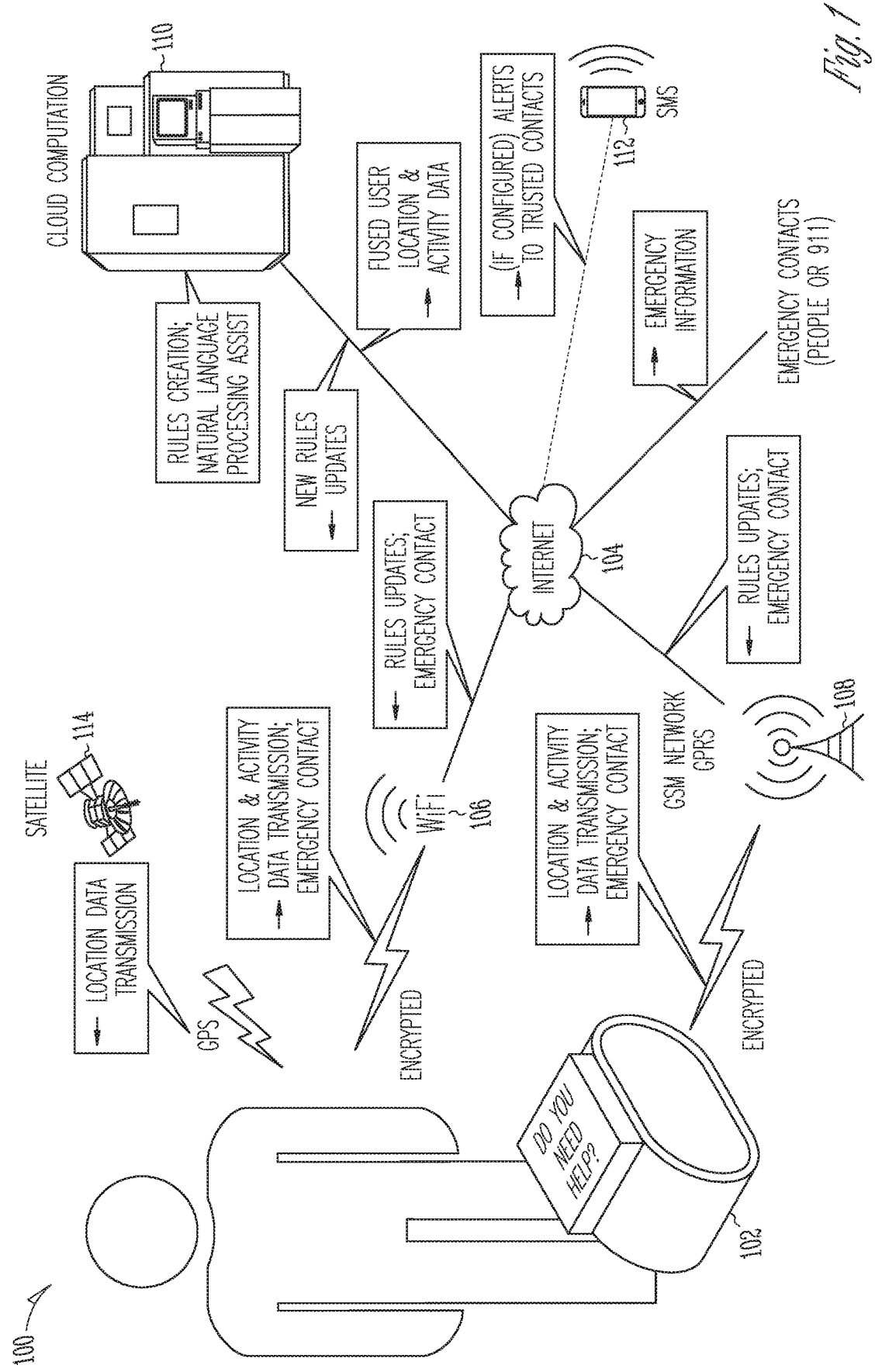
FIG. 1 illustrates a general overview of one embodiment of a life assist system.

Embodiments are directed to a system that assists a subject in aspects of everyday life. FIG. 1 illustrates an embodiment of the system 100 described herein. The system 100 comprises a monitor/communication device ("device") 102 worn by a user. The device 102 can comprise a battery system that allows for charging of the device 102 without removing the device 102 from the user. The device 102 also comprises communication components that access the Internet or other cloud based networks 104 using one or more communication protocols or computer networks, e.g., LTE, HSPA, Bluetooth, local area networks (LAN), and wireless local area networks (WLAN, e.g., Wi-Fi networks) 106, global systems for mobile communications (GSM) networks, general packet radio service (GPRS) networks, the Internet, intranets, 108 and the like. Internet or cloud-based devices can include a cloud computing system or processing center 110, mobile devices 112, satellites 114, telephones, short message service (SMS) systems, and other systems connected to the device 102 by computer networks 104.

As used herein, a cloud infrastructure, cloud information handling system, datacenter and any such reference refers to a facility to house a group of networked information handling systems typically used by organizations for the remote storage, processing, and/or distribution of large amounts of data, and includes associated components, such as telecommunication systems, storage systems, power supplies, environmental controls, and security infrastructure.

For purposes of this disclosure a cloud infrastructure or cloud information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system also can include one or more computer-readable medium for storing machine-executable code, such as software or data. Additional components of information handling system can include one or more storage devices that can store machine-executable code, one or more communications ports for communicating with external devices, and various input and output (I/O) devices, such as a keyboard, a mouse, and a video display. A device and server, there on will be considered as an information handling system.

In certain embodiments, an assistance cloud computing system 110 is operatively connected to the device 102 via network 104. The assistance cloud computing system 110 can provide various programs and analysis to support the functionality of the device 102. In a further aspect, the assistance cloud computing system 110 can provide communication routines or programs to control communications between the device 102 and third-party devices, such as trusted party devices, navigation services, emergency services, and the like. In a further aspect, the assistance computing system 110 can provide routines or programs for learning life patterns of the user as well as detecting deviations from those patterns and detecting emergency situations.

Figure 2:
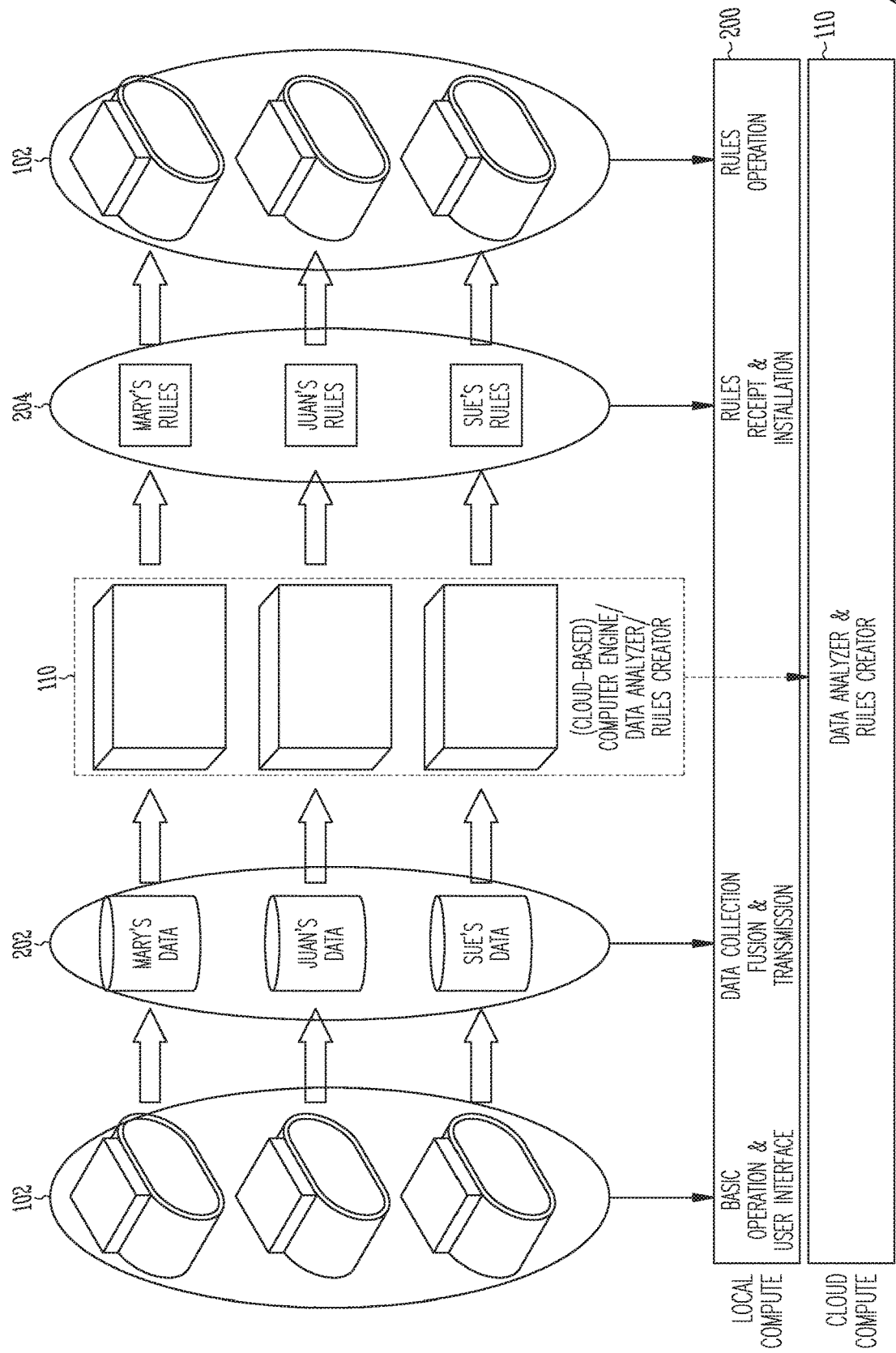
FIG. 2 illustrates a schematic of one embodiment showing some of the functionality and interaction between life assist system components.

The device 102 will conduct certain system functions locally, while the assistance computing system 110 or other systems accessible through computer network 104 conducts other functions. The assistance computing system 110 or other system(s) can provide supporting services or data to the device 102, such as data defining life patterns, back up functions, and the like. FIG. 2 provides a general illustration of an example of workflow in such a system. The device 102 provides for basic operations and a user interface as well as data collection, fusion, and transmission using local computing resources 200. As used herein, fusion is the use of algorithms to combine sensor data such that the fused representation of the data is superior to the individual components. With respect to the device, system, and methods described herein, data is fused from sensors including accelerometers (one or more), a magnetometer, an altimeter, and a gyroscope to get a unified representation of motion in a 3D space. The device 102 transmits collected data to a cloud-based computing system 110 that analyzes the data and creates rules and other programming for implementation and monitoring by the device 102. The cloud-based computing system 110 collects data 202 from respective users and transmits rules 204 to the devices 102 for the respective users and provides for the installation of or adjustment to the appropriate programming on the device 102. The device 102 implements the operation of the rules and the monitoring of the user.

Figure 3:
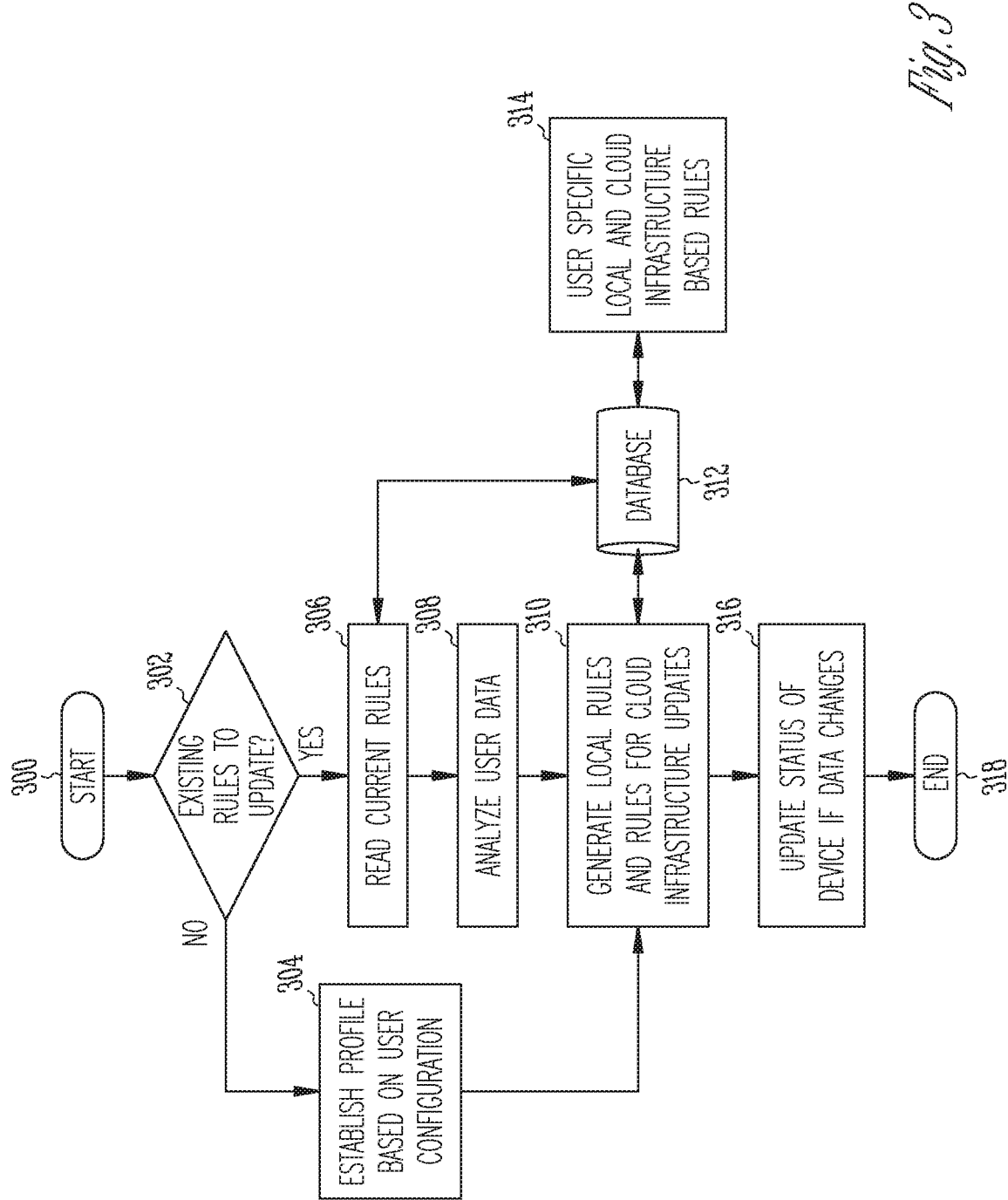
FIG. 3 is a flow diagram for the generation and updating of rules related to the system described herein.

FIG. 3 is a flow diagram depicting the general process of establishing or updating rules, instructions, or procedures that are implemented on a device 102 in a sample embodiment. The process starts at 300 and an initial query in FIG. 3 is evaluated at 302 to determine if the query relates to the status of a rule update. If no rules are available for updating, then the procedures for establishing a profile for the user based on the user configuration data and generating user specific rules are followed at 304. If rules updates are available for existing rules, then the current rules are read at 306 and analyzed at 308 based on historical user data. User data can include, but is not limited to, location mapping over time (e.g., a heat map of location data); identification of a home area; typical location boundaries; sleep/wake cycles; hourly, daily, or weekly location time comparisons, activity patterns, and physiologic measures (e.g., body temperature, blood pressure, pulse, to name a few), and the like. The analysis of current rules or the establishment of a new user is typically followed by generating local or cloud rules updates at 310. Information is stored in a database 312 that is accessed as needed for updating and providing information to the computing system 110 to generate user-specific local and cloud-based infrastructure-based rules 314. The database 312 can be the part of the cloud-based computing system 110. If the local content or parameters have changed, the computing system 110 will identify the user as having a local user update available and will communicate such through the system at 316 as appropriate, and the process ends at 318.

Figure 4:
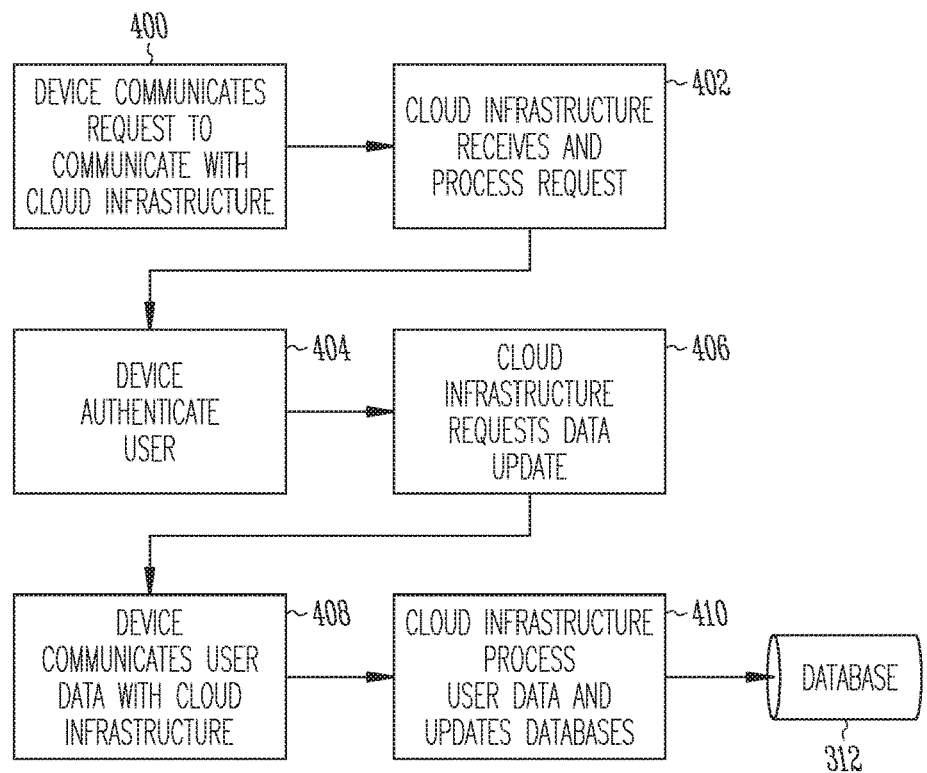
FIG. 4 is a flow diagram depicting the general process of updating a computing device associated with a system described herein.

FIG. 4 diagrams a general process for the device 102 to update the information or request execution of certain programming in the cloud computing system 110. If the device 102 has new information or is programmed to periodically update the information supplied to the cloud computing system 110, it will communicate a request for communication to the cloud computing system 110 at 400. The authentication unit of the cloud computing system 110 will receive and process the request at 402, which may include establishing encryption protocols, identifying the user from which the request originated, etc. Once the request from the device 102 is processed, the cloud computing system 110 will query the device 102 at 404 in order to authenticate the user. The device 102 will provide the appropriate information for authentication. The cloud computing system 110 will request an update to the data at 406, and the device 102 will respond by communicating data to the cloud computing system 110 at 408. The cloud computing system 110 will process the received user data and updates at 410 and store the processed information in database 312. If the cloud computing system 110 determines that user specific updates are needed, the server will initiate communication with the device 102 to implement a device update.

Figure 5:
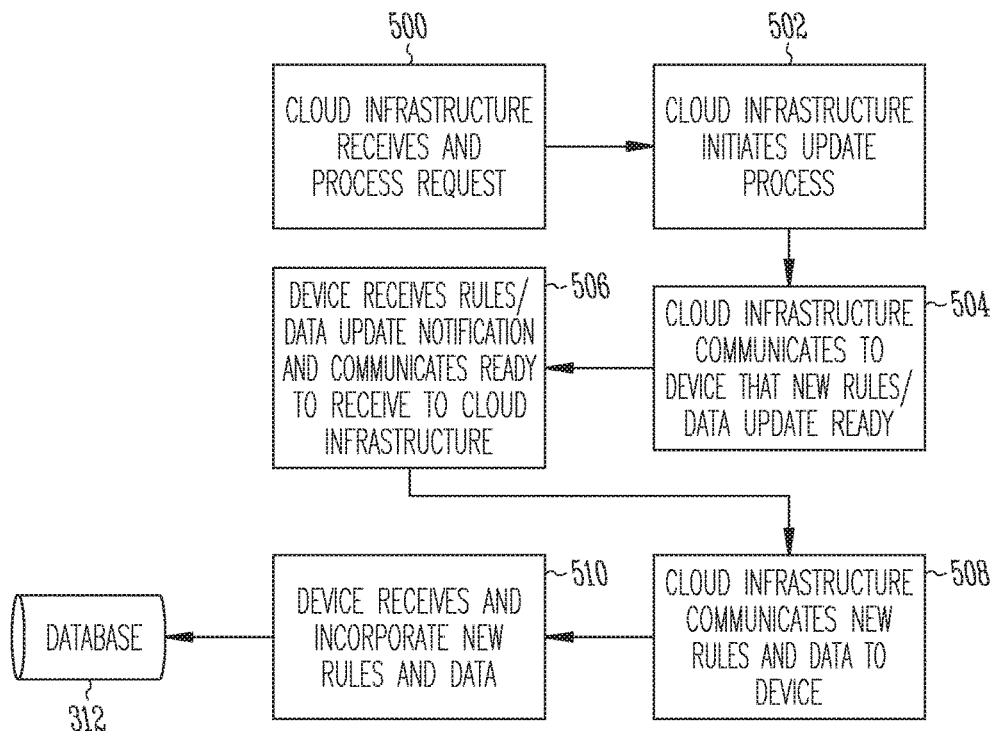
FIG. 5 is a flow diagram depicting the general process of updating a device associated a system described herein.

FIG. 5 illustrates the general process of updating the device 102. The cloud computing system 110 receives and processes a request from the device 102 at 500 and will initiate the device update process at 502 by notifying the device 102 that an update is needed at 504. The device 102 receives the notification from the cloud computing system 110 at 506 and prepares for receipt of an update and notifies the cloud infrastructure that it is ready for the update. The cloud computing system 110 communicates the new data and/or rules to the device 102 at 508. The device 102 receives, incorporates, and implements the new data or rules received at 510. The new data or rules can be stored locally on the device in a device database 512.

II. Monitor/Communication Device

Certain embodiments are directed to a portable device that provides for monitoring of and communicating (monitor/communication device 102) with a subject wearing or in possession of the device 102. In certain aspects, the device 102 provides assistance directly to the user rather than just alerting a caregiver or emergency services. The device 102 is configured to interact with the user and to provide device queries and to receive user input. For example, the device 102 remains in a quiet mode, i.e., using non-audible queries to the user, until user input or circumstances require audible output. The non-emergency query can be set to vibrate until overridden.

Certain embodiments are directed to a device 102 that is worn, is securely attached to the subject (e.g., on the user's wrist), or is continuously in the subject's possession. In other aspects, the device 102 is incorporated into an assistance system 100 that can monitor and/or communicate with a third party and/or the user. The device 102 can comprise a display, a power source, a sensor(s), a communication component(s) (e.g., Wi-Fi, Bluetooth, a speaker, display, vibrator for output, and button(s), touch pad, touch screen, camera, or microphone for input), program storage (control component), and attachment component (e.g., straps, snaps, stretchable band, etc.).

Figure 6A:
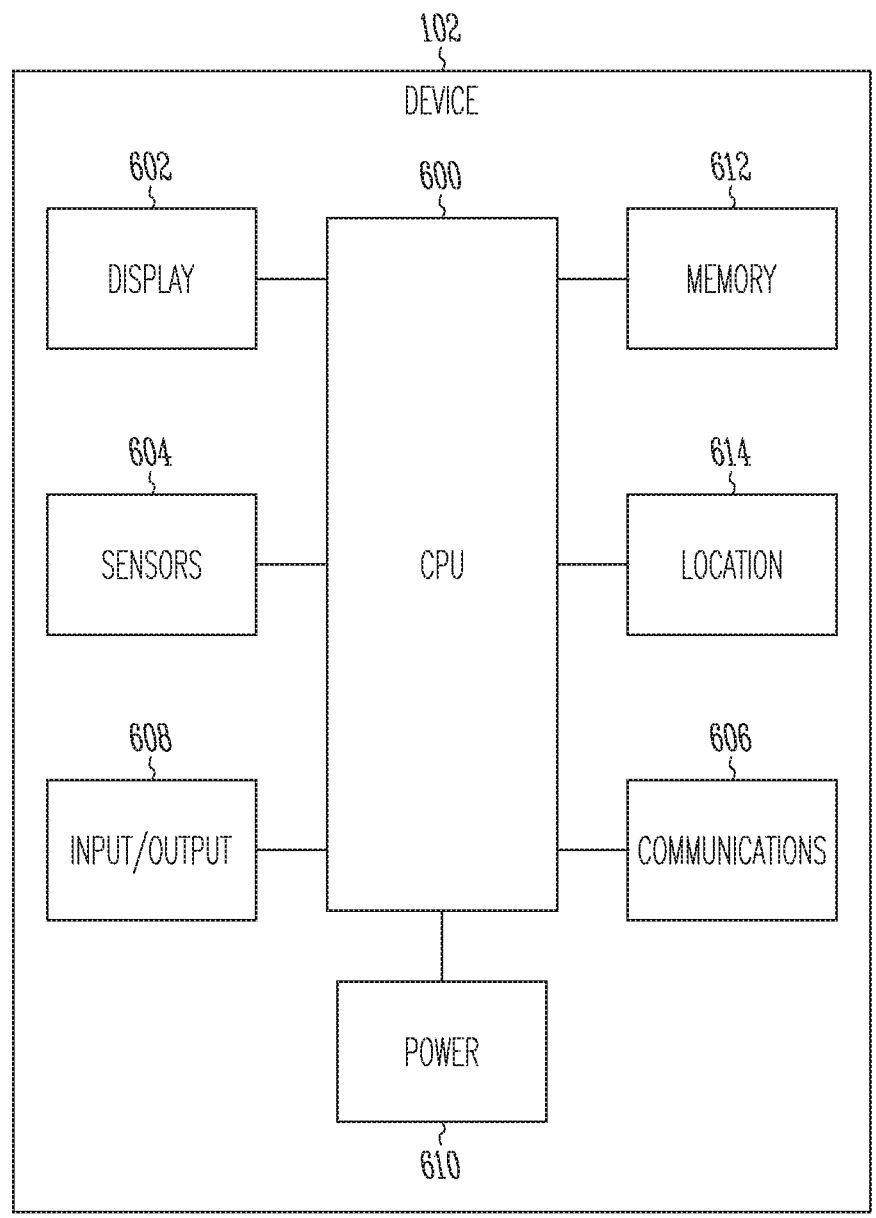
FIG. 6A illustrates a block diagram of one embodiment of a monitor/communication device to be worn by the user in a sample embodiment.

One embodiment of the device 102 can comprise a debugging unit (DEBUG), power unit, global system for mobile communication (GSM) unit, microcontroller unit (MCU), a Wi-Fi/global positioning system (Wi-Fi/GPS) unit, and liquid crystal display (LCD) unit. FIG. 6A illustrates a block diagram of one such embodiment of a device 102. Central processing unit (CPU) or Micro controller unit (MCU) 600 is shown operatively coupled to various components of the device 102. Display 602, which can be an LCD display, is operatively coupled to CPU 600 and configured to provide visual messages or queries to the user. Sensors 604 are operatively coupled to CPU 600. Sensors 604 can include but are not limited to an ambient light sensor, a first 9-axis accelerometer, a second 9-axis accelerometer, a magnetometer, a gyroscope, and a temperature sensor. The sensors 604 can be decoupled or the sensors 604 may be coupled with communications unit 606 and optionally located in a physically different location. The sensors 604 send data to either the cloud computing system 110 via network 104 or directly to the device 102, which connects to the sensors 604 using communication unit 606.

The device 102 can be equipped with a battery status LED configured to provide the status of the battery charge to the user. Input and output component 608 can be incorporated into the device 102, which can be configured to provide user input to CPU 600 or device output via display 602 or other output devices. Input/output unit 608 can be coupled to an audio CODEC and amplifier that is operatively coupled to a speaker and microphone enabling audio output to the user and audio input to CPU 600. In certain aspects, a power source 610, such as a battery, is operatively connected to the device 102. A battery can be configured to interact with a charger. The charger can be a separate charger cradle or accessible via a charging port in the device 102. In certain aspects, one or more batteries can be removed and coupled to a charger cradle or base. CPU 600 is also connected to memory 612. In certain aspects, the memory 612 is flash memory. Global positioning functionality is also provided by a global positioning system or location unit 614. Various components can be connected using antennae as required. The device 102 also can contain various devices or mechanisms for communication unit 606. For example, wireless local area network (WLAN) connectivity can be provided by a Wi-Fi component. A vibrating motor can also be included to provide discreet user prompting via vibration. Telecommunications capability can be provided by GSM/GPRS components.

Figure 6B:
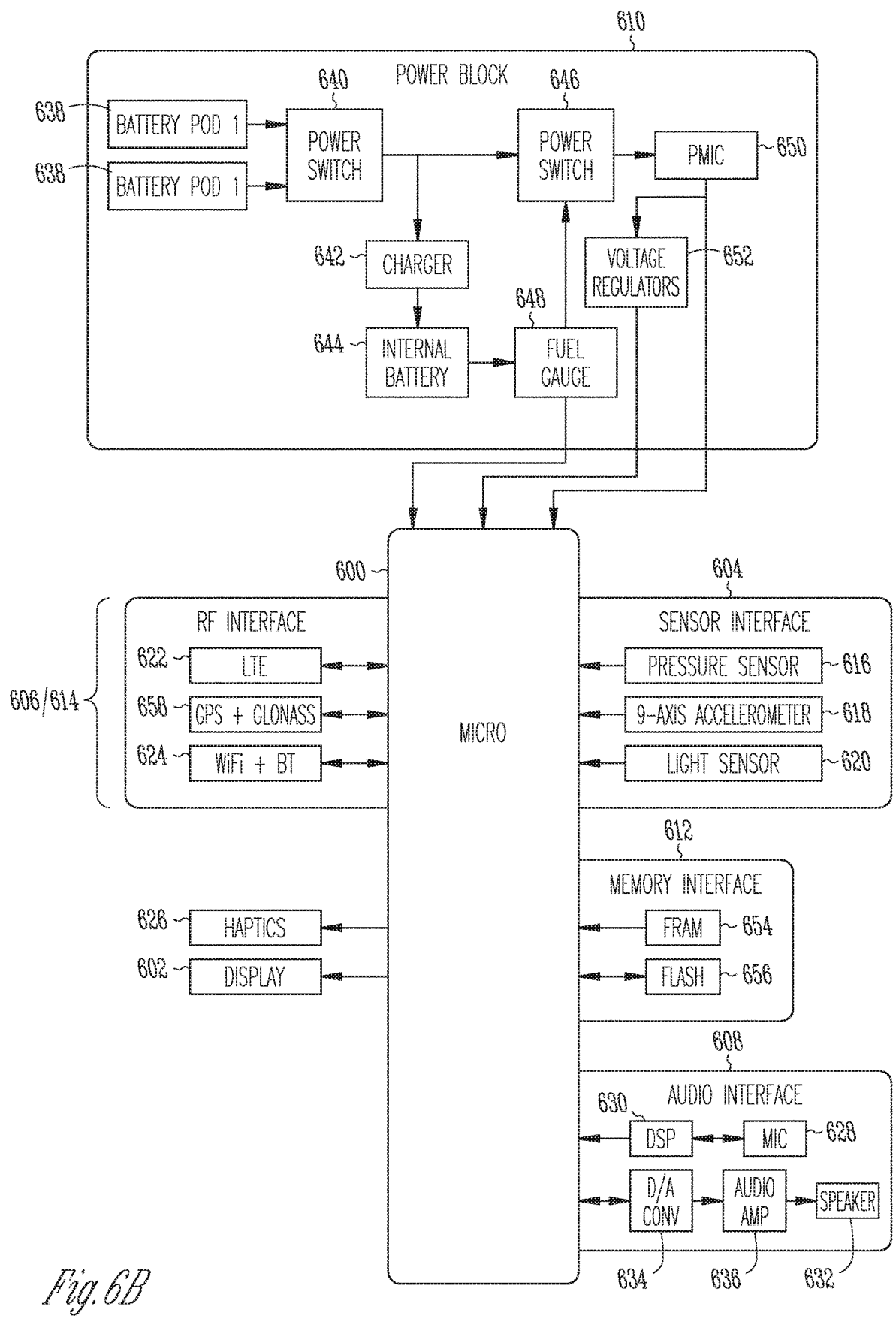
FIG. 6B illustrates a sample hardware embodiment of a life assist device designed to be worn by the user (e.g., in the form factor of a watch) in a sample embodiment.

FIG. 6B illustrates a sample hardware embodiment of a life assist device 102 designed to be worn by the user (e.g., in the form factor of a watch or other wearable device) in a sample embodiment. As illustrated, the device 102 includes a microprocessor 600, a display 602, sensors 604, communication elements 606, input/output elements 608, a power block 610, memory 612, and location unit 614 (e.g., GPS and/or GLONASS and/or cellular-based triangulation and/or Wi-Fi scanning-based location). As illustrated, the sensors 604 may include pressure sensor 616, 9-axis accelerometer 618 (e.g., a 3-axis accelerometer (x,y,z) plus 3-axis gyroscope plus 3-axis magnetometer), and an ambient light sensor 620. The sensors 604 may also include a temperature sensor (not shown). The communication elements 606 may include an LTE transceiver 622, a Wi-Fi/Bluetooth module 624, and the like. The input/output elements 608 may further include haptics element 626, microphone 628 that communicated with the microprocessor 600 via digital signal processor 630, and a speaker 632 that receives audio data from the microprocessor after digital/audio conversion at 634 and amplification at 636. The power block 610 includes at least two battery pods 638 that are connected to a power switch 640 that selectively provides connectivity with a charger 642 that charges the internal battery 644, and a second power switch 646 that selectively provides the battery power from the battery pods 638 or the output of the fuel gauge 648 to power monitoring integrated circuit (PMIC) 650, which, in turn, controls voltage regulators 652 that provide power to the microprocessor 600. The memory 612 may include dynamic memory, such as DRAM, SRAM or FRAM 654, and/or flash memory 656. Finally, the location unit 614 may include a GPS element and/or a GLONASS element 658.

Figure 6C:
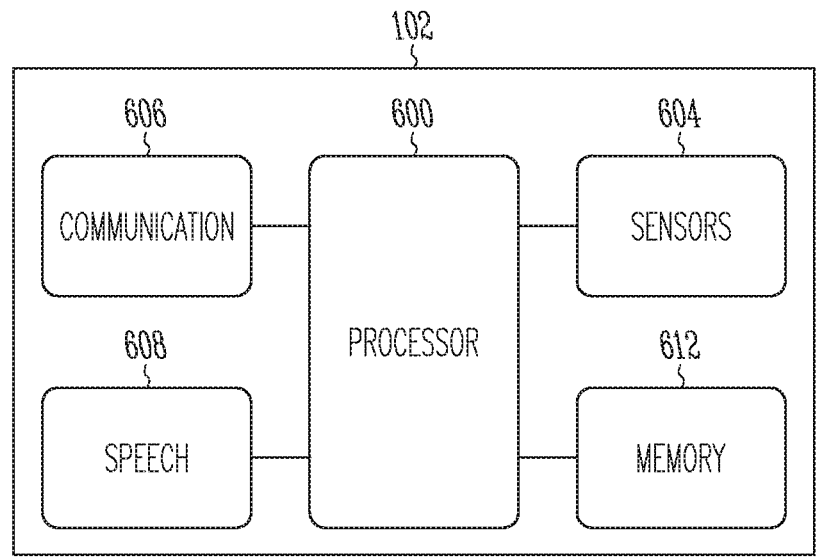
FIG. 6C illustrates a general embodiment of the device where the memory, communication interface, speech interface, and sensors communicate with at least one computer processor.
Figure 6D:
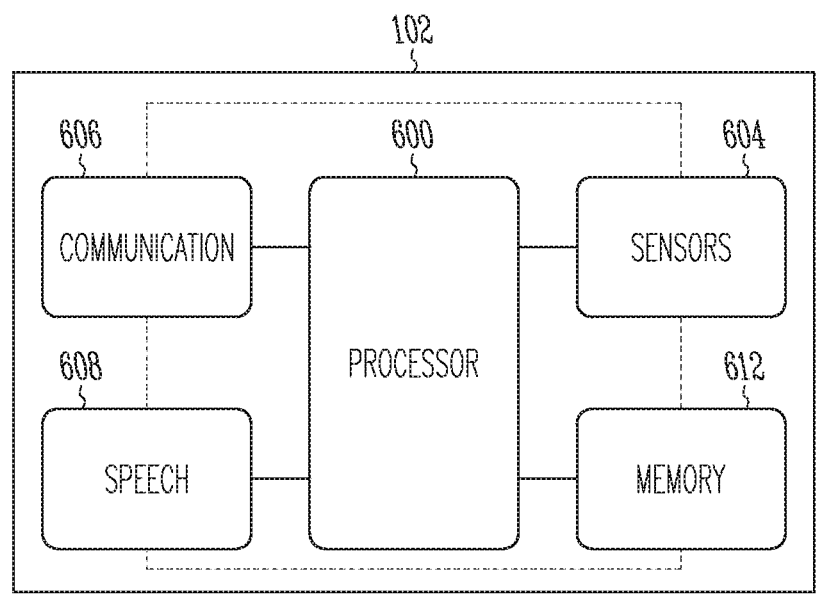
FIG. 6D illustrates another embodiment where each unit can access each other unit without the processor being involved.
Figure 6E:
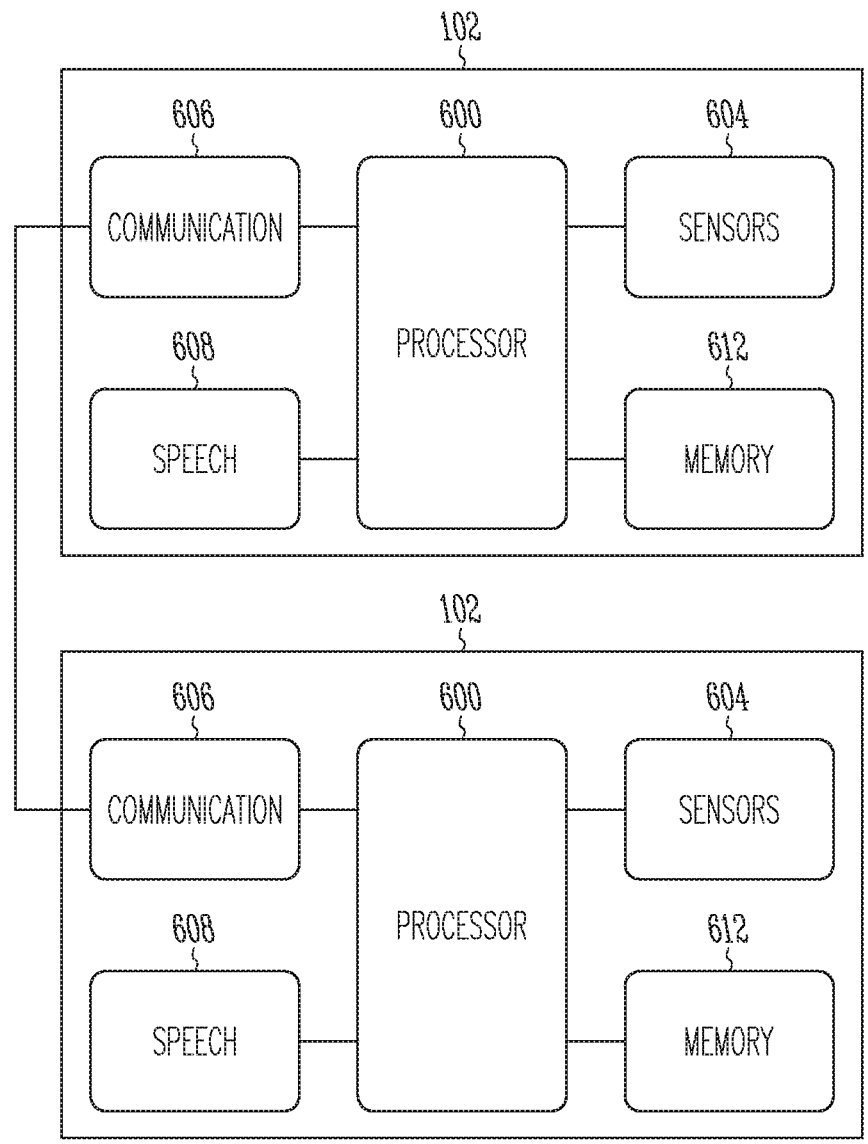
FIG. 6E illustrates an embodiment where the device communicates and shares data with another device.
Figure 6F:
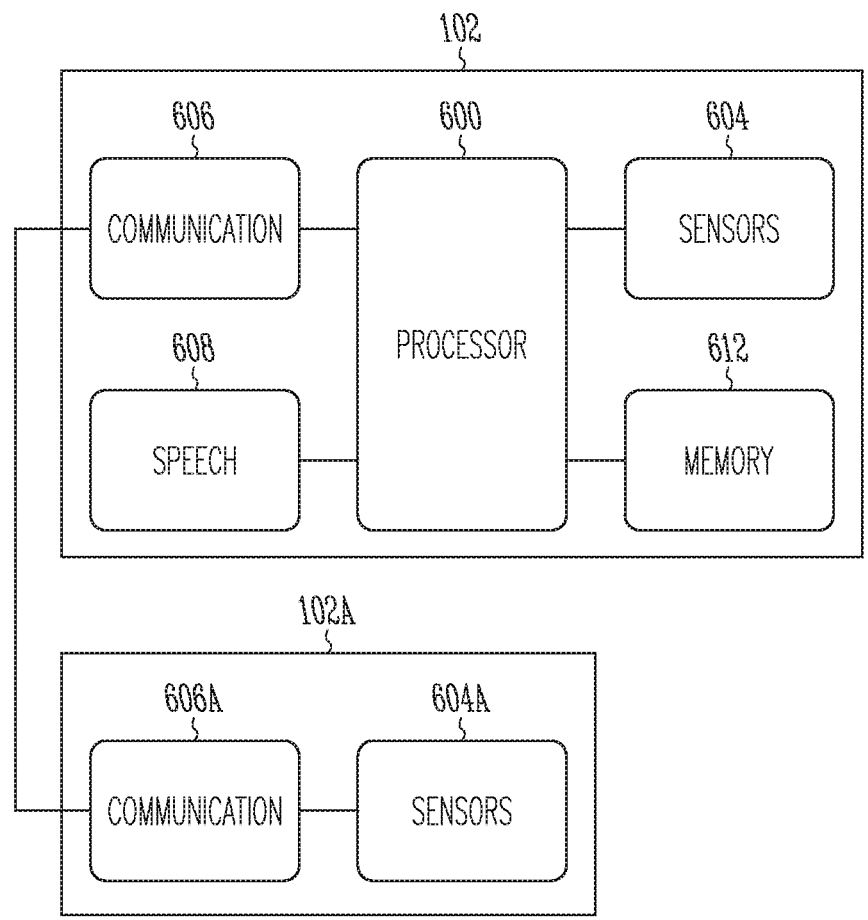
FIG. 6F illustrates another embodiment where sensors are located remotely and can share information with the device.
Figure 6G:
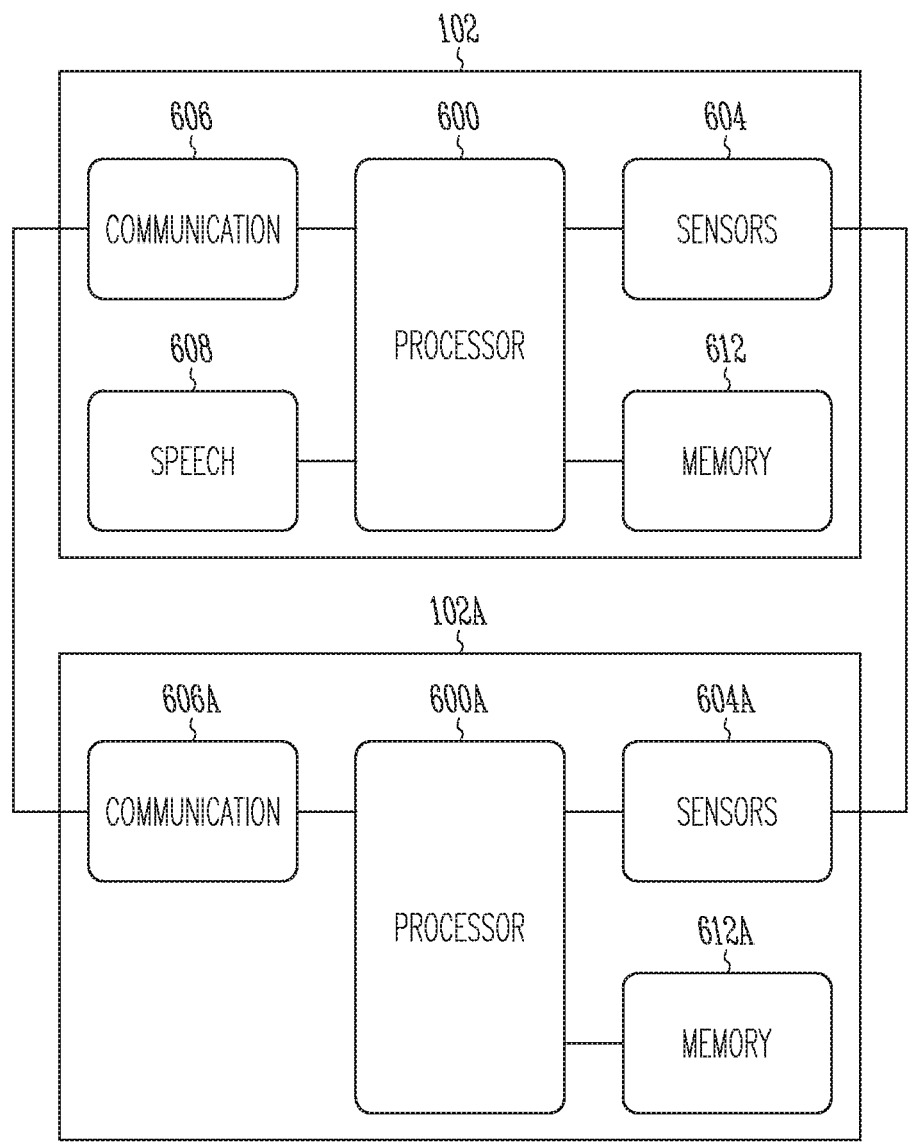
FIG. 6G illustrates another embodiment where the remote device does not need a speech processing unit.
Figure 6H:
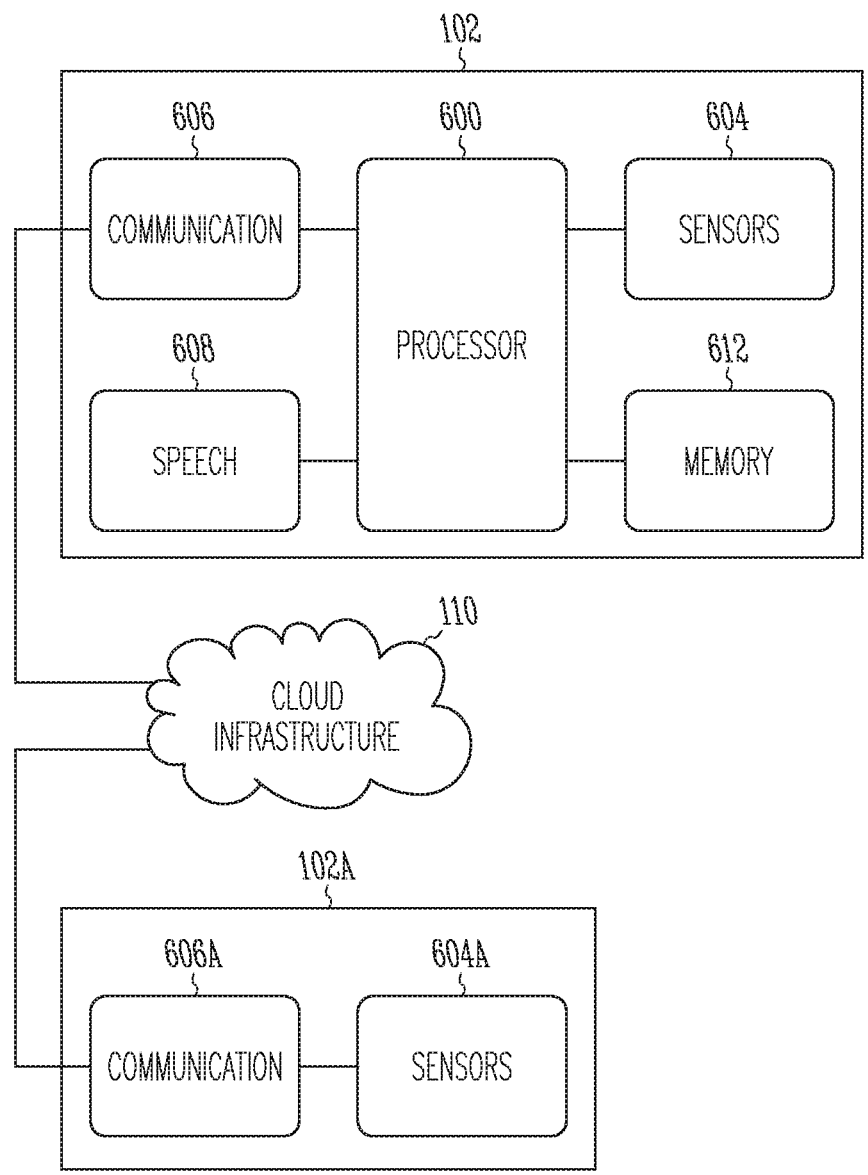
FIG. 6H illustrates an embodiment where remote sensors can interface directly to cloud infrastructure while the device is also connected to the cloud infrastructure.
Figure 8:
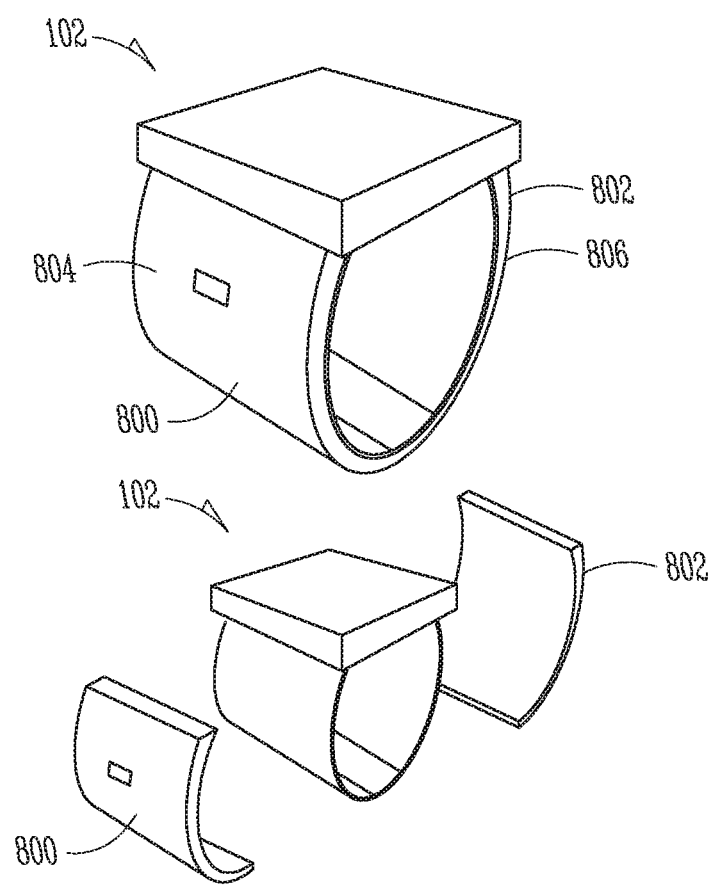
FIG. 8 illustrates one embodiment of a battery system for the device.

FIGS. 6C-6H recognize that the functionality described with respect to FIGS. 6A and 6B may be implemented in a variety of configurations. For example, FIG. 6C shows the embodiment of FIGS. 6A and 6B where the sensors 604, memory 612, communication unit 606, and input/output speech unit 608 all communicate with each other via the microprocessor 600. FIG. 6D recognizes that the sensors 604, memory 612, communication unit 606, and input/output speech unit 608 may communicate directly with each other independent of the microprocessor 600. Also, as shown in FIG. 6E, two devices 102 may be configured to communicate with each other. In certain embodiments, the sensors 604, or the combination of the sensors 604 along with communication unit 606 and/or memory 612, and/or the processing unit 600, can be decoupled from the device 102 and can be located remotely as illustrated in FIGS. 6F and 6G. In such cases, the device 102 can use its communication module 606 to connect with the communication module 606a of the sensors 604a (FIGS. 6F and 6G) and obtain the information from the remote device 102a. The two communication units 606 and 606a can connect either using a wired mechanism such as, but not limited to, an Ethernet bus, or they can communicate using a wireless interface such as, but not limited to, Wi-Fi, Bluetooth, GSM, etc. In still other embodiments, the device 102 can directly connect to the cloud computing system 110 and so does the sensor unit 102a, as shown in FIG. 6H. Cloud computing system 110 can then either bridge the connection or can store and process the data gather by the sensors 604a and pass either the processed data and instructions to the device 102 or send the raw data to the device 102. Similarly, another embodiment can have the two devices connected together directly or via the cloud computing system 110 to share information. Anyone in skill in art will recognize that in all the embodiments, power unit 610 is required for operations.

Certain embodiments are directed to a device 102 configured as a wristband. In certain embodiments the wristband can comprise a low power display, user-changeable rechargeable batteries, personal sensor components, and communications components.

FIG. 7 illustrates a board diagram and layer diagram of one embodiment of a device 102 in a sample embodiment. As illustrated, the device 102 can have a top and a bottom layer. In certain aspects the bottom layer is a battery and power layer 700. The battery and power layer 700 can contain battery 701 (e.g., a lithium battery), a vibrating motor 702, a network connector 704, and provide for connection with one or more other layers of the device 703. In certain aspects, the device 102 can comprise a second telecommunication layer 710 comprising a GSM component 711, a micro SIM 712, an antenna 713, and provide for connection with one to more other layers of the device 714. The device 102 also can have a controller layer 720 comprising a CPU/MCU 721, one or more speaker components 722, an audio component 723, a 9-axis accelerometer 725, and provide for connection with one or more other layers of the device 724. The device 102 can also include a fourth Wi-Fi/GPS layer 730 that comprises a Wi-Fi antenna 731, a Wi-Fi component 732, a GPS component 733, a GPS antenna 734, and provide for connection with one to more other layers of the device 735. The top layer 740 may comprise a display screen 741 and various switches 742 and/or user interaction capability. The device 102 also can include a breakout board for inclusion of additional components and engineering debug usage.

In certain aspects, the device 102 is to be worn continuously. As such, the device 102 is durable enough to endure falls, bumps, weather, bathing, and the like. In certain aspects, the device 102 is waterproof to the extent it can withstand daily hand washing, bathing, showering, and aquatic exercising.

The device 102 is powered using a rechargeable battery system. In certain aspects, the battery system is configured to allow the wristband to stay on the user at all times. In certain aspects the battery system is configured so the user does not need to remove the device 102 for charging. One reason for this configuration is that once a user takes the device 102 off, it rarely goes back on. In one aspect, the device 102 can provide for plug in charging while still attached to the user. In other aspects, the battery system can be configured as a battery swap mechanism having two battery systems, internal and external, wherein the external battery system can be removed and recharged while the internal battery system powers the device. In this configuration, there can be multiple interchangeable batteries that can be used to power the device 102 on a continuous basis. The battery change mechanism can be configured such that it can be performed with one hand. In certain aspects, the external battery system includes two (or more) batteries 800, 802 (FIG. 8), herein referred to as "pods," on the wristband. Each pod 800, 802 has an LED 804 indicating the level of charge. When a pod 800, 802 is yellow or red, the user pulls a tab to remove that pod, and replaces it with a charged one. A pull-tab allows the user to complete the entire battery replacement operation using one hand. At all times, the wristband has power through the second (or more) pod. A charger and additional battery pods can be provided with the device 102. As explained below, a split transformer 806 may be provided to allow for the separate operation of the pods 800, 802. In another embodiment, the device 102 can also notify the user with an audio or visual mechanism when the pods 800, 802 need to be replaced with a charged set. Cloud computing system 110 can also learn the usage behavior of the wearer and the device 102 itself and may monitor the state of the charge and provide reminders for recharging the pods 800, 802.

In certain aspects, a low power display 602 can be a liquid crystal display (LCD), backlight or light emitting diode (LED) display, Organic LED (OLED) display, Memory-in-pixel (MIP) display, or e-paper display. In one aspect, the display 602 is capable of displaying a status symbol. The status may be displayed while in standby mode, upon the occurrence of certain events, or in response to an inquiry. In certain aspects, the status symbol can include a color indicator. The status indicator can include green for all is good, yellow for uncertainty, and red for emergency mode. Other colors and indicators can be used in conjunction with various states and circumstances that a user may encounter or be involved in. In certain aspects, the device 102 can display various other information when in a standby mode, such as, but not limited to the time, date, task list, etc.

In certain aspects, the device 102 integrates a speaker 632 for audio out and a microphone 628 for speech input. In certain aspects, the speaker 632 may be incorporated into the strap such that the strap acts as an audio chamber to increase the volume and improve tonal quality. The device 102 also can be configured to connect wirelessly (e.g., via. Bluetooth) to the user's hearing aid to provide discreet audio out capability. In a further aspect, the device 102 can incorporate a vibration mechanism 626 (e.g., similar to a cell phone on "vibrate mode"). The output mechanisms, such as audio and vibration, can be used to communicate with or provide feedback to the user. Devices 102 described herein can comprise 1, 2, 3, 4 or more input mechanisms. In certain aspects, the device 102 comprises at least 1, 2, 3, 4, or more user input buttons or touch pads. In certain embodiments, the device 102 comprises at least two user input buttons or touch pads 742. In a further embodiment, at least one user input button or touch pad 742 is located below the display. In a further embodiment, the user input button(s) or touch pad(s) 742 are explicitly not located at the wrist/hand sides of the display, because that location requires dexterity for manual presses and also increases the likelihood of unintentional presses. In a further embodiment, the device 102 utilizes accelerometer sensors as a gesture-driven input mechanism and has no user input buttons or touch pads. A wrist worn device 102 can be configured to be worn and operated on either the right hand or the left hand of a user.

The device 102 can be programmed or configured to perform a number of functions including but not limited to one or more of providing a medical alert based on personal sensor data and/or user input requests, directional guidance, providing medication reminders, providing personal health test reminders (e.g., daily weight for heart patients, blood pressure tests for hypertensive patients, blood oxygen tests for chronic obstructive pulmonary disease (COPD) patients, blood sugar tests for diabetics), providing doctor appointment and/or pharmacy reminders, audible instruction or inquiry, and audible user input.

The device 102 can be programmed for various operational modes, including but not limited to a training mode, normal active mode, low-power assist mode, high-power assist mode, and emergency override mode.

III. Configuration Options

Because people's needs, expectations, and requirements for support vary, there are a number of configuration options relating to sensitivity settings, emergency contact behaviors, location tracking behaviors, and medical compliance information.

The initial configuration options can be defined using a web-based interface using a unique identifier for the device 102 to be configured, e.g., the serial number of the device 102. The initial configuration can include the setting of passwords and password recovery questions to avoid hacking. Users and their families can configure and modify the settings or a third party can be employed to aid in the initial and subsequent configuration.

In certain aspects, the device 102 is configured to communicate via a wireless local area network (WLAN), e.g., a Wi-Fi system. In a further aspect, the device 102 will communicate, when appropriate, via the user's home WLAN. Any number of WLAN router or systems can be used, such as an Apple Airport Express™. The configuration options can include, but are not limited to one or more of the following:

A. Device Name

In order to enable verbal instruction reception, the device 102 needs to know the user is addressing the device. A default name such as "AudibleAssist" can be pre-configured. The user can change the pre-configured device name, e.g., the user can name the device "Fred". Speaking the name of the device 102 would engage the device 102 to receive verbal input(s).

B. Location

Various modes of location identification can be set. For example, the device 102 could be set to allow continuous transmission of location to a trusted group or at pre-determined times, during emergency mode, or not to transmit location. Other configurations of the device 102 can allow a user to provide a password for enabling retrieval of location information by a trusted group. The system 100 can also contact trusted group members by email to provide links for location access. As used herein a "trusted group" is a configurable group of people or organizations that are allowed access to the device 102 and system 100, for example family members, caregivers, and law enforcement. Emergency medical services providers can be given access to the device 102 and system 100 during an emergency, using identification information that ensures that they are present with the device user. If configured as such, the trusted group is contacted during emergency mode with location information. The mechanism of contact can be computer-generated phone call, text message, email or any other communication method that can be programmed or directed by the device 102 or system 100. In certain configurations, the location is always provided to emergency medical personnel when medical alert mode is activated, regardless of the privacy settings.

C. Medical History

The device 102 can be configured to provide various aspects of the user's medical history. Medical history can include data to assist emergency medical personnel, such as physician contact information, medications, or allergies. Limited access to medical history can be provided by an access key that can be vetted by the system 100. A person entering a valid key will be allowed access to the medical history. In certain aspects, a key code can be provided on the device 102. The key code can be entered via a web interface or provided through other communications mechanisms such as a phone call and if the device 102 and/or the person requesting access is registered then that person is allowed access to medical history. In certain aspects, the key can be activated by other events monitored by the device, such as an emergency alert or a medical alert, otherwise the use of the key will not allow access to medical history.

D. Sensitivity

Various thresholds for the various functions of the device 102 can be set to accommodate user characteristics. These thresholds will help in identifying aberrant activity and distinguish from normal variances in patterns to minimize false alarms. Parameters to be considered in setting sensitivity include but are not limited to age, activity level, gender, weight, and current restrictive issues. Questions may be presented to the user upon setting up the device 102 in order to synthesize the appropriate level of sensitivity for the device 102. The sensitivity level indicates the likelihood that the user will need assistance and thus influences how long the device 102 or system 100 waits for a response in a suspected emergency. The sensitivity setting can also be used in determining the amount of deviation from normal patterns before the device 102 or system 100 queries the user.

E. Compliance Features

In certain embodiments, compliance features can be included. An individual can configure the compliance features in the device to meet their specific needs. As an example, an individual may choose to enable or disable drug reminder compliance features. In certain embodiments, compliance features can be mandatory. For example, this aspect can be used for an individual having a high-risk for adverse event(s).

F. Privacy Factors

In keeping with the behavioral theme of unobtrusive assistance with dignity, most privacy settings are controllable through configuration. In addition to those settings that are configurable, data being transmitted to and from the device 102 (such as location data) can be encrypted.

IV. Functionality and Methods of Use

Various functionalities can be included in various embodiments of devices, systems, and methods described herein.

A. Communication Mode

Figure 9:
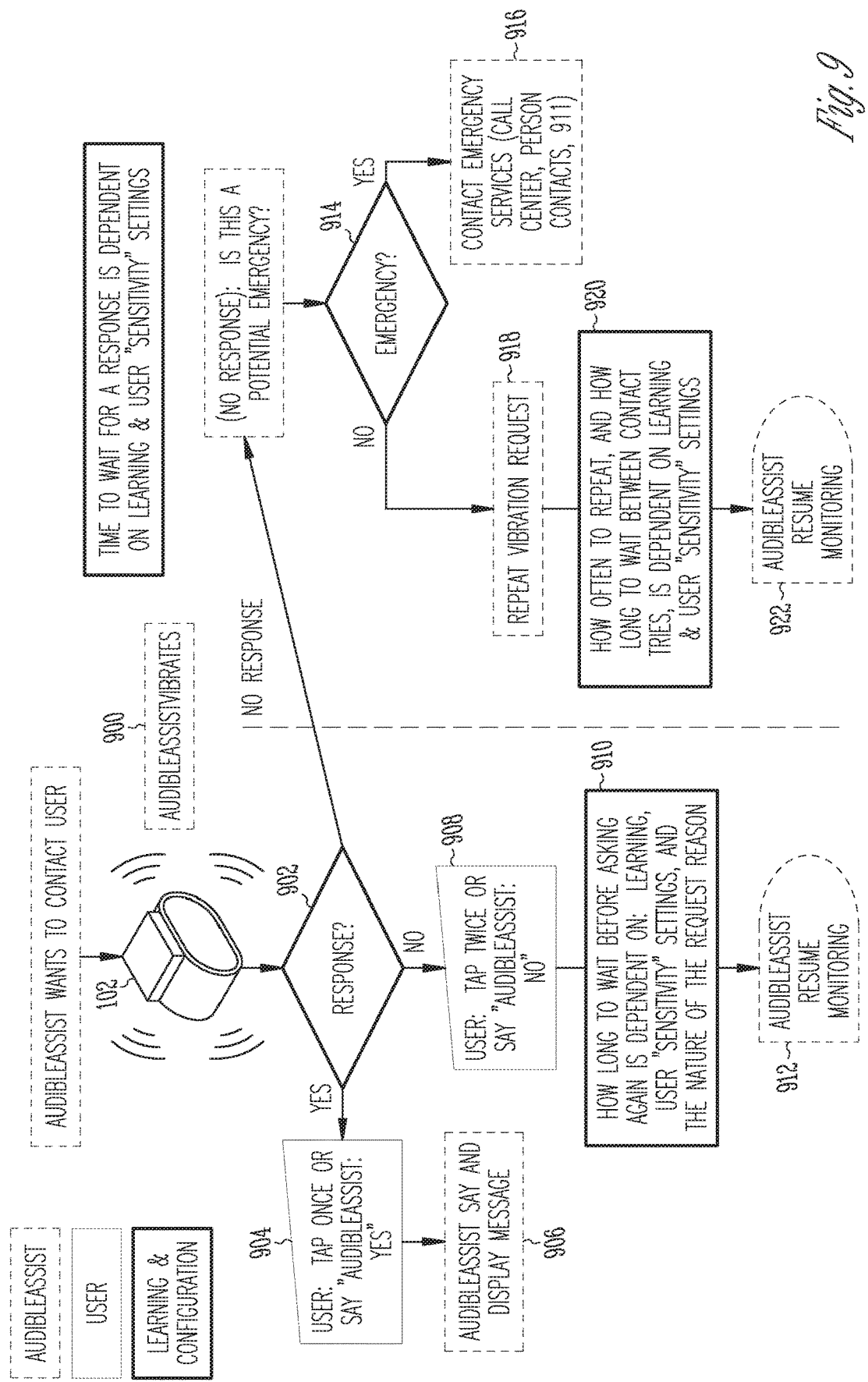
FIG. 9 illustrates certain aspects of the system functionality in a sample embodiment.

The device 102 can be configured to communicate with the user. As shown in FIG. 9, the device 102 may query the user at 900 by vibrating and waiting for a response from the user at 902. The user can press a button once for yes at 904 indicating the user is in a situation in which the user is able to communicate with the device 102 resulting in communication from the device 102 via visual or audible communication at 906. If, for example, the user was in a situation in which it was inconvenient to communicate, the user could press a button twice at 908 to indicate do not communicate at that time. This feature allows the user to control the timing of communications and may help reduce embarrassing or inappropriate communication, thus helping in maintaining the user's dignity.

Another option that can be configured separately or in conjunction with the vibration indicator is a verbal response detector. The device 102 can be configured to receive a verbal user response such as "AudibleAssist: Go ahead" or "AudibleAssist: Not now". The verbal response mode can be used as a hands-free communication method that does not involve the physical touching or pushing of a button(s). In certain embodiments, a touch sensitive pad can be incorporated and configured to recognize various hand or finger gestures that are correlated with a response, for example, a swipe read by the touch sensor might suffice for yes/no. In other aspects, a single finger swipe may indicate yes and a two-finger swipe may indicate no. In still a further aspect, the direction of a swipe can indicate a response, for example a swipe away from the user may indicate "no" or a negative response, and swipe toward the user may indicate "yes" or an affirmative response.

The time between device query and expected user response can be set at 910 using a configuration menu. This time for response setting can be based on a number of considerations, including the device's mode of operation, previous times for response (e.g., the learned response time window (typical response times for this user)), and configured "sensitivity" setting (pre-determined response time). After a designated period of time, the device 102 may resume monitoring at 912. In suspected emergency situations (e.g., accelerometer suspects a vehicle crash), the response time will typically be relatively short, as the user may not be conscious and therefore would be unable to respond in such situations. In non-emergency assistance situations, the response time setting can be relatively long including ignoring the query altogether. Thus, in a non-emergency setting a user could respond with a yes communication or ignore the query to establish a do not communicate response.

On the other hand, if no response is received and a potential emergency is expected at 914, the device 102 contacts emergency response services at 916, which may include medical call centers, emergency services such as 911, or a user's personal contact list for notification. If an emergency is not expected at 914, the vibration request is repeated at 918 and the device 102 waits a predetermined amount of time at 920 for a response, using the same considerations as noted above with respect to step 910. After a designated period of time, the device 102 may resume monitoring at 922.

Data obtained by the device 102 over time in conjunction with data provided by the user can be used by the device 102 or system 100 to establish hourly, daily, weekly, monthly, or yearly life patterns for a user. The device can send a query to the user when an aberration or break in one or more patterns is detected. Each aberration or break can be categorized either by default, past experience, or user determined urgency. The device 102 will act as appropriate given the urgency assigned to the detected event. Those events associated with a higher level of urgency will be associated with a more rapid and escalating response to an ignored device query. In certain aspects, the response to a query can include instruction to ignore the aberration or break for a period of time. For example, perhaps the user is visiting relatives over the holiday. The location of the individual may register as an aberration or break and trigger a device query. The device 102 can be configured to allow the user to respond to the query and indicate this aberration or break be ignored for the extent of the trip.

User responses to a device query can be in the form of a verbal and/or touch response. When users want to speak to the device 102 they can either press a button 742 to activate a microphone or by addressing the device 102 with one or more key words. Once activated, the device 102 or system 100 will follow with a series of queries to define the assistance needed. For example, a user in need of emergency assistance can press a button during training mode or normal active mode and the device 102 can respond by displaying and/or audibly asking the user "Do you need help?" If the user responds verbally or with a touch indicating "yes," the display 603 and/or speaker 632 will ask, "Call 911?" If the user responds with a "yes," the device 102 will follow either a default response or a user determined response to a 911 request.

The routines and key words for communicating with the device 102 can include default and user defined words or phrases. Trigger words may be used to activate the communication mode. In certain embodiments, verbal commands are preceded by the device's name, which is set during initial configuration of the device 102. As mentioned above, the default name can be "AudibleAssist" or some other manufacturer determined name. Commands may include "Help" followed by one or more queries to determine the type of help, e.g., determine if a trusted person needs to be contacted, if 911 should be contacted, if location needs to be communicated, and/or if any additional data needs to be provided to the user; "911" for contacting 911 and providing any data needed for emergency response; "Directions home" for providing direction to the user's home (in certain aspects other destinations can be included that would replace the word "home" in the query); "Speak to (a particular person or call a particular phone number)" for example can initiate a voice over internet protocol (VOIP) call to an agent); "yes" conveying affirmance of a device query; "go ahead" or "speak to me" to activate or allow audible communication with the user; "no" conveying a negative response or decline of a device query; and "not now" or "don't speak to me right now" conveying a need to delay audible communication with the user. Any number of device query/response routines can be programmed.

In another embodiment, the device 102 also may be networked to available emergency systems like a home alarm, which can also be triggered when assistance is needed. The device 102 can also be coupled (wired or wirelessly) to other medical systems like, but not limited to, a blood pressure monitor and/or a glucose monitor, which can use the communication module of the device 102 to upload their data to the cloud computing system 110. The algorithms running in the cloud computing system 110 can then utilize this data to monitor for behavior change and to predict and prevent life threatening incidents. One example of such action will be where algorithms learns the blood pressure for the user before and after an exercise, with and without the lack of sleep, predicting that with extend lack of sleep and extraneous workout could harm the user. A query can then trigger notifying the user in the middle of a workout, for example, that further continuing the workout will bring the blood pressure to a dangerous level. Activities like workouts can be determined by the sensors 604 of the device 102 or through other fitness tracking devices.

In certain embodiments, a user's speaking the device name will trigger a recording mode that records while local speech recognition identifies key words. If no key word is detected, the recorded audio can be sent to the cloud computing system 110 for natural language processing. If it is still not possible to figure out what the user said, the recorded audio is sent to an agent for human processing.

B. Training Mode

A training mode is initiated when the device 102 is new to a user, after a "Reset to factory defaults" selection, or when another life event occurs such as transitioning to a mobility aid. In training mode, the device 102 performs a subset of functions such as emergency medical alert functions. The training mode includes a training period where the device is accumulating data and learning the "personality" of the user, which may include logging daily activities, and creating a knowledge base of user-specific typical behaviors and patterns. Training mode is initiated or the training period begins with an initial download of configuration options. The initial specification for the training period can be based on a default setting or a user determined time period. In certain aspects, the training period is at most, at least, or about 1, 2, 3, 4, 5, 6, 7, 8, 9, 10, 11, 12 or more weeks or months, including all values and ranges there between. In certain aspects, the default training period is one, two, or three weeks. During the training period, the device 102 will not query or "speak" to the user except as needed in suspected or known emergency medical alert situations.

Data during and after the training period is collected, summarized, and transmitted to the cloud-based computing system 110. Engines in the cloud computing system 110 analyze the data and create or update behavioral rules for users. When rules have been created or updated, they are automatically and autonomously downloaded to the user's device without interruption of functionality.

During the training period and periodically thereafter, the sensor and location data from a particular user device 102 is analyzed to determine what rules are appropriate for that user. The data analysis is primarily conducted in the cloud computing system 110. The analysis creates a map of typical user locations, behaviors, and activities. The map includes sensitivity-based (from the user's sensitivity inputs during configuration) fuzziness for a particular user's rules that account for normal variations in the data. Examples of such rules are provided in the following scenarios:

Scenario A—A user typically wakes up and wanders around her home between 7 am and 9 am, and her sensitivity level is moderately low. If it's 11 am and the device has not detected wakeful movement, the device 102 will send a device query (i.e., ask to communicate or speak with her) to confirm she is okay and not in need of assistance. If a satisfactory response is not received, the device 102 can signal the system 100 to initiate the appropriate procedure, such as a welfare check.

Scenario B—A user typically goes to the grocery store on Thursday afternoons. One Thursday afternoon, he goes to the grocery store but then turns left out of the grocery store parking lot. Typically, on Thursdays he turns right out of the grocery store parking lot. A device query will be generated that ask to communicate or speak to him to determine if he needs assistance. Perhaps he has temporarily forgotten that to go home he must turn right. The device 102 can provide directions or contact help as needed.

Scenario C—For embodiments including compliance functions, rules also include notification and active acknowledgement of compliance requirements (e.g., take drugs, take health-related measurements, etc.).

C. Normal Mode

Normal "active" mode is the most common mode of operation. In normal mode, the device 102 is scanning sensors 604 for emergency situations, checking behaviors and locations against locally stored personal behavior patterns (local rules), and is available for user input requests for assistance. Normal mode conserves power as much as possible, based on recent activity and user history.

In certain embodiments, the device 102 can be configured to monitor the motion and movement of an individual. The system 100 can use local and cloud computing to assess cognitive and physical impairment based on the data collected regarding the motion and movement of the subject wearing the device 102. In other aspects, the device 102 can monitor battery replacement by the user and incorporate that data into assessment of user's cognitive and physical functions.

D. Medical Alert Mode

One feature that can be included in a device 102 or system 100 is the medical alert mode. There are a number of ways to enter the medical alert mode, including sensor data indicating that a medical alert is likely (e.g., accelerometer detects a fall or a car crash), user touch input indicates a medical alert situation, and/or user voice input indicates a medical alert situation. If the medical alert is triggered by sensor data, there is a short period of communication with the user to determine if there is a need for assistance. If the user does not respond to a request to communicate, then emergency services are contacted (e.g., 911) is contacted. If the medical alert is triggered by the user, the system 100 may first ask if they want 911 assistance, or for their trusted contacts to be contacted. If the answer does not make sense or otherwise indicates an emergency situation, or the answer is incompletely provided (they say "no" to 911, but then do not respond to the trusted contacts question), then 911 is contacted. In the event 911 is contacted, standard procedures for contacting 911 are programmed based on the location of the user and followed by the device 102 and/or the system 100.

E. Data Reception Mode

In certain embodiments, various data can be pushed to users, e.g., weather warnings, health warnings, personal messages, care-giver messages, or other types of data that may be useful to the user. In certain aspects, the types of data pushed to the user can be customized by the user by altering the configuration options of the device 102 or system 100.

V. Power Modulation

In a certain embodiment, depending on user behavior, a device 102 described herein can operate in different power domains. FIG. 13 illustrates various power states used for power conservation, where "data processing" indicates where the computational activity is occurring: "little" is computation in the AudibleAssist device 102, and "big" is computation that occurs on cloud computing system 110. In an emergency—power states "High Assist" and/or "Exception"—the device 102 will maintain communications with the user and emergency services without regard to conserving battery power. Not all user interaction in the "High Assist" or "Exception" power states result in a 911 request for assistance. However, if the device 102 is in "High Assist" or "Exception" power state and power reserves are low, it will ensure a contact to 911 with GPS location information before battery power is depleted.

VI. Compliance Feature Requirements

To enable compliance features such as drug compliance, doctor's visit reminders, periodic health-related activities such as blood glucose checks, oxygen level checks, weight checks, and blood pressure checks, there is additional software to enable the rapid configuration and maintenance of these features by owners, family members, insurance companies, and physician's offices. With the appropriate passwords and security features, web forms on the life assist cloud computing system 110 can be used to configure and maintain compliance information. In addition, EDI (electronic data interchange) standards (HIPAA 5010) will be used to take compliance information directly from insurers and physician's offices to configure and maintain compliance information for device users.

Embodiments of the device 102 and systems 100 supporting the same can be provided in configurations optimized for specific markets. In certain aspects, the device can be initially configured for drug compliance. A drug compliance configuration may or may not be user configurable. For example, an insurance company may issue the device 102 to the insured and not allow user configuration. In a further aspect, a device 102 may include a doctor visit compliance routine that may include reminders for office visits, current wait times, and the like. In still other aspects, a device 102 can provide reminders for self-administered monitoring or tests, e.g., blood glucose tests, etc. In certain aspects the device 102 can provide reminders for other periodic health-related activities, e.g., check blood oxygen level, check blood pressure, etc.

Certain embodiments can be configured for health monitoring. In certain aspects, the device 102 can include standard 5- or 7-lead sensors to capture and transmit heart data via the device 102. In another example, the device 102 can be configured to interact with oxygen and pulse sensors either directly or indirectly coupled to the device 102. In one example, a separate fingertip sensor can be in communication with the device 102, such communications can include, but is not limited to Bluetooth Low Energy (BLE) connections and the like.

Figure 10:
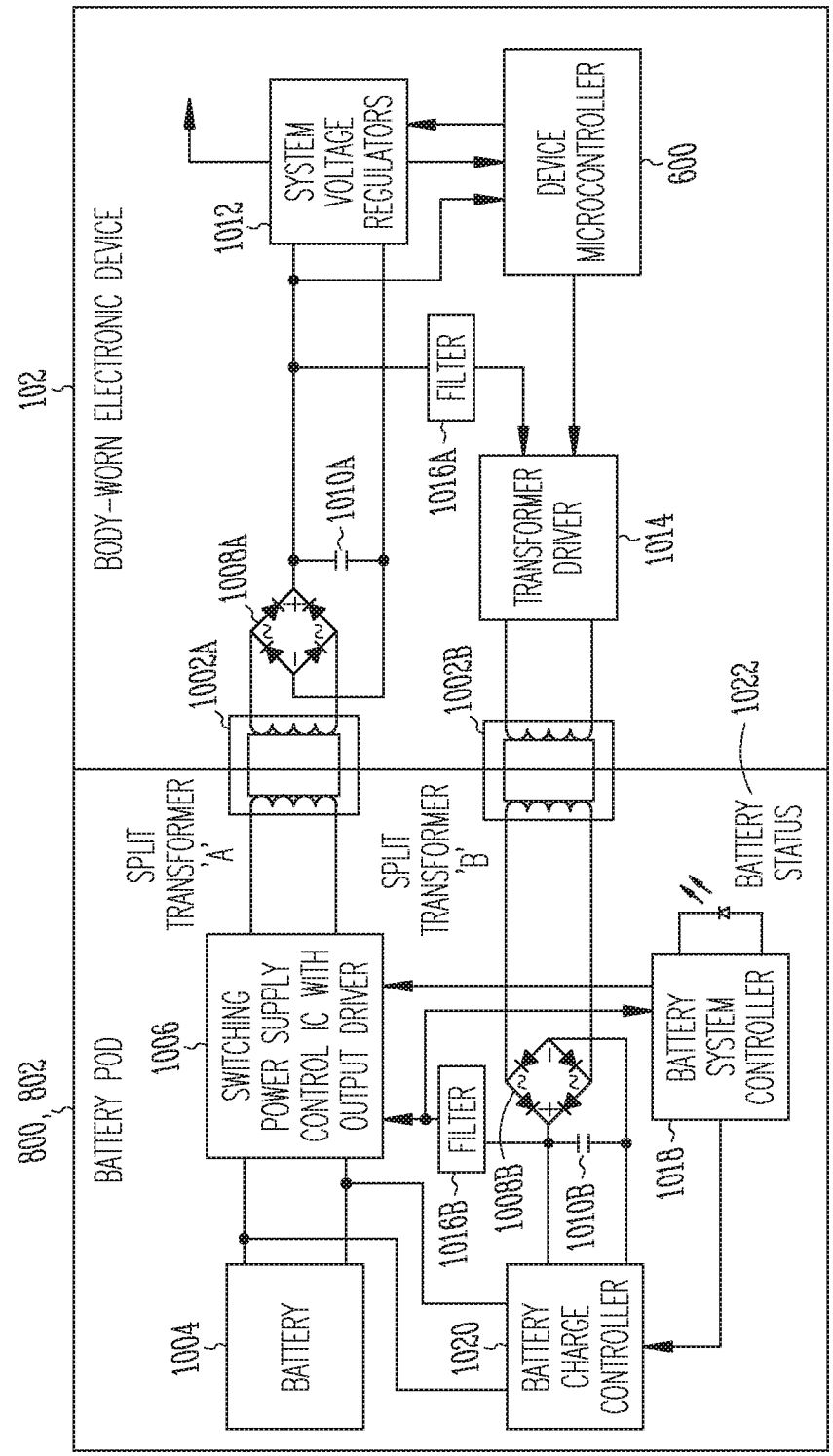
FIG. 10 illustrates a block diagram of another embodiment of the battery system for the device, where the battery pod is connected to the device.

FIG. 10 illustrates a block diagram of one embodiment of the battery system 1000, where the battery pod 800, 802 is connected to the device 102. In this system, power is transferred from the battery pod 800, 802 via a split transformer 1002A, 1002B to the device 102. The split transformer arrangement 1002A, 1002B removes the requirement for external electrical contact points. In certain aspects, the battery pod 800, 802 can be sealed and water-tight to the degree required by the environment. The absence of electrical contacts, which are subject to corrosion and negative effects of electrolysis due to electrical currents, minimize the degradation of the battery system. In certain embodiments, water detection can be implemented to turn off the pods 800, 802 when fluids are detected in the proximity or on the terminals of the pods 800, 802. This battery system 1000 allows the battery 1004 to be reliably and safely used while submerged or wet with a range of fluids. In another embodiment, the battery system 1000 can use other connectivity mechanisms such as pogo pins, for transferring power. There can be more than one connection available on the pods 800, 802 for power transfer and to communicate with the pods 800, 802 in case of intelligent pods. Communication can be in form of a physical pin/wire or wireless. In certain embodiments, the battery system 1000 comprises a lithium ion battery or lithium ion polymer battery 1004 which supplies power to a switching power supply control IC 1006. The control IC 1006 drives split transformer 'A' 1002A directly or indirectly with an AC switching waveform appropriate to the size and construction of the transformer 1002A such that energy is optimally transferred to the diode rectifier 1008A in the device 102. A capacitor 1010A provides filtering on the DC rail which is then provided to system voltage regulators 1012.

A feedback loop through split transformer 'B' 1002B provides voltage regulation to the system 1000. It also serves as a signal path where the device microcontroller 600 can control the state of the battery pod 800, 802. To enable efficiency over a wide range of power loads, the device microcontroller 600 can instruct the battery pod 800, 802 via transformer driver 1014 to pause feedback of the power operation via filter 1016A. This creates discontinuous operation where the switching circuit only operates to transfer power via diode rectifier 1008B, capacitor 1010B and filter 1016B when required. Power is provided at the optimal operating point as determined by the device microcontroller 600 in the context of overall system operation. The device microcontroller 600 can initiate continuous operation in anticipation of a high-load event such as radio transmission.

To avoid the battery attempting to couple power into an object other than the device 102, the battery system controller 1018 monitors the feedback loop. The switching power supply and the battery charge controller 1020 will be disabled if the phase and magnitude of the feedback signal do not match defined characteristics.

The battery charge controller 1018 is disabled while the battery 1004 is powering the device 102.

In an extension of this design, the device 102 can signal the battery system controller 1018 to power down all functions except for a low-power wake timer. After a fixed interval, the battery 1004 will resume discontinuous operation. This achieves extremely low power operation compared to other methods and is particularly applicable where there is a plurality of battery pods 800, 802 and one or more battery pods are not needed to provide power.

In certain aspects, the device microcontroller 600 monitors the control loop to verify that the power transfer is efficient. By measuring the voltage ripple characteristics, the device microcontroller 600 can determine if the battery 1004 is not inserted correctly. A warning can be provided to the user to re-insert the battery 1004 and/or clear debris.

The described method, including intelligent discontinuous operation of the power circuit 1000, provides high efficiency power transfer over a wider power range, from the device's lowest power states to full power for operation of radio transmitters and audio output.

The battery status indicator 1022 serves to provide a direct visual cue to the user which one of the two or more battery pods 800, 802 needs charging. One or more LEDs may be used to provide a color-coded indication of battery state.

Figure 11:
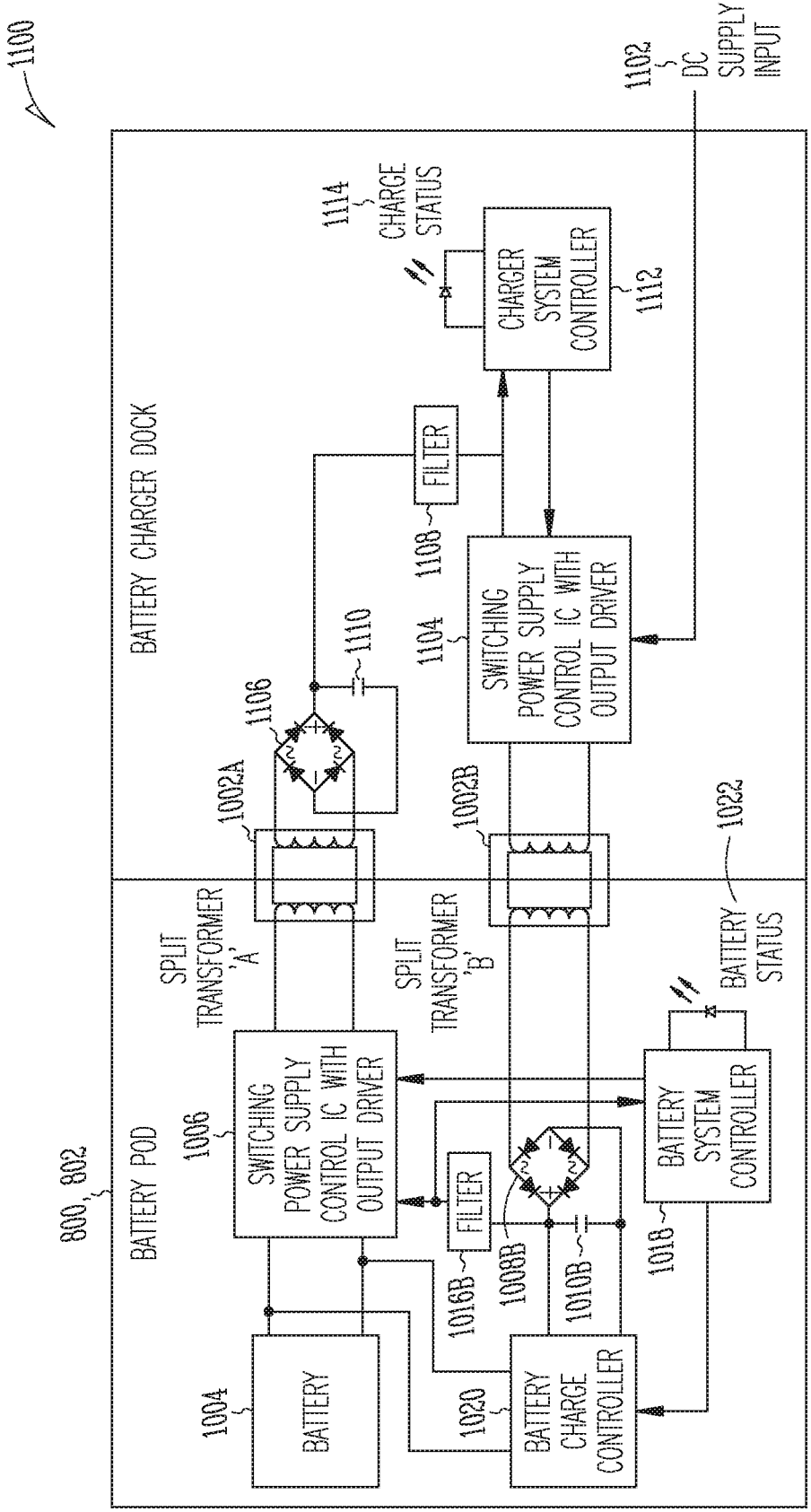
FIG. 11 illustrates a block diagram of an embodiment of the charging system, where the battery pod is connected to the charger for charging.

FIG. 11 illustrates a block diagram of an embodiment of the charging system 1100, where the battery pod 800, 802 is connected to the charger for charging and receives a DC supply input 1102. The charger dock comprises a power system controller 1018, switching power supplies 1006 and 1104, rectifiers 1008B and 1106, filters 1016B and 1108, capacitors 1010B and 1110, and two split transformer halves 1002A, 1002B. The charger may have one dock, or more than one dock to allow simultaneous charging of multiple battery pods.

In one embodiment of the charging system, the charger uses split transformer 'A' as the feedback loop. Split transformer 'B' provides the power transfer stage. The battery system controller 1018 modulates the feedback loop through transformer 'A' to indicate charge status and charge exceptions to the charger system controller 1112, which also include a charge status indicator LED 1114.

FIG. 12 illustrates a potential mechanical implementation of sample embodiments of the battery systems 1000, 1100. The design allows the battery system to be completely encased in battery enclosure 1200 such that only one face of the transformer cores is exposed. The case is sealed in the factory to provide the required degree of moisture protection.

The illustration in FIG. 12 shows the split transformer cores 1202 with convex and concave profiles to assist with minimizing the air-gap in the magnetic circuit. This configuration allows for a degree of misalignment between the device 102 and the battery pod 800, 802. Benefits include the ability to maintain efficient energy transfer when debris is present between the battery pod 800, 802 and the device 102. The convex and concave assignments may be reversed such that the battery 1004 has a concave face 1204 and the dock has a convex face, or the battery 1004 has a convex face 1206 and the dock has a concave face. Use of flat-faced cores made of ferrite is an alternative low-cost implementation.

A simple mechanical spring of some design keeps the battery pod 800, 802 in place and minimizes the air gap across the transformer 1002A, 1002B.

VII. Machine Learning and Artificial Intelligence Features of Cloud Computing System A. Adaptive and Intelligent Monitoring In an embodiment, the device 102 can notify the cloud computing system 110 of an aberration or break in acceptable behavior indicated by the user. Cloud based protocols will then adjust for the aberration period. For example, while visiting relatives, location change is detected, and the user is prompted. The user can then respond by letting the device 102 know that user is visiting a relative and the change in the rest of the non-critical behavioral patterns could be ignored by the cloud-based computing system 110. Critical patterns like medication reminders and fall detection can continue to operate as normal.

Data obtained by the device 102 over time in conjunction with data provided by the user can be used by the device 102 or system 100 to establish short term or long-term lifestyle patterns (i.e., hourly, daily, weekly, monthly, or yearly) for a user. The device 102 can send a query to the user when an aberration or break in one or more patterns is detected. Each aberration or break can be categorized either by default, past experience, or user determined urgency. The device 102 will act as appropriate given the urgency assigned to the detected event. Those events associated with a higher level of urgency will be associated with a more rapid and escalating response to an ignored device query. In certain aspects, the response to a query can include a user instruction to ignore the aberration or break for a period of time. For example, perhaps the user is visiting relatives over the holiday. The location of the individual may register as an aberration or break and trigger a device query. The device 203 can be configured to allow the user to respond to the query and indicate this aberration or break be ignored for the extent of the trip.

Figure 14:
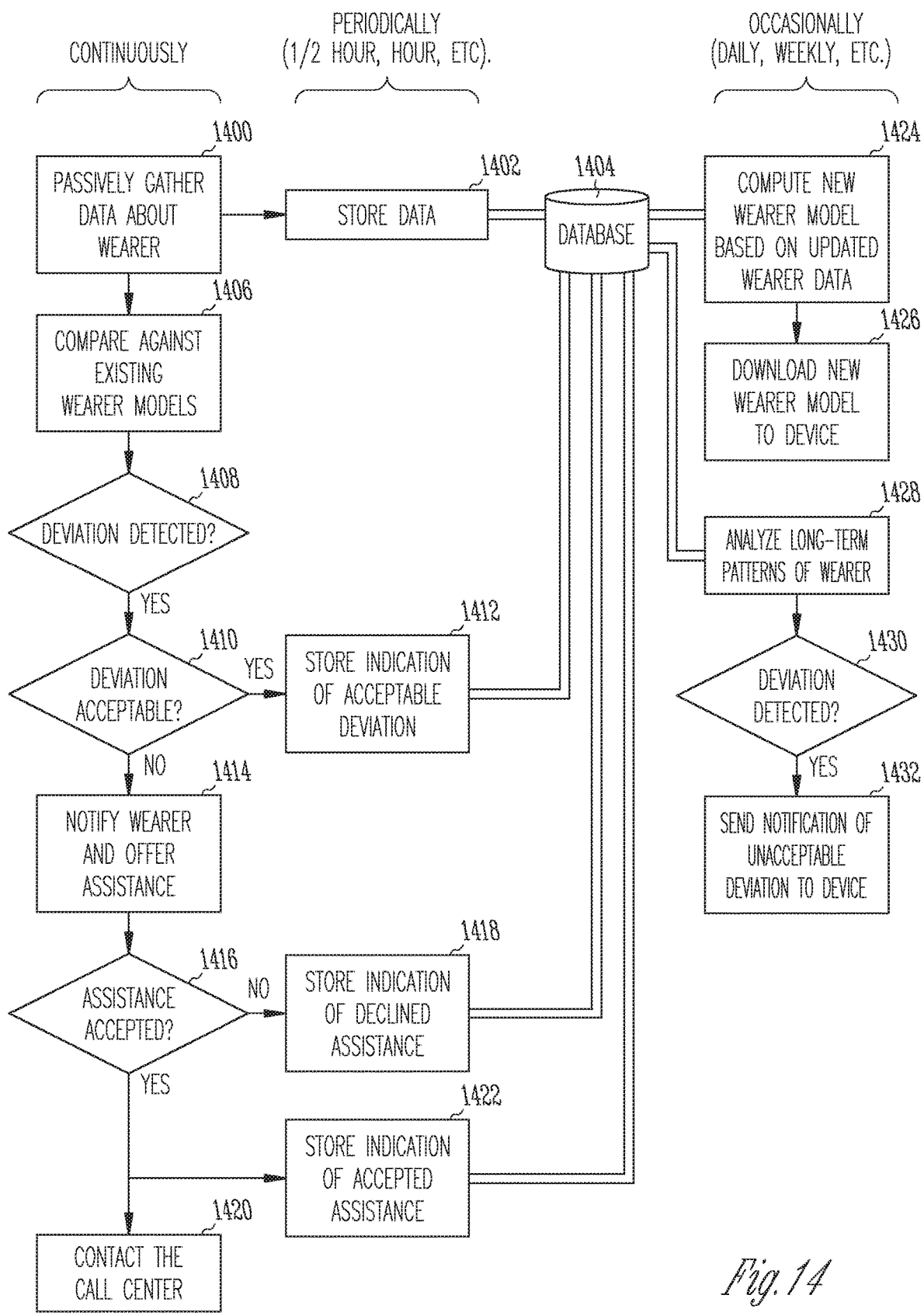
FIG. 14 illustrates an overview of adaptive and intelligent monitoring by the system in a sample embodiment.

For example, FIG. 14 illustrates an overview of adaptive and intelligent monitoring by the system 100 in a sample embodiment. As illustrated, sensors 604 of the device 102 continuously passively gather information about the user at 1400 and at periodic intervals, such as every half hour, hour, etc., uploads at 1402 the collected data to a database 1404 in the cloud computing device 110. The collected user information is compared against stored data models in the device 102 at 1406, and if a deviation from the data model is detected at 1408 that is determined at 1410 to be within an acceptable deviation from the data model at 1412, the deviation data is provided to the database 1404 for use in updating the data model. On the other hand, if it is determined at 1410 that the deviation is not acceptable, the device user is notified at 1414 and assistance is offered, e.g., in the form of verbal assistance through the speaker 632 of the device 102. If the user does not accept the assistance at 1416, an indication of the user's declining of assistance is recorded to the database 1404 at 1418. However, if the user accepts assistance, a call center is contacted at 1420 and an indication of the user's acceptance of assistance is recorded to the database 1404 at 1422. On the cloud computing side of the system 100, the cloud computing system 110 periodically accesses the stored user data in the database 1404 to compute a new data model at 1424 for the user based on the updated user data. This data model updating at 1424 may occur daily, weekly, monthly, etc. and the new user data model is downloaded to the device 102 at 1426. The cloud computing system 110 also accesses the user data for analysis of the user data for long-term patterns at 1428, and if a deviation from the long-term patterns of the user is detected at 1430, a notification of an unacceptable deviation is sent to the device 102 at 1432. For example, if the user is normally active from 9-11 am but is inactive on this particular day, the cloud computing system 110 may recognize the deviation and send a notification to the user's device 102 at 1432. Also, the device 102 may recognize the deviation based on local algorithms running on the device 102 and notify the cloud computing system 110.

In another case, the device 102 can then notify the cloud computing device 110 of aberration or break as acceptable behavior indicated by the user. Cloud based algorithms in computing device 110 will then adjust for the aberration period. For example, while visiting relatives, a location change is detected, and the user is prompted. The user can then respond letting the device 102 know that user is visiting a relative and the change in the rest of the non-critical behavioral patterns could be ignored by the cloud-based computing system 110. Critical patterns like medication reminders and fall detection can continue to operate as normal.

In some cases, sensitivity to certain critical functions can be increased in situations like above based on history of the user's behavior in unfamiliar spaces. For example, the user may be more or less susceptible for accidental falls in the place the user is visiting as compared to their own home. If the user is frequently at the location, like visiting children, then sensitivity can be adjusted up or down based on the mental dexterity and previous observations of the user when the user is in an unfamiliar space. This can only happen if the user exhibits strong mental dexterity and display signs of retaining memory in their other behaviors. However, if the user displays signs of memory loss in familiar spaces, like their home, their dexterity score will be reduced (or their sensitivity factor will be increased), as they will have a hard time navigating places they do not frequent, which can increase their chance of accident. Memory loss can be deduced by things such as, but not limited to, the number of times help is requested for guidance back home or forgetting to replace batteries of the device 102 or a change in the user's pattern of activities or behaviors as compared to their peers.

Figure 15:
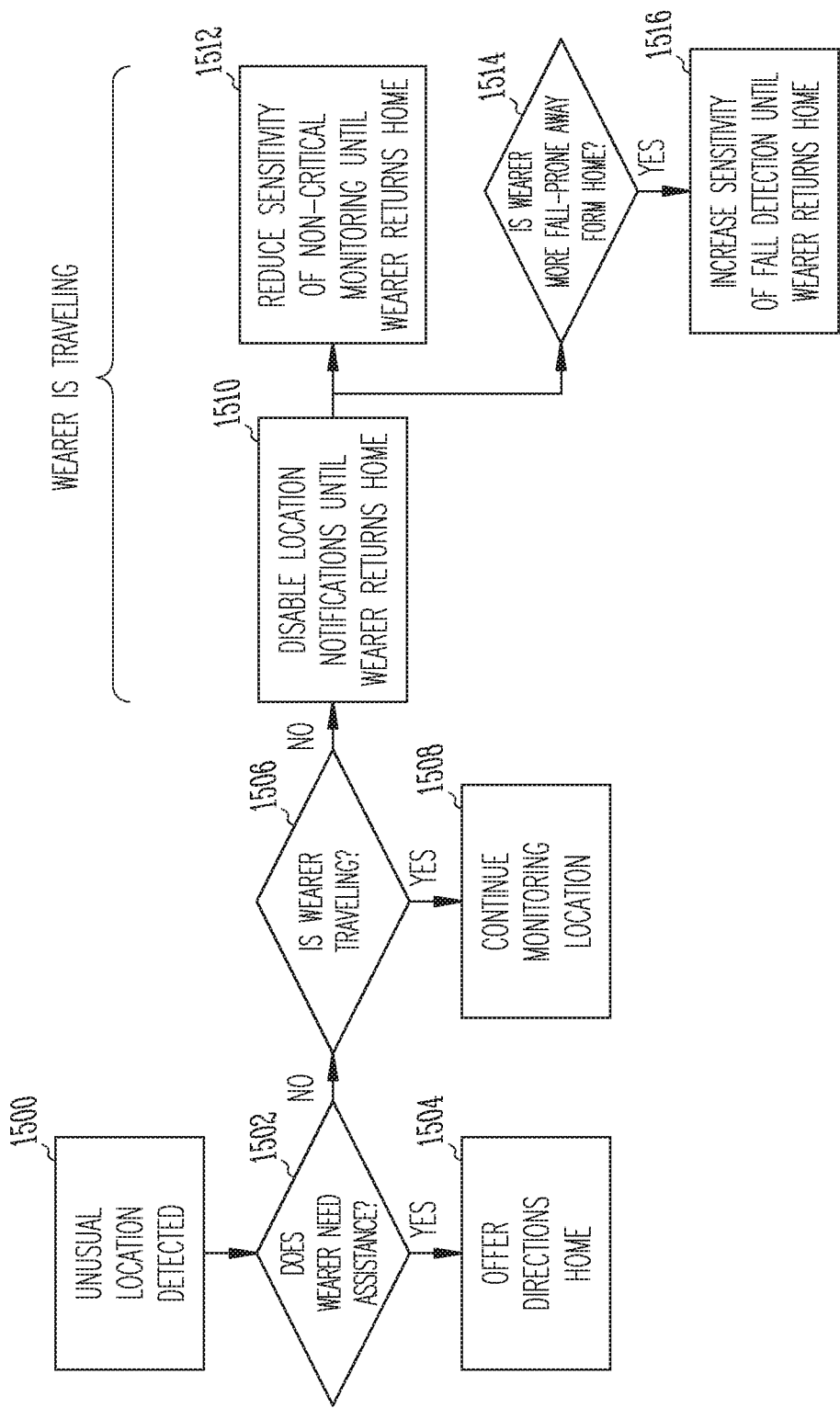
FIG. 15 illustrates an example how the operation of the device may be modified when the device user is traveling in a sample embodiment.

For example, FIG. 15 illustrates an example how the operation of the device 102 may be modified when the device user is traveling. As illustrated, the location sensor 658 (e.g., GPS and/or GLONASS sensor and/or cellular based triangulation and/or Wi-Fi-scanning based location) detects at 1500 that the device 102 is at an unusual location. The device 102 then automatically asks the user if assistance is needed. If the user indicates at 1502 that assistance is needed, the device 102 offers directions home at 1504. On the other hand, if the user indicates at 1502 that assistance is not needed, the device 102 determines at 1506 if the user is traveling. If not, the device 102 continues to monitor the user's location at 1508. On the other hand, if the user is traveling, the location notifications are disabled at 1510 until the user returns home. The sensitivity of other non-critical monitoring of the user also may be reduced at 1512 until the user returns home. However, if the settings of the device 102 indicate that the user is more fall-prone away from home at 1514, the sensitivity of the fall detection feature is increased at 1516 until the user returns home.

Monitoring also includes changes in holistic activity patterns, and in a more granular fashion, changes in motion patterns. For example, given device data that indicates times and locations of activity (such as that the user usually goes to the gym every morning), a change in activity patterns can also trigger a query to a user, asking if the user is ok. Higher granularity can be used to suggest increasing frailty in a user, such as less activity and/or a smaller range of arm motion when walking or more erratic arm motions than previously considered normal for this user, suggesting a higher likelihood of fall risk.

Figure 16:
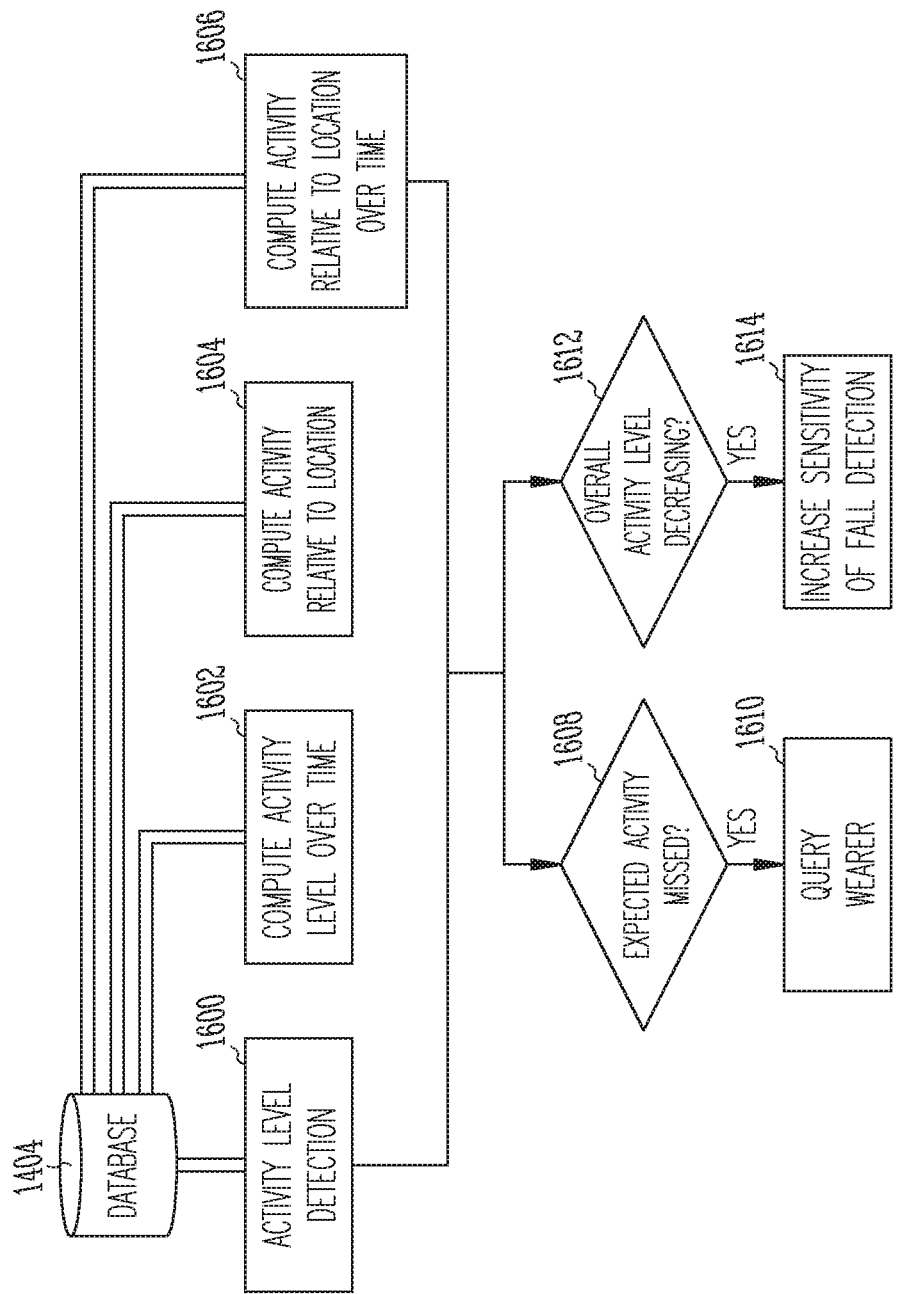
FIG. 16 illustrates analysis by the system of the user data stored in the database to detect the activity of the user of the device in a sample embodiment.

FIG. 16 illustrates analysis by the cloud computing system 110 of the user data stored in the database 1404 to detect the activity of the user of the device 102. As illustrated, the cloud computing device 110 may access the user data in the database 1404 to detect the user's activity level at 1600, the user's activity level over time at 1602, the user's activity level relative to a particular location at 1604, and/or the user's activity relative to a particular location over time at 1606. If it is determined in response to any of these computations at 1608 that the user has missed a particular activity, the user is queried at 1610. On the other hand, if it is determined in response to any of these computations at 1612 that the user's activity level is decreasing, the fall detection sensitivity is increased at 1614.

Figure 17:
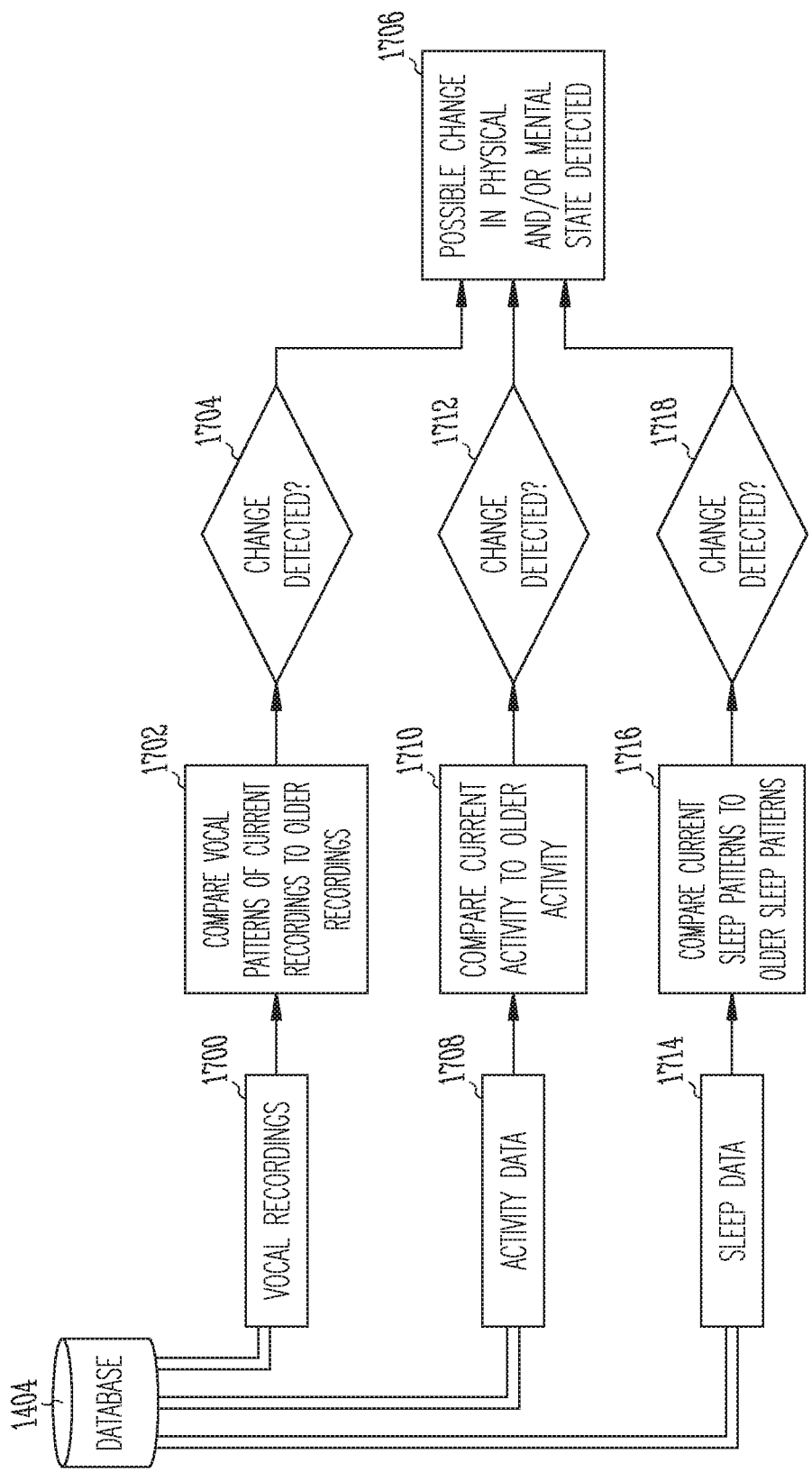
FIG. 17 illustrates determination by the system of changes in the mental and/or physical state of the user of device in a sample embodiment.

Monitoring can also be used to detect likely signs of depression or other mental disturbances, either through cloud-based analysis in the change of vocal patterns over time, or through cloud-based analysis of movement/activity patterns over time. This also includes analyzing sleep and sleep patterns over time. For example, FIG. 17 illustrates determination by the cloud computing system 110 of changes in the mental and/or physical state of the user of device 102. As illustrated, stored vocal recordings 1700 of the wearer of the device 102 may be compared at 1702 to older vocal recordings to identify changes in vocal patterns. If changes are detected at 1704, a possible change in the mental and/or physical state of the wearer is flagged at 1706 and suggested for follow-up by a healthcare provider. Similarly, the recorded activity 1708 of the wearer is compared at 1710 to older activity data, and if changes are detected at 1712, a possible change in the mental and/or physical state of the wearer is flagged at 1706 for follow-up by a healthcare provider. Stored sleep data 1714 of the wearer also may be compared at 1716 to older activity data, and if changes are detected at 1718, a possible change in the mental and/or physical state of the wearer is flagged at 1706 for follow-up by a healthcare provider.

Figure 18:
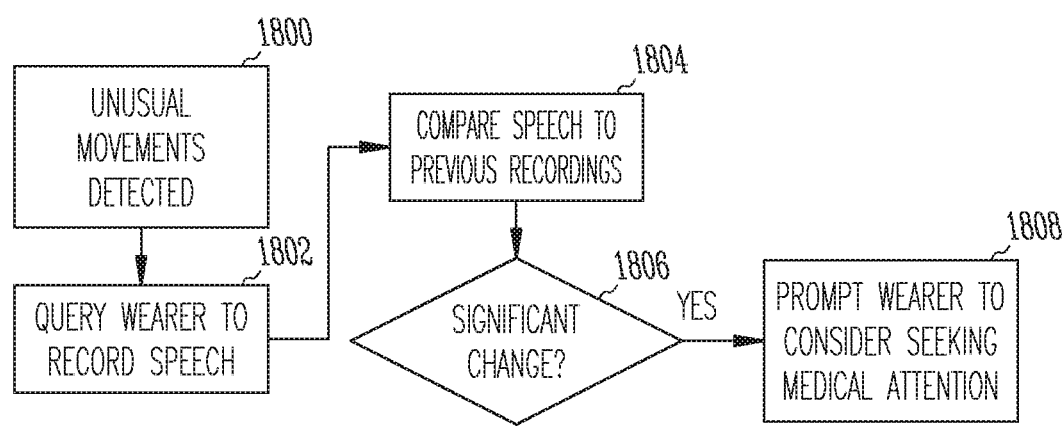
FIG. 18 illustrates monitoring of the sensor data by the device for unusual movements possibly indicative of a stroke in a sample embodiment.

Query-based monitoring can also be used to indicate the likelihood of a stroke after the detection of unusual motion patterns. In a case where the motion patterns indicate that a stroke was possible, the device 102 can query the wearer to speak a sentence or phrase that the wearer had previously recorded as a baseline. In the cloud, the baseline sentence is auditorily compared to the just-spoken sentence, and the differences may cause the device 102 to prompt the user to go to a local emergency center to have a doctor perform a complete assessment. For example, as illustrated in FIG. 18, the sensor data 604 is monitored by the device 102 for unusual movements at 1800. If unusual movements are detected, the wearer is queried to record speech at 1802. The recorded speech is compared at 1804 to previous recordings. If it is determined at 1806 that the wearer's speech has changed significantly, the wearer is prompted at 1808 to consider seeking immediate medical attention. Alternatively, if no response is provided by the wearer, the device 102 may automatically call "911" or contact a caregiver.

In one embodiment, determination of activity- and location-based patterns can be computed in the cloud by utilizing artificial intelligence algorithms to identify patterns of activity over time, location over time, and the combination of activity and location over time.

In one embodiment, identification of "peer groupings"— users whose activity and motion patterns are similar—is computed with the use of AI clustering algorithms across the population of user data. Once peer groupings are identified, the groups can be used to detect changes (especially deterioration) of one peer group member against the behavioral patterns of the whole group. Peer groupings can also be used to implement a baseline lifestyle pattern, to enable earlier monitoring for a new user.

In one embodiment, the cloud computing system 110 can provide a baseline lifestyle pattern to the device 102, either from the user's specific lifestyle data, from the combination of the user's specific data and their peer group, or from the peer group alone. The cloud computing system 110 will compare actual lifestyle patterns to the baseline, but not enable user queries on the detection of a break in the pattern until the baseline pattern is accurate enough to detect only meaningful pattern breaks. This keeps the device 102 from making spurious queries to the user.

Figure 19:
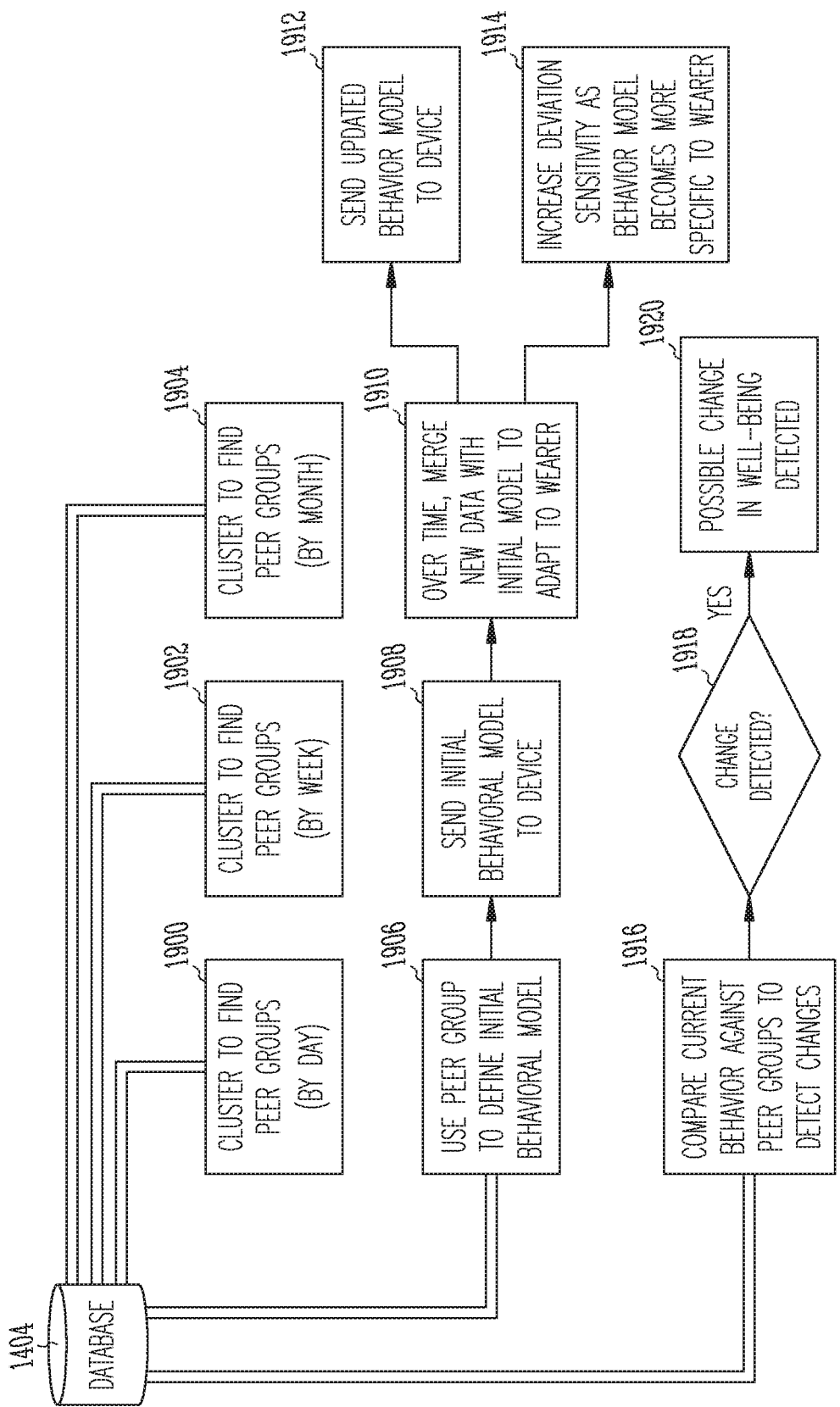
FIG. 19 illustrates clustering analysis of the data of multiple users of the system in a sample embodiment.

For example, FIG. 19 illustrates clustering analysis of the user data by the cloud computing system 110. As illustrated, the data from respective users of the device 102 may be clustered to find peer groups by day (1900), by week (1902), by month (1904), and the like. The peer group data may be used in a number of ways. For example, the peer group data may be used at 1906 to define the initial behavioral model for a particular user until enough data for that user is collected. The initial behavioral model so determined is forwarded to the user's device 102 at 1908 and, over time, new user data is merged into the initial behavioral model at 1910 to adapt the behavioral model to the user over time. The updated behavioral model is then sent to the device at 1912 and the deviation sensitivity is increased at 1914 as the behavioral model becomes more specific to the user. As another example, the user's current behavior may be compared at 1916 against the behavior of peer groups to detect changes. If changes are detected at 1918, a possible change in the well-being of the user is detected at 1920 and appropriate steps are taken such as contacting a caregiver to check the health of the user.

B. Adaptive and Intelligent Monitoring for Fall Detection

Device monitoring detects the likelihood of motion actually being a fall. When detected, the device 102 can query the user to determine if a fall has occurred, and if so, if the user needs help. (Two out of three falls do not need help.) Fall detection on the device 102 is based on the combination of real-time sensor data on the device 102 that indicates the likelihood of a fall, and the real-time processing of that suspected fall pattern through a neural network trained in the cloud on known, real falls captured by the device 102 from real people. When a user indicates that a suspected fall was a real fall, that real-time sensor data is added non-real-time to the cloud database of known real falls. Separately and not real-time, the neural network is retrained as the database of real and suspected falls grows.

Depending on a user's core strength and leg strength, or their overall physical condition, some motions that are normal for that user may be considered a suspected fall for other users. In addition to training the general neural network on all known falls and false falls, one embodiment also separately tracks suspected falls that the user classified as false falls (for example, "plopping" down in a chair rather than sitting under control). Non-real-time in the cloud, the user's false fall database can over time train the neural network downloaded to the user's specific device 102 to not consider that motion to be a fall, since it is a normal motion for that user. This reduces both false fall detection, and significantly enhances the user experience since the device 102 is not querying on suspected falls that are a normal motion pattern for this user.

Figure 20:
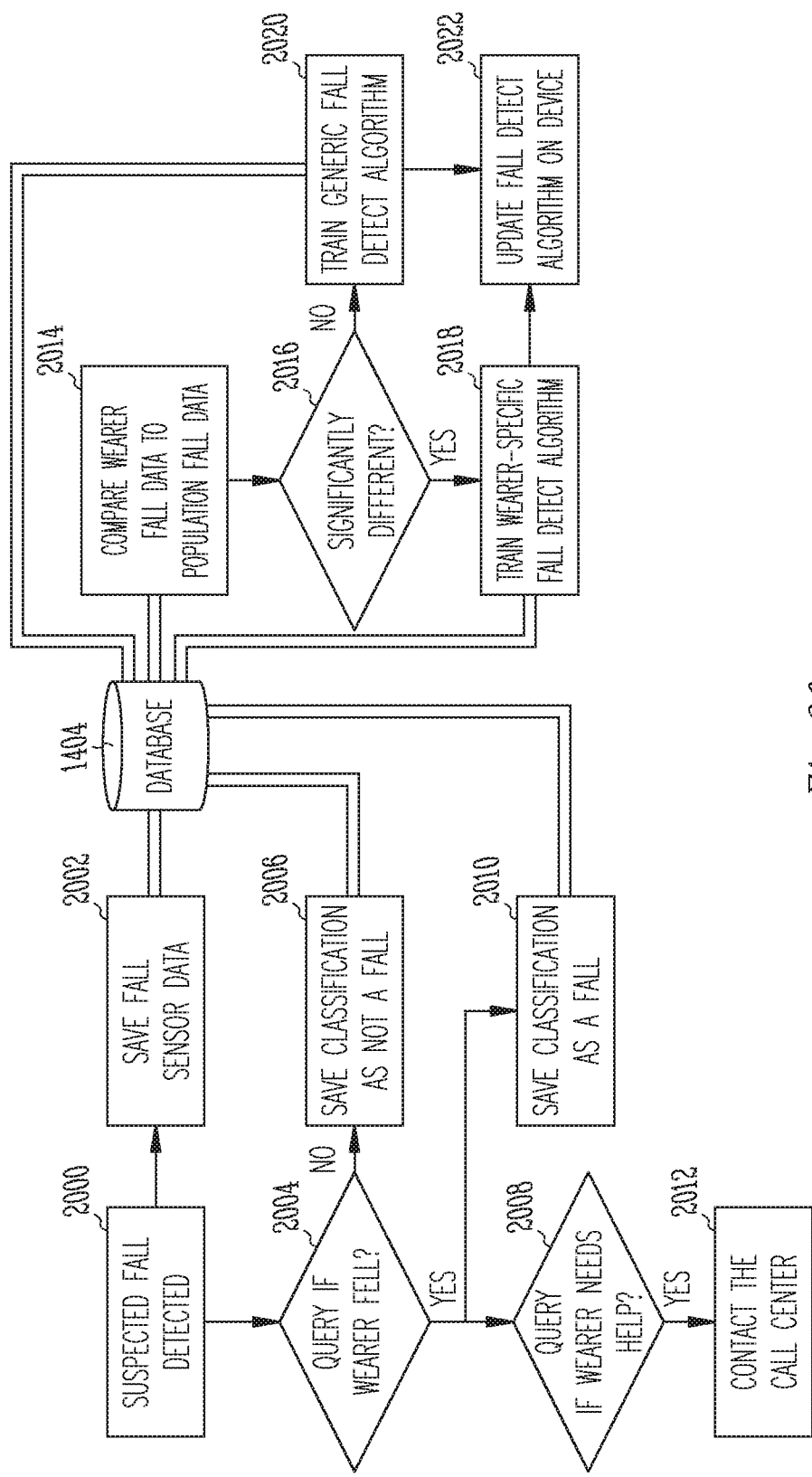
FIG. 20 illustrates fall detection analysis by the system in a sample embodiment.

For example, FIG. 20 illustrates fall detection analysis by the system 100. When one of the sensors 604 of the device 102 provides data suggestive of a fall at 2000, the fall sensor data is saved at 2002 to the database 1404. The user is queried at 2004 if the user has fallen. If the user responds to indicate that he or she has not in fact fallen, the collected sensor data is classified as not a fall and stored in the database 1404 at 2006. On the other hand, if the user responds that he or she has in fact fallen, the user is queried at 2008 to ask if the user needs help and the collected sensor data is classified as a fall and stored in the database 1404 at 2010. If the user indicates at 2008 that help is needed, a call center or other emergency service or contact is contacted at 2012. The fall data stored in the database 1404 for the user is also compared at 2014 to fall data for the population of users of the device 102 and, if the user's fall data is significantly different at 2016, a wearer-specific fall detection algorithm is trained at 2018. If the user's fall data is not significantly different than the population fall data, a generic fall detection algorithm is trained at 2020. In either case, the fall detection algorithm on the device 102 is updated at 2022.

C. Intelligent Ecosystem

In another embodiment, the device 102 also may be connected (wired or wirelessly) to other medical systems like, but not limited to, a blood pressure monitor, a glucose monitor, a cardiac monitor, an EKG system, medication monitoring systems, and other medical sensors, which can use the communications module of the device 102 to upload their data to the cloud computing system 110. The algorithms running in the cloud computing system 110 can then utilize this data to monitor for changes in health indicators and to predict and prevent life-threatening incidents. One example of such an action is where clustering algorithms learn the dominant patterns of blood pressure for the user before and after an exercise and with and without being fully rested. Retrospective analysis of patterns of exercising individuals who, at some point, experienced health incidents after exercise compared with all individuals' events where exercise was not followed by a health issue yields predictable patterns such as an indication that without additional rest, an extra workout could harm the user given certain preconditions. A query can be then triggered notifying the user in the middle of a workout, for example, that continuing with the workout is consistent with blood pressure rising to dangerous levels or other elevated risk conditions. Activities like exercise can be determined by the sensors 604 of the device 102 or through other fitness tracking devices.

Figure 21:
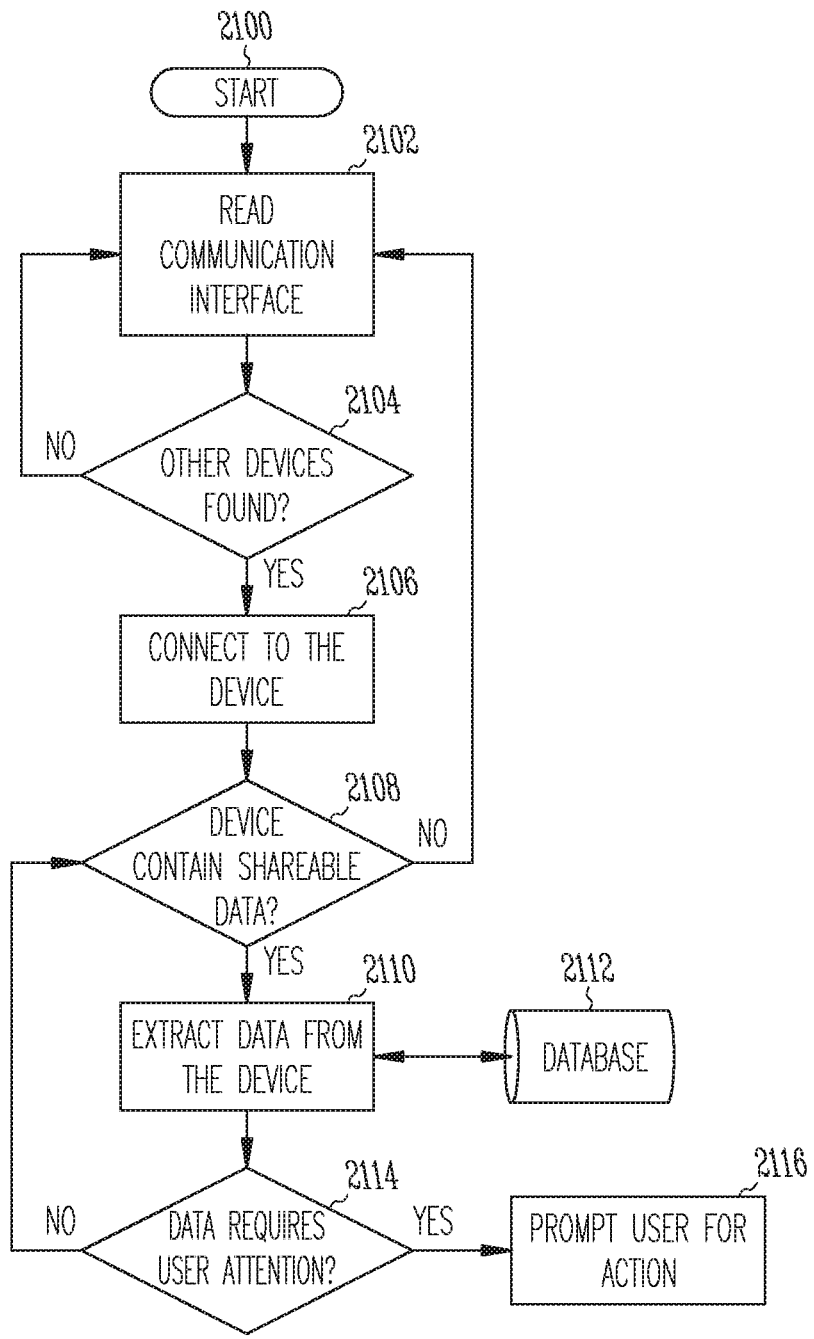
FIG. 21 illustrates the connectivity with other medical systems and the uploading of data in a sample embodiment.

FIG. 21 illustrates the connectivity with other medical systems and the uploading of data in a sample embodiment. As illustrated, the method starts at 2100 and the device 102 reads its communication interface at 2102. If other devices are found at 2104, the device 102 connects to the device using Wi-Fi, Bluetooth, or the like at 2106. If the other device contains sharable data at 2108, the sharable data is extracted from the other device at 2110 and stored in a database at 2112. However, if the other device does not contain sharable data, the device 102 returns to 2102 to read its communication interface. If the extracted data requires user attention at 2114 (e.g., the data indicates an acute medical need), the user is prompted for action at 2116.

In another embodiment, reminders for other telemedicine systems can be added to the device 102. As an example, the device can remind the user using an audibilized and/or displayed reminder that "It is time to measure your blood pressure." Then, the device 102 confirms that the user took their blood pressure reading by acquiring the blood pressure reading from a telemedicine device. Telemedicine integration is especially helpful for hospital discharge instructions after a medical procedure and in the care of chronic care populations.

In similar way, algorithms in the cloud computing system 110 can receive the glucose levels of the user via an external glucose monitoring system and cross-check the medications prescribed to the user. For example, such algorithms may include a database lookup with applied business rules. In case of a potential health risk of consuming medication with the acquired level of glucose, the user can be notified, or the medication reminder preemptively adjusted to either reduce the dosage or delay the reminder until the glucose indicators return to an acceptable level.

Figure 22:
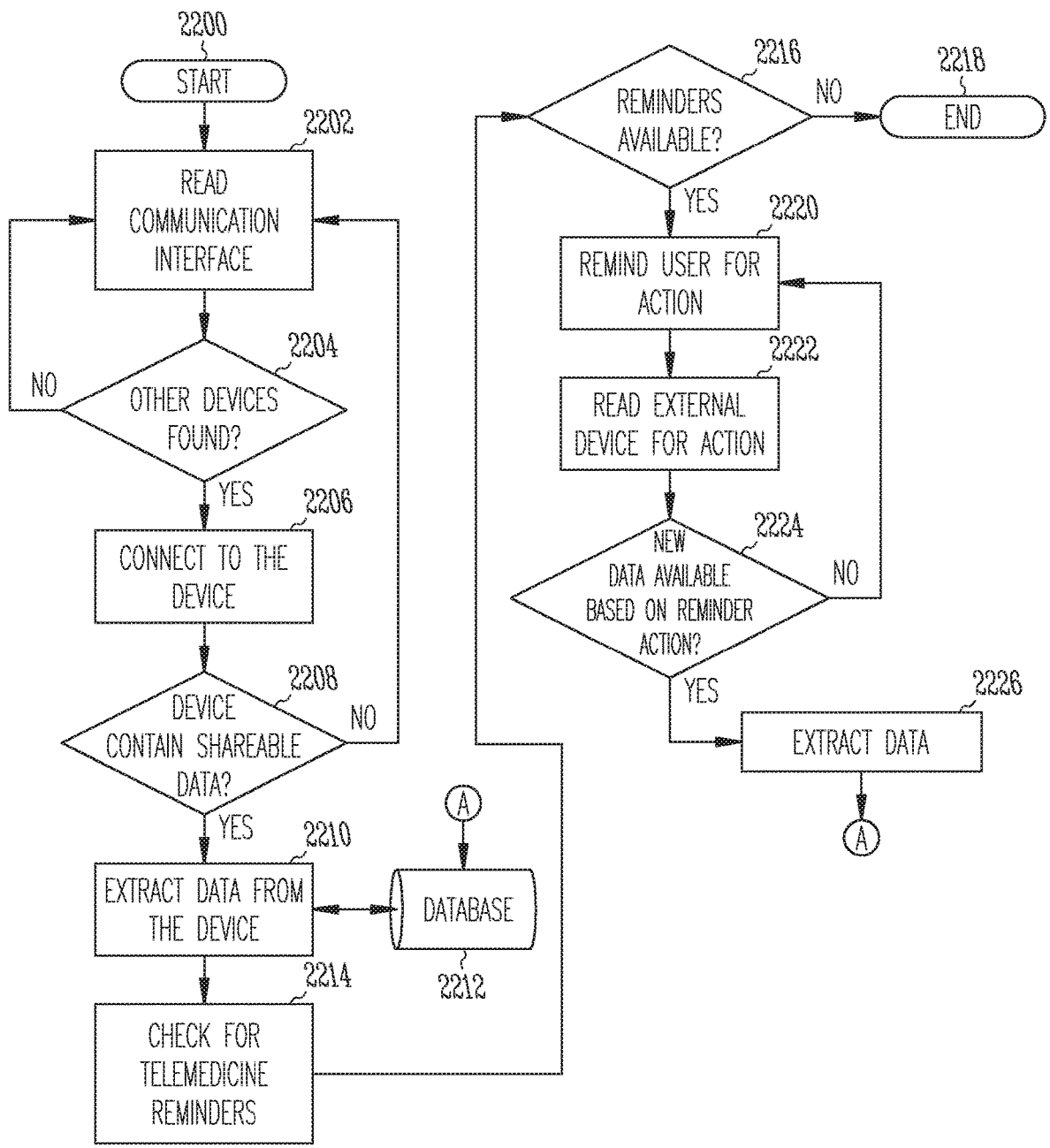
FIG. 22 illustrates the connectivity with other medical systems for uploading telemedicine reminders in a sample embodiment.

FIG. 22 illustrates the connectivity with other medical systems for uploading telemedicine reminders in a sample embodiment. As illustrated, the method starts at 2200 and the device 102 reads its communication interface at 2202. If other devices are found at 2204, the device 102 connects to the device using Wi-Fi, Bluetooth, or the like at 2206. If the other device contains sharable data at 2208, the sharable data is extracted from the other device at 2210 and, stored in a database at 2212. However, if the other device does not contain sharable data, the device 102 returns to 2202 to read its communication interface. The extracted data is checked at 2214 for a telemedicine reminder, and if such reminders are determined at 2216 to not be available, the method ends at 2218. However, if reminders are determined to be available at 2216, the user is prompted at 2220 to take the appropriate action. At 2222, the device 102 may communicate with the other device to determine the action to be taken. If no new data is available at 2224, the process returns to 2220 to prompt the user for the next action at the appropriate time. However, if new data is available at 2224, the data is extracted from the other device at 2226 and stored in the database at 2212.

D. Use of Microphone for Activity Level Detection

In another embodiment, the device 102 can monitor the microphone 628 and other inputs to the device 102 for ambient activity and over a period of time use that data to learn the user's behavior. For example, if user turns on the television every day from 6 to 8 pm, any lack in physical activity in that time frame can be justified by referencing the audio stream through the microphone 628. During sleep, microphone input along with other sensors like an accelerometer and gyrometer can be used to determine if user is sleeping. For each user, their daily habit can be learned by means of machine learning (e.g., density-based clustering algorithms) and a baseline for each sensor monitoring activity can be created. This baseline is improved as more data is collected for the user. Once it has been established that the user is sleeping, all non-critical functions can be reduced to a noninvasive state. For example, the display can be auto-adjusted to minimum brightness (or turned off) or gesture-based features like glance detection, which illuminates the display automatically, may be completely turned off. All critical functions like fall detection can continue as required.

Figure 23:
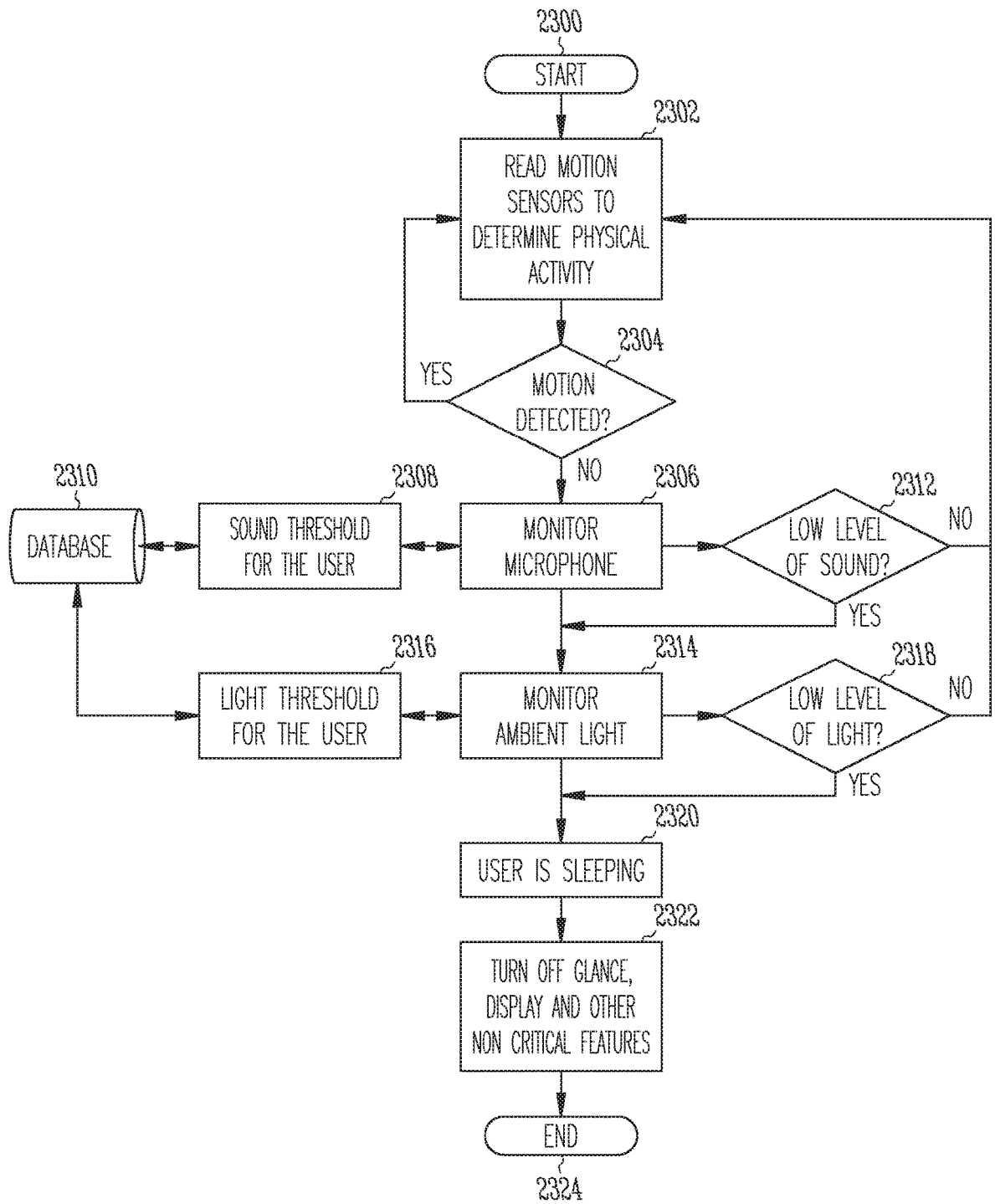
FIG. 23 illustrates a process for using the device's microphone to establish activity level of the user in a sample embodiment.

FIG. 23 illustrates a process for using the device's microphone 628 to establish the activity level of the user in a sample embodiment. As illustrated, the process starts at 2300 and the device 102 reads is motion sensors 604 at 2302 to determine if the user is active. If motion is detected at 2304, the motion monitoring continues. However, if no motion or minimal motion is detected at 2304, the device 102 monitors its microphone 628 at 2306. The device then reads the pre-established sound threshold for the user from the database 2310 at 2308 and passes the sound threshold to step 2312 for comparison to the monitored sound level. If the sound level is above the pre-established threshold at 2312, the process returns to 2302 to continue motion monitoring. However, if the sound level is below the pre-established sound threshold at 2312, the device 102 also monitors the ambient light level at 2314. The device then reads the pre-established light threshold for the user from the database 2310 at 2316 and passes the light threshold to step 2318 for comparison to the monitored light level. If the light level is not below the pre-established threshold at 2318, the process returns to 2302 to continue motion monitoring. However, if the ambient light level is below the pre-established ambient light level at 2318, the device 102 concludes that the user is sleeping at 2320 and turns off the device's glance feature, display, and other non-critical features at 2322, and the process ends at 2324. As noted above, critical functions like fall detection can continue as required.

E. Pressure Equalization for Indoor Functionality

In another sample embodiment, the pressure sensor 616 of the device 102 can be utilized to notify emergency services of the floor level of the user needing assistance. However, within a multi-story building, when a Heating, Ventilation and Cooling (HVAC) system is turned on, the air pressure in the building can change significantly, impacting the ability of the pressure sensor 616 to accurately determine the elevation. Location services like GPS, which can be external to the device 102 or coupled to the device 102, can provide the device 102 with location data which is communicated to the cloud computing system 110, which may determine if the user is in the building by cross-referencing with an internal database of the buildings or by other means utilizing external geo-location services. The cloud computing system 110 can then notify the device 102 of its environment and the device 102 can go into a pressure detect mode. Staying in the pressure detect mode for a certain amount of time will create a baseline for the range of pressure difference exerted by the HVAC when the air is turned on and when it is turned off. Using the offset from this baseline, the device 102 can measure the elevation. The pressure baseline is also passed to the cloud infrastructure which stores it and provides it to other devices which report the same location.

For example, in a building with floors 5 m apart, when the air is turned on, pressure registered by the device 102 is 101092 Pascal and when the air is turned off, the device 102 reads 101215 Pascal. This gives a 123 Pa difference in pressure, which translates to 3 floors in a building when each floor is 5 m apart. 123 Pa can be used to adjust any shift in the pressure. Thus, after the pressure detection phase is completed, this baseline may be used during future measurements. For example, in use if the sensor reads 101034 Pa, it is determined that the device is 25 m from ground level and on the $6^{th}$ floor if the floors are 5 m apart. Given the error determined from the baseline measurement, the user is determined to be located between the $3^{rd}$ and $9^{th}$ floor. This algorithm can be further refined by asking the user to confirm the floor on which they are located. The pressure baseline is also passed to the cloud computing system 110 which stores it and provides it to other devices that report the same location.

Figure 24:
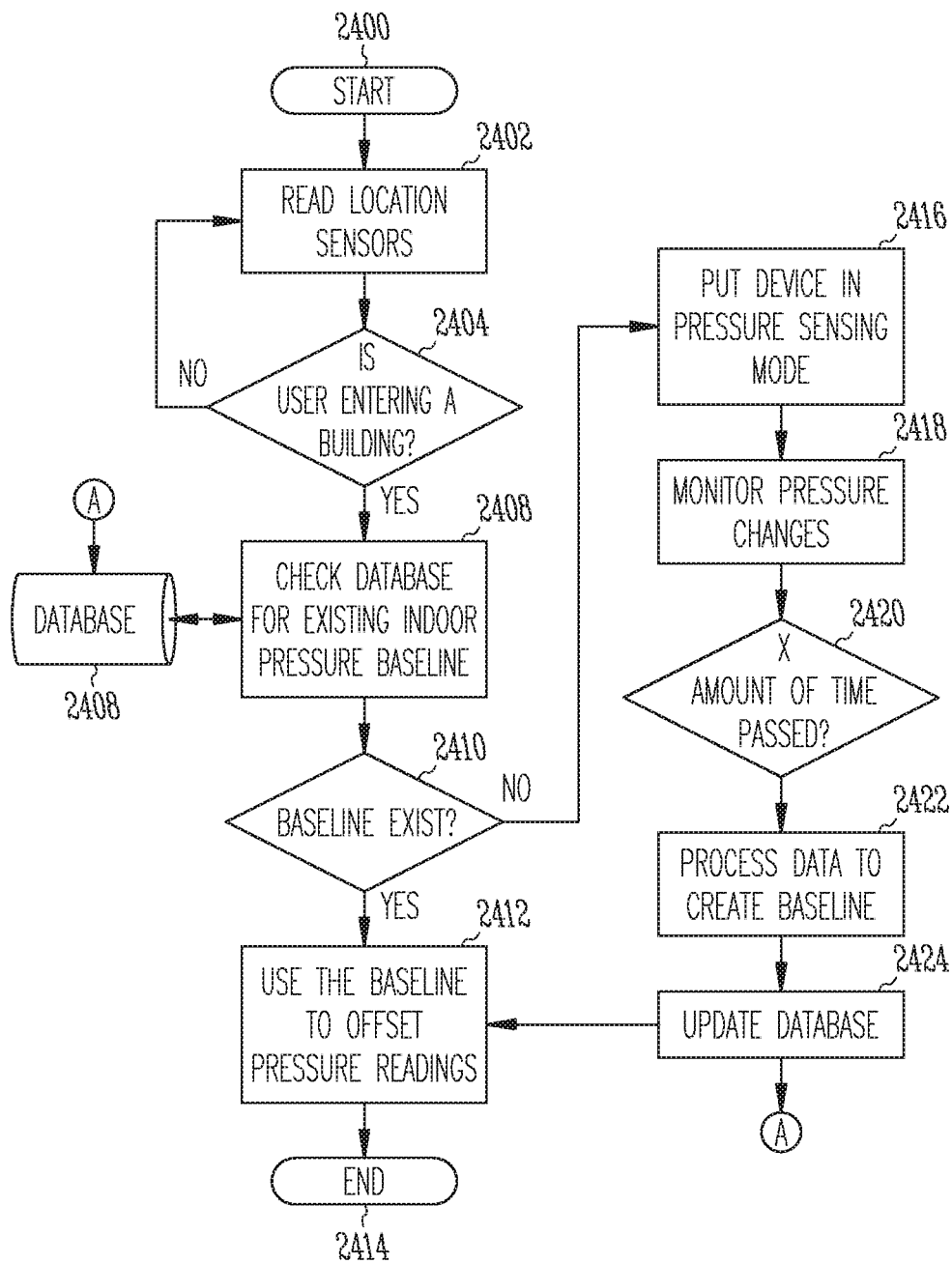
FIG. 24 illustrates an embodiment for determining the user's floor level in a building in a sample embodiment.

FIG. 24 illustrates an embodiment for determining the user's floor level in a building in a sample embodiment. As illustrated, the process starts at 2400 and reads the location (GPS) sensors 658 at 2402. If it is determined at 2404 that the user is entering a building, a database 2406 is checked at 2408 for the existing indoor pressure baseline for the building. If a pressure baseline for the building is found in the database 2406 at 2408, the baseline is used at 2412 to offset the pressure readings of the user's device 102 at 2412 while the user is in the building, and the process ends at 2414. However, if no baseline is found in the database 2406 at 2408, the device 102 is placed in a pressure sensing mode at 2416 to monitor pressure changes at 2418. After a predetermined amount of time (2420), the pressure data is processed to create a baseline at 2422 and the database 2406 is updated at 2424. The determined baseline is then used at 2412 to offset the pressure readings of the device 102 at 2412 while the user is in the building, and the process ends at 2414.

It will be appreciated by those skilled in the art that the process described with respect to FIG. 24 may require a significant amount of communications between the device 102 and the cloud computing system 110, which may be a significant drain on the device's power. As an alternative to save power, the pressure sensor 616 may run continuously and detect entry/exit into a building based on a large jump/drop in pressure. Similarly, relatively large changes in pressure may indicate that the air is coming on or turning off. It will be appreciated that running the pressure sensor 616 continuously uses far less power than repeated connections to the cloud computing system 110. In normal use, the device 102 may maintain a record of "+/− N floors" from entry and then can determine the entry floor with help from the cloud computing system 110 but only if the actual floor needs to be determined, which would be rare (e.g., only in an emergency situation).

F. Modeling the Behavior of Users of the Device 102 in the Cloud

Figure 25:
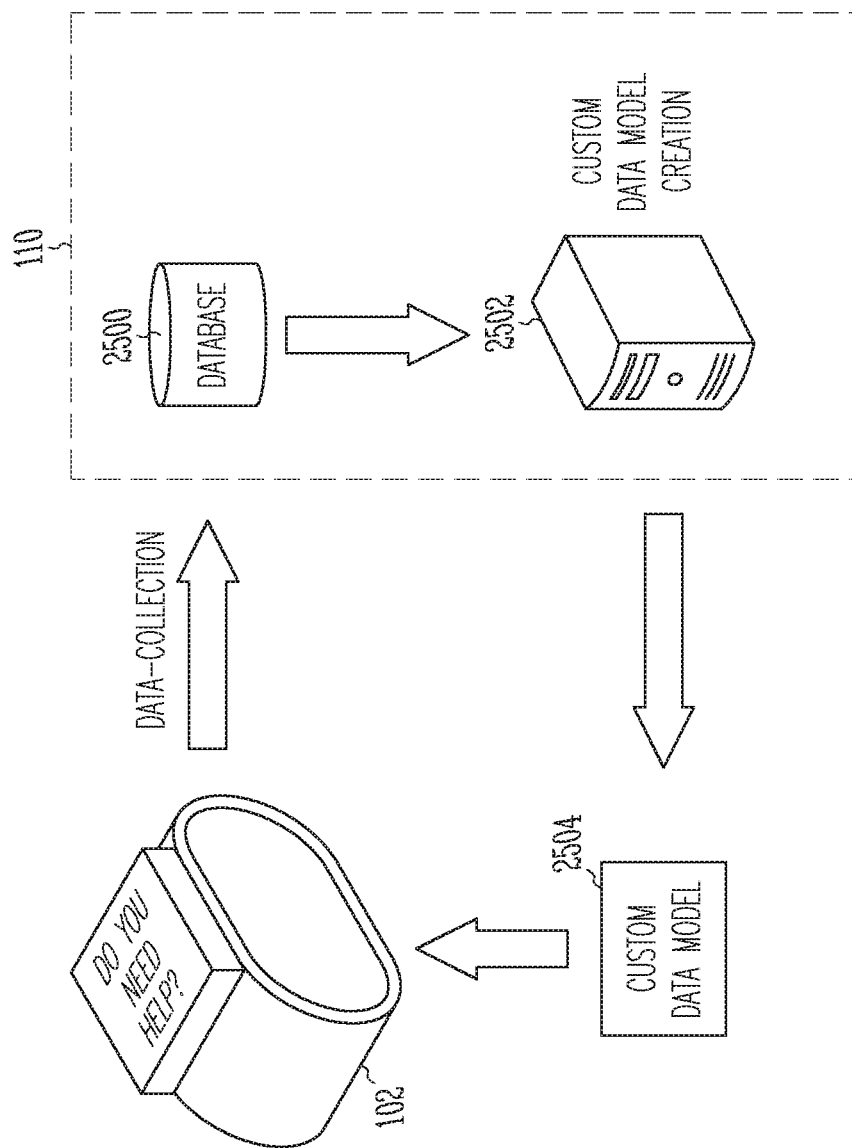
FIG. 25 illustrates a reusable process for building custom models of an individual's behavior and for applying the behavior models on the device while minimizing draining of the device's battery in a sample embodiment.

FIG. 25 illustrates a reusable process for building custom models of an individual's behavior in the cloud computing system 110 and for applying the behavior models on the low power device 102 without mercilessly draining the device's battery. In short, the device 102 goes through a machine learning training cycle where detailed data is collected and sent to a database 2500 in the cloud computing system 110 for developing stable custom data models for the user using machine learning algorithms (e.g., density-based clustering algorithms) operating on computer processors 2502. This data collection process is power consuming due to the active communications between the device 102 and the cloud computing system 110, so during this time the device's power will need to be closely monitored. The collected data grows in the database 2500 until the data volume reaches a critical volume for the user (e.g., 2-4 weeks of continuous use of the device 102) sufficient for the creation of custom data models by the machine learning algorithms operating on computer processors 2502. If the machine learning algorithms determine that the amassed data is insufficient for the creation of a stable data model, then the cloud computing system 110 communicates with the device 102 to request additional data. This loop continues until sufficient data is amassed for building one or more custom data models for the device user from the amassed data. Once the custom data models have been completed by the machine learning algorithms operating on computer processors 2502, the parameterized rule-based custom data model 2504 is downloaded or hard-coded to the device 102, and the device 102 is signaled to exit the machine learning training cycle and to stop sending the detailed data to the cloud computing system 110. The device 102 then enters its normal active operating mode where significantly less data is communicated to the cloud computing system 110. During normal operation in the normal active operating mode, only the parameters for the custom data model as a result of dynamic programming are communicated to the parameterized rule-based custom data structure on the device 102 at designated intervals, such as each night while the user sleeps and assuming that the device is adequately charged. Since only the updated parameters are communicated between the device and the cloud computing system 110 during the normal active operating mode, the power drain for the device 102 is significantly reduced.

A variety of different mathematical modeling techniques and established machine learning modeling algorithms (including but not limited to density-based clustering or other clustering algorithms, decision trees, random forest or other ensemble methods, Bayesian networks, or association rules) may be employed as the machine learning models implemented by the computer resources 2502 to build sophisticated models of the individual users' behaviors. Having been developed on cloud-based resources, these models often need to be deployed to the device 102 to run inside the device without the luxury of access to the cloud or the traditional computer hardware resources available in the cloud. A general strategy for the effective deployment of predictive algorithms (the results from such mathematical modeling effort) to run on the device 102 independent of regular communications with the cloud computing system 110 is desired to support the ability of the device to make decisions and to react quickly to certain events detected by the device 102 without necessarily needing to communicate with the cloud computing system 110 and to thereby drain the device's battery. As noted above with respect to FIG. 25, this is accomplished by initially collecting and transmitting large volumes of data from the device 102 to resources in the cloud such as database 2500. This requires more power from the device's battery than is desirable during normal active operation of the device 102, but this training mode is only employed until a "critical mass" of data about a user's behaviors has been collected in the database 2500. Once that "critical mass" of data is available, the computer resources 2502 in the cloud perform the taxing work of model building and applying various machine learning algorithms to develop a custom model for that individual user. If insufficient data exists as yet to build a robust model, the model building algorithms' scoring functions indicate this, and a temporary extension of detailed data collection can continue. From this custom model, parameters are produced to graft the sophisticated machine learning model onto a much simpler set of parameterized rules which are computer-friendly for execution on the device 102 and will not consume noteworthy amounts of power from the battery of the device 102 to execute. These parameters are communicated from the cloud computing system 110 to the device 102 on its next update cycle. With the parameterized rules in place and running on the device 102, the device 102 can stop sending the large volumes of detailed data to the cloud processing system 110 (at least until called upon again to do so to build new or updated models), thus reducing battery consumption due to extended communication with the cloud computing system 110.

As a specific example application of this pattern, the process illustrated in FIG. 25 may be used so that the device 102 may learn to anticipate when a wearer will likely go to sleep on a given day of the week. Initially, a large volume of detailed accelerometer data is collected and transmitted from the device 102 to the cloud computing system 110. Using this accelerometer data consisting of 1-second accelerometer magnitude readings, a 10800-second moving window calculation of average magnitude is computed by the cloud computer resources 2502. All periods where the 10800-second moving average is in the lowest 10% portion of the range of accelerometer magnitudes recorded on a device 102 during a designated period of time (e.g., the prior 2 months of data) is labelled as a period of sleep and likewise all other periods are labelled as non-sleep. For each calendar day of the week, the starting time of the longest uninterrupted period of labelled sleep is collected in a new table of data as the start of slumber for that specific day of the week. The established Density-Based Clustering algorithm (as implemented in such tools as hdbscan) is then provided as input all of the slumber start times across all recorded Sundays (and later the same steps will be performed using data from all Mondays, then from all Tuesdays, etc.) If the Density-Based Clustering algorithm is able to identify at least one cluster (excluding the so-called "noise cluster" of data that cannot be assigned with confidence to any cluster) of 5 or more data points, then the centroid of that cluster is regarded as the typical start of sleep for that wearer for that day of the week. If no such cluster can be identified by Density-Based Clustering, then additional data must be collected before a typical start of sleep can be predicted for that day of the week and more data must be collected until that is achieved. Once a typical start of sleep has been determined for a day of the week, this information may be transmitted from the cloud computing system 110 to the device 102 as a configuration setting for a set of rules to be executed on the device 102.

Specifically, during use the set of rules on the device 102 may apply the "typical start of sleep" model determined by the Density-Based Clustering algorithm run by the cloud computer resources 2502 by setting a reminder alarm 1-hour before the time of day for a typical start of sleep, where the time of time of day for a typical start of sleep is a parameter provided by the cloud computing system 110. The reminder alarm will trigger at the appointed time to remind the wearer to take an action including but not limited to (1) taking medication if the most recent scheduled medication time was not matched with a recorded event on the device of the user successfully taking their medication, (2) swapping batteries on the device 102 if the battery charge level is currently less than 30%, (3) testing blood sugar levels (if relevant for the user) if such an event has not been recently recorded on the device 102, and/or (4) taking any other planned actions specific to a user that were not already recorded as an event on the device 102 for that day. These activities would be driven by the "typical start of sleep" model determined by the cloud computing system 110 during the training mode, as updated from time to time during normal active operation. During normal active operation, the only variable parameter needed for implementing this model is the determined time of day for typical start of sleep.

As another specific example application of this pattern, the process illustrated in FIG. 25 may be implemented to learn the user's pattern of regular travel, for example, after a fortnightly visit to a doctor's office. Initially, a large volume of observed Wi-Fi access points (identified by their ESSIDs as potentially but not necessarily unique identifiers) is collected and transmitted from the device 102 to the cloud computing system 110 during the training mode. Using these observations of visible ESSIDs, the most commonly observed ESSID overall (across all observations at all times of day or night) is identified and for the purposes of this example as an effective beacon signifying that a wearer is currently at home. A 3600-second moving window of ESSID counts is then computed across all available ESSID observations. Excluding those windows where the "home location" was also observed, the next most commonly recurring ESSID is identified. For the sake of this illustrative example it is assumed that this ESSID corresponds to a Wi-Fi network that is only visible when the wearer is at her fortnightly doctor's appointment. The established Density-Based Clustering algorithm (as implemented in such tools as hdbscan) is then provided as input all of the time-deltas between the last observation of the "doctor's office location" and the first observation of the "home location." If the Density-Based Clustering algorithm is able to identify at least one cluster and the variation across all identified clusters' centroids is less than 30 minutes, then the centroid of the cluster with the longest time between location observations is taken as the maximum regular expected time to return home from the doctor's office. This is then transmitted from the cloud to the device 102 as a configuration setting for a set of rules to be executed on the device 102.

Figure 26:
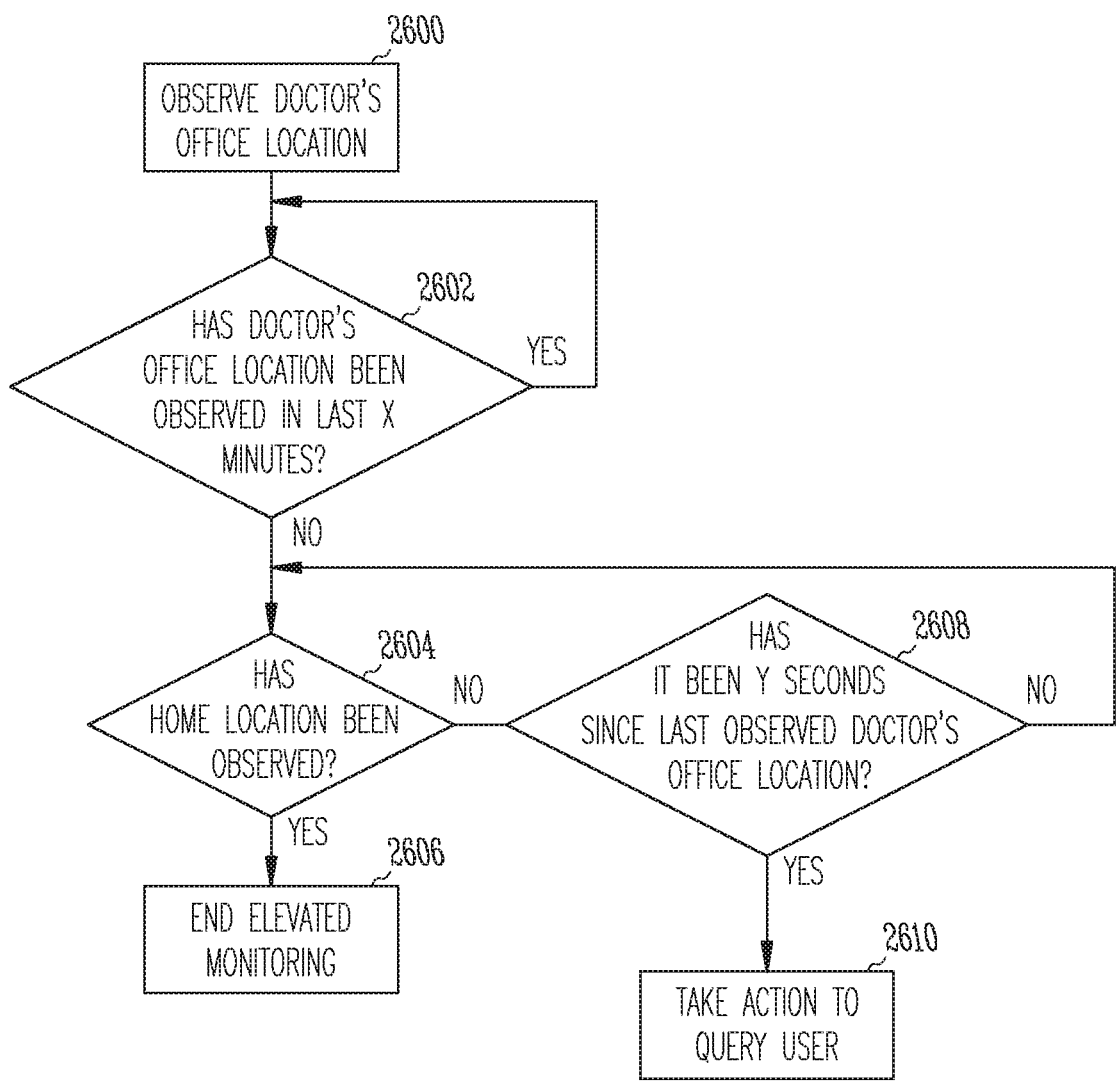
FIG. 26 illustrates the operation of the device where the travel monitoring process is invoked in a sample embodiment.

FIG. 26 illustrates the operation of the device 102 during use where the travel monitoring process is invoked. During use, a rule on the device 102 is triggered at 2600 when the "doctor's office location" is first observed. This rule then enters its second phase to monitor available Wi-Fi networks until the "doctor's office location" has not been observed for greater than X minutes (e.g., 15 minutes) at 2602. This rule then enters its third phase which is to monitor for the first detection of the "home location" at 2604. If the home location is observed at 2604, then elevated travel monitoring ends at 2606. However, if the "home location" is not observed within the maximum regular expected time (e.g., "Y" seconds parameter provided by the cloud computing system 110 plus a small margin as a buffer) at 2608, then the device 102 is instructed at 2610 to take an action to query the user. The device's action may be to audibly query the user to ask if they need assistance.

VIII. Computer Implementation

Embodiments of systems and/or methods described herein can be implemented by or are executed by one or more computer systems. In various embodiments, a computer system may be a server, a mainframe computer system, a workstation, a network computer, a desktop computer, a laptop, a watch, or the like. For example, in some cases, the methods described herein may be implemented as a computer system where the methods described herein are implemented as instructions executed by one or more processors of the computer system. Moreover, one or more of servers or devices may include one or more computers or computing devices generally in the form of a computer system. In different embodiments these various computer systems may be configured to communicate with each other and devices described herein in any suitable way, such as, for example, via a network.

The computer system may include one or more processors or controllers coupled to system memory via an input/output (I/O) interface. Computer systems may further include a network interface coupled to I/O interface, and one or more input/output devices, such as speech control device, audio output device, cursor control device, keyboard, and display(s). In some embodiments, one or more aspects of the methods described herein may be implemented using a single instance of a computer system, while in other embodiments multiple systems, or multiple nodes making up computer system, may be configured to host different portions or instances of embodiments. For example, in an embodiment some elements may be implemented via one or more nodes of a computer system that are distinct from those nodes implementing other elements.

In various embodiments, a computer system may be a single-processor system including one processor, or a multi-processor system including two or more processors (e.g., two, four, eight, or another suitable number). Processors may be any processor capable of executing program instructions. For example, in various embodiments, processors may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors may commonly, but not necessarily, implement the same ISA. Also, in some embodiments, at least one processor may be a graphics-processing unit (GPU) or other dedicated graphics-rendering device.

System memory may be configured to store program instructions and/or data accessible by one or more processor.

In various embodiments, system memory may be implemented using any suitable memory technology, such as static random-access memory (SRAM), synchronous dynamic RAM (SDRAM), nonvolatile/Flash-type memory, or any other type of memory. Program instructions and data implementing certain operations, such as, for example, those described herein, may be stored within system memory as program instructions and data storage, respectively. In other embodiments, program instructions and/or data may be received, sent or stored upon different types of computer-accessible media or on similar media separate from system memory or computer system. Generally speaking, a computer-accessible medium may include any tangible storage media or memory media such as magnetic or optical media—e.g., disk or CD/DVD-ROM coupled to computer system via I/O interface. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via a network interface. However, a computer-readable storage medium as described herein does not include such signals per se.

In certain aspects, an I/O interface may be configured to coordinate I/O traffic between processor, system memory, and any peripheral devices in the device, including network interface or other peripheral interfaces, such as input/output devices. In some embodiments, I/O interface may perform any necessary protocol, timing or other data transformations to convert data signals from one component (e.g., system memory) into a format suitable for use by another component (e.g., processor). In some embodiments, I/O interface may include support for devices attached through various types of peripheral buses, such as a variant of the Peripheral Component Interconnect (PCI) bus standard or the Universal Serial Bus (USB) standard, for example. In some embodiments, the function of I/O interface may be split into two or more separate components, such as a north bridge and a south bridge, for example. In addition, in some embodiments some or all of the functionality of I/O interface, such as an interface to system memory, may be incorporated directly into processor.

A network interface may be configured to allow data to be exchanged between the computer system and other devices attached to a network, such as other computer systems, or between nodes of computer system. In various embodiments, network interface may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices may, in some embodiments, include one or more display terminals, keyboards, keypads, touch screens, scanning devices, voice or optical recognition devices, or any other devices suitable for entering or retrieving data by one or more computer system. Multiple input/output devices may be present in computer system or may be distributed on various nodes of computer system. In some embodiments, similar input/output devices may be separate from computer system and may interact with one or more nodes of computer system through a wired or wireless connection, such as over a network interface.

Memory may include program instructions, configured to implement certain embodiments described herein, and data storage, comprising various data accessible by program instructions. In an embodiment, program instructions may include software elements of embodiments illustrated herein. For example, program instructions may be implemented in various embodiments using any desired programming language, scripting language, or combination of programming languages and/or scripting languages (e.g., C, C++, C #, JAVA®, JAVASCRIPT®, PERL®, etc.). Data storage may include data that may be used in these embodiments. In other embodiments, other or different software elements and data may be included.

A person of ordinary skill in the art will appreciate that a computer system(s) described are merely illustrative and is not intended to limit the scope of the current disclosure. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be performed and/or other additional operations may be available. Accordingly, systems and methods described herein may be implemented or executed with other computer system configurations.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Also, the instructions may be executed by the device 102, by the cloud computing system 110, or by a combination of the two, based at least on the power requirements of the device 102. Other embodiments may be within the scope of the following claims.

It should be further understood that software including one or more computer-executable instructions that facilitate processing and operations as described above with reference to any one or all of steps of the disclosure can be installed in and sold with one or more computing devices consistent with the disclosure. Alternatively, the software can be obtained and loaded into one or more computing devices, including obtaining the software through physical medium or distribution system, including, for example, from a server owned by the software creator or from a server not owned but used by the software creator. The software can be stored on a server for distribution over the Internet, for example.

The components of the illustrative devices, systems and methods employed in accordance with the illustrated embodiments can be implemented, at least in part, in digital electronic circuitry, analog electronic circuitry, or in computer hardware, firmware, software, or in combinations of them. These components can be implemented, for example, as a computer program product such as a computer program, program code or computer instructions tangibly embodied in an information carrier, or in a machine-readable storage device, for execution by, or to control the operation of, data processing apparatus such as a programmable processor, a computer, or multiple computers.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network. Also, functional programs, codes, and code segments for accomplishing the techniques described herein can be easily construed as within the scope of the claims by programmers skilled in the art to which the techniques described herein pertain. Method steps associated with the illustrative embodiments can be performed by one or more programmable processors executing a computer program, code or instructions to perform functions (e.g., by operating on input data and/or generating an output). Method steps can also be performed by, and apparatus for performing the methods can be implemented as, special purpose logic circuitry, e.g., an FPGA (field programmable gate array) or an ASIC (application-specific integrated circuit), for example.

The various illustrative logical blocks, modules, and circuits described in connection with the embodiments disclosed herein may be implemented or performed with a general purpose processor, a digital signal processor (DSP), an ASIC, a FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Processors suitable for the execution of a computer program include, by way of example, both general and special purpose microprocessors, and any one or more processors of any kind of digital computer. Generally, a processor will receive instructions and data from a read-only memory or a random access memory or both. The required elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., electrically programmable read-only memory or ROM (EPROM), electrically erasable programmable ROM (EEPROM), flash memory devices, and data storage disks (e.g., magnetic disks, internal hard disks, or removable disks, magneto-optical disks, and CD-ROM and DVD-ROM disks). The processor and the memory can be supplemented by, or incorporated in special purpose logic circuitry.

Those of skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store processor instructions. The term "machine-readable medium" shall also be taken to include any medium, or combination of multiple media, that is capable of storing instructions for execution by one or more processors 600, such that the instructions, when executed by one or more processors 600 cause the one or more processors 600 to perform any one or more of the methodologies described herein. Accordingly, a "machine-readable medium" refers to a single storage apparatus or device, as well as "cloud-based" storage systems or storage networks that include multiple storage apparatus or devices.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

The use of the word "a" or "an" when used in conjunction with the term "comprising" in the claims and/or the specification may mean "one," but it is also consistent with the meaning of "one or more," "at least one," and "one or more than one."

Throughout this application, the term "about" is used to indicate that a value includes the standard deviation of error for the device or method being employed to determine the value.

The use of the term "or" in the claims is used to mean "and/or" unless explicitly indicated to refer to alternatives only or the alternatives are mutually exclusive, although the disclosure supports a definition that refers to only alternatives and "and/or."

Also, it will be understood by one skilled in the art that this disclosure is not limited in its application to the details of construction and the arrangement of components set forth in the description or illustrated in the drawings. The embodiments herein are capable of other embodiments, and capable of being practiced or carried out in various ways. Also, it will be understood that the phraseology and terminology used herein is for the purpose of description and should not be regarded as limiting. As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. Further, terms such as up, down, bottom, and top are relative, and are employed to aid illustration, but are not limiting.

Although the present disclosure has been described with reference to specific features and embodiments thereof, it is evident that various modifications and combinations can be made thereto without departing from the scope of the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

The invention claimed is:

1. A wearable device adapted to monitor a wearer's physical activity patterns and to provide assistance to the wearer, comprising:
   a power source;
   a processor;
   at least one physiologic sensor that provides sensor data of the wearer to the processor;
   a user interface connected to the processor and adapted to interact with the wearer and to provide information to the wearer;
   a network interface configured to provide a network connection between the device and a remote computer; and
   a memory coupled to the processor, the memory storing program instructions that, upon execution by the processor, cause the device to collect, from the at least one physiologic sensor, physical activity data related to times and locations of physical activity of the wearer over time, to provide the collected physical activity data to the remote computer via the network interface for processing to create or update a parameterized rule-based custom data model for the wearer, the parameterized rule-based custom data model being representative of an activity profile of the times and locations of physical activity of the wearer over time, to receive the parameterized rule-based custom data model from the remote computer for comparison to collected physical activity data, and to communicate with the wearer via the user interface when a comparison of the wearer's physical activity data against the parameterized rule-based custom data model indicates that the wearer's physical activity is not consistent with the parameterized rule-based custom data model.

2. The wearable device according to claim 1, wherein the at least one physiologic sensor passively gathers sensor data about the wearer and the processor executes instructions to compare the gathered sensor data against the parameterized rule-based custom data model to detect a deviation.

3. The wearable device according to claim 2, wherein the processor executes instructions to provide a communication to the wearer via the user interface when the deviation is detected, the communication offering assistance to the wearer.

4. The wearable device according to claim 3, wherein the processor executes instructions to contact a caregiver or call center when the assistance offered to the wearer is accepted b wearer.

5. The wearable device according to claim 1, further comprising a location detection device, wherein the processor executes instructions to compare the wearer's location to the parameterized rule-based custom data model to determine if the wearer is in an unexpected location, and upon detection that the wearer is in an unexpected location, communicates with the wearer via the user interface to offer directions.

6. The wearable device according to claim 5, wherein upon detection that the wearer is in an unexpected location, the processor executes instructions to determine whether the wearer is traveling and, when the wearer is determined to be traveling, disables the communications with the wearer via the user interface to offer directions until the wearer returns from traveling.

7. The wearable device according to claim 6, wherein upon determining that the wearer is traveling, the processor executes instructions to reduce sensitivity of non-critical monitoring by the at least one physiologic sensor until the wearer returns from traveling.

8. The wearable device according to claim 6, wherein upon detection that the wearer is traveling, the processor executes instructions to increase sensitivity of fall detection by the at least one physiologic sensor until the wearer returns from traveling.

9. The wearable device according to claim 1, wherein the parameterized rule-based custom data model represents at least one of a level of physical activity of the wearer, an activity profile of the wearer over time, an activity profile of the wearer relative to a location, and an activity profile of the wearer relative to a location over time.

10. The wearable device according to claim 9, wherein the processor executes instructions to compare the collected physical activity data to the parameterized rule-based custom data model to determine if the wearer has missed a physical activity and, if so, communicates a query to the wearer via the user interface.

11. The wearable device according to claim 9, wherein the processor executes instructions to compare the collected physical activity data to the parameterized rule-based custom data model to determine if the wearer's physical activity level is decreasing and, if so, increases sensitivity of fall detection by the at least one physiologic sensor.

12. The wearable device according to claim 1, wherein the at least one physiologic sensor comprises a microphone that collects vocal patterns of the wearer for comparison to previously acquired recordings of the vocal patterns of the wearer to identify changes representative of changes in at least one of mental and physical state of the wearer.

13. The wearable device according to claim 1, wherein the processor executes instructions to compare the collected physical activity data to previously acquired physical activity data of the wearer to identify changes representative of changes in at least one of mental and physical state of the wearer.

14. The wearable device according to claim 1, wherein the processor executes instructions to compare sleep data collected by the at least one physiologic sensor to previously acquired sleep data of the wearer to identify changes representative of changes in at least one of mental and physical state of the wearer.

15. The wearable device according to claim 1, wherein the processor executes instructions to compare the collected physical activity data to the parameterized rule-based custom data model to determine if the wearer's movements are unusual and, if so, communicates a query to the wearer via the user interface requesting that the user record a speech sample for comparison to a previously recorded speech sample to identify changes indicative of a need for medical attention.

16. The wearable device according to claim 1, wherein the processor executes instructions to communicate with another medical device via the network interface, to extract sharable data from the other medical device, and to prompt the wearer to take an action when the extracted sharable data indicates that the wearer requires medical attention.

17. The wearable device according to claim 16, wherein the extracted sharable data from the other medical device includes a telemedicine reminder for the wearer to take an action.

18. The wearable device according to claim 1, wherein when the at least one physiologic sensor indicates that the wearer is inactive, the processor executes instructions to monitor a microphone to determine if a low volume of sound is detected and, if so, executes instructions to monitor ambient light to determine if low ambient light conditions are present and, if so, determines that the wearer is sleeping and turns off non-critical monitoring features.

19. The wearable device according to claim 1, further comprising a location detection device and, the processor executing instructions to compare location data from the location detection device to stored location data to determine if the wearer is entering a building and, if so, accessing a pressure baseline for the building to offset pressure readings while the wearer is in the building.

20. The wearable device according to claim 19, further comprising a location detection device and, the processor executing instructions to enter a pressure sensing mode to monitor pressure changes for a predetermined period of time to establish a pressure baseline, wherein the pressure baseline is used to offset pressure readings while the wearer is in the building.

21. The wearable device according to claim 1, wherein the network interface receives data indicative of the wearer's home location and data indicative of another location, wherein the processor executes instructions to determine whether data indicative of the other location has been received in the last predetermined period of time and, if not, determines whether data indicative of the wearer's home location has been received and, if so, the network interface ends monitoring for location data.

22. The wearable device according to claim 21, wherein the processor executes instructions to query the wearer when the data indicative of the wearer's home location has not been received in a predetermined period of time since data indicative of the other location was last received.

23. The wearable device according to claim 1, wherein the wearable device is configured to be worn on the wrist of the wearer.

24. The wearable device according to claim 1, wherein the network interface is a wireless interface.

25. The wearable device according to claim 1, wherein the at least one physiologic sensor comprises at least one of an accelerometer and a gyrometer configured to detect a potential falling incident and a location sensor to determine a location of the wearer.

26. The wearable device according to claim 1, wherein the user interface comprises a continuous speech recognition interface configured to enable speech interaction by the wearer with the device.

27. The wearable device according to claim 26, wherein the speech recognition interface is configured to receive and to transmit a request for assistance by the wearer to the remote computer via the network interface and to audibilize instructions and queries that offer assistance to the wearer.

28. The wearable device according to claim 27, wherein the speech recognition interface audibilizes reminders for the user to take medication.

29. A system adapted to monitor the physical activity patterns of a wearer and to provide assistance to the wearer when a need for assistance is indicated, comprising:
the wearable device of claim 1 adapted to be worn by the wearer; and at least one remote computer connectable to the device via the network interface, the remote computer adapted to receive the collected physical activity data from the device via the network interface for processing to create a parameterized rule-based custom data model for the wearer during a training mode, the parameterized rule-based custom data model being representative of an activity profile of times and locations of physical activity of the wearer over time, to provide the parameterized rule-based custom data model to the device for comparison to collected physical activity data during an active mode, and to update parameters of the parameterized rule-based custom data model during the active mode.

30. The system according to claim 29, wherein the at least one remote computer collects physical activity data from multiple wearers and clusters the data from multiple wearers to create peer groups to wearers.

31. The system according to claim 30, wherein a peer group of a wearer is used to establish an initial parameterized rule-based data model for the wearer that is updated by the at least one remote computer over time as new physical activity data is collected to create the parameterized rule-based custom data model for the wearer.

32. The system according to claim 31, wherein deviation sensitivity of the initial parameterized rule-based data model is increased as the initial parameterized rule-based data model becomes more customized to the wearer.

33. The system according to claim 30, wherein fall data for the wearer is compared to fall data from multiple wearers and if the fall data of the wearer is significantly different from the fall data from multiple wearers, the at least one remote computer uses the fall data of the wearer to train a wearer-specific fall detection algorithm for implementation by the device.

34. The system according to claim 30, wherein fall data for the wearer is compared to fall data from multiple wearers and if the fall data of the wearer is not significantly different from the fall data from multiple wearers, the at least one remote computer trains a generic fall detection algorithm for implementation by the device.

35. A method for monitoring physical activity patterns of a wearer of a wearable assist device and to provide assistance to the wearer, comprising:

at least one physiologic sensor collecting physical activity data related to times and locations of physical activity of the wearer over time;

providing the collected physical activity data to a remote computer;

the remote computer processing the collected physical activity data to create or update a parameterized rule-based custom data model for the wearer, the parameterized rule-based custom data model being representative of an activity profile of the times and locations of physical activity of the wearer over time;

the assist device receiving the parameterized rule-based custom data model from the remote computer;

the assist device comparing newly collected physical activity data to the parameterized rule-based custom data model; and communicating with the wearer via a user interface of the assist device when the comparing of the wearer's newly collected physical activity data against the parameterized rule-based custom data model indicates that the wearer's physical activity is not consistent with the parameterized rule-based custom data model.

36. The method of claim 35, further comprising the assist device communicating with a medical device to extract sharable data from the medical device and prompting the wearer to take an action when the extracted sharable data indicates that the wearer requires medical attention.

37. The method of claim 36, wherein the extracted sharable data from the other medical device includes a telemedicine reminder for the wearer to take an action.

38. The method of claim 35, wherein the remote computer creates the parameterized rule-based custom data model for the wearer during a training mode of the assist device, further comprising the remote computer providing updated parameters of the parameterized rule-based custom data model during an active mode of the assist device.

39. The method of claim 35, further comprising the remote computer collecting physical activity data from multiple wearers and clustering the data from multiple wearers to create peer groups to wearers.

40. The method of claim 39, further comprising using a peer group of a wearer to establish an initial parameterized rule-based data model for the wearer and updating the initial parameterized rule-based data model for the wearer over time as new physical activity data is collected to create the parameterized rule-based custom data model for the wearer.

41. The method of claim 40, further comprising increasing deviation sensitivity of the initial parameterized rule-based data model as the initial parameterized rule-based data model becomes more customized to the wearer.

42. The method of claim 39, further comprising comparing fall data for the wearer to fall data from multiple wearers and if the fall data of the wearer is significantly different from the fall data from multiple wearers, using the fall data of the wearer to train a wearer-specific fall detection algorithm for implementation by the assist device.

43. The method of claim 39, further comprising comparing fall data for the wearer to fall data from multiple wearers and if the fall data of the wearer is not significantly different from the fall data from multiple wearers, training a generic fall detection algorithm for implementation by the assist device.

* * * * *